(12) United States Patent
Dereszynski et al.

(10) Patent No.: US 10,339,546 B2
(45) Date of Patent: Jul. 2, 2019

(54) METHOD AND SYSTEM THAT IDENTIFY MARKET SEGMENTS AND THAT FACILITATE TARGETED INFORMATION DISTRIBUTION

(71) Applicant: Oracle International Corporation, Redwood Shores, CA (US)

(72) Inventors: Ethan Dereszynski, Oregon City, OR (US); Vladimir Brayman, Mercer Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1082 days.

(21) Appl. No.: 14/270,337

(22) Filed: May 5, 2014

(65) Prior Publication Data

US 2015/0081389 A1    Mar. 19, 2015

Related U.S. Application Data

(60) Provisional application No. 61/822,828, filed on May 13, 2013.

(51) Int. Cl.
*G06Q 30/02* (2012.01)
(52) U.S. Cl.
CPC ............... *G06Q 30/0204* (2013.01)
(58) Field of Classification Search
None
See application file for complete search history.

(56) References Cited

U.S. PATENT DOCUMENTS

| | | | |
|---|---|---|---|
| 8,260,846 B2 * | 9/2012 | Lahav | G06Q 30/02 709/203 |
| 8,627,288 B2 | 1/2014 | Kimball et al. | |
| 8,799,814 B1 * | 8/2014 | Bryc | G06Q 30/0242 705/14.1 |
| 9,274,932 B2 | 3/2016 | Crossley | |
| 9,317,392 B2 | 4/2016 | Lawbaugh et al. | |
| 9,519,561 B2 | 12/2016 | Lawbaugh | |
| 2009/0099920 A1 * | 4/2009 | Aharoni | G06Q 30/02 705/14.26 |
| 2011/0246511 A1 * | 10/2011 | Smith | G06F 17/3089 707/769 |
| 2012/0290399 A1 * | 11/2012 | England | G06O 30/0282 705/14.66 |
| 2014/0189714 A1 | 7/2014 | Lawbaugh et al. | |

* cited by examiner

*Primary Examiner* — Deirdre D Hatcher
(74) *Attorney, Agent, or Firm* — Kilpatrick Townsend & Stockton LLP

(57) ABSTRACT

The current document is directed to automated market-segment-discovery methods and systems that may be incorporated within, or used in combination with, various types of analysis and optimization automated systems for automated discovery of market segments for subsequent use in targeted marketing and information distribution. In one implementation, a log of visitor records collected by an analysis and/or optimization system is processed to generate a segment-discovery tree. Construction of the segment-discovery tree produces a set of candidate market-segment-defining rules. Various different techniques and metrics can be applied to produce a set of market-segment-defining rules from these candidate rules. The market-segment-defining rules can then be exported to marketing systems or subsystems to facilitate targeted marketing and information distribution.

18 Claims, 78 Drawing Sheets

|  | factor 1 | factor 2 | factor 3 | factor 4 |
|---|---|---|---|---|
| level 1 | I DO LEGAL STUFF FOR YOU, REALLY | BOB'S LEGAL SERVICES | | BILL ME NOW |
| level 2 | I'M YOUR PIT BULL, BABY | HONEST BOB'S LEGAL SERVICES | | BILL ME HONESTLY NOW |
| level 3 | HEY, POINT ME AND I'LL BITE | CHECKS-IN-THE-MAIL LEGAL SERVICES | | TAKE MY DOUGH |
| level 4 | I'M YOUR GREAT WHITE SHARK | PREDATOR FOR HIRE | | BILL ME NOW AND FOREVER |
| level 5 | CONTRACTS, LICENSES, NON-ADVERSARIAL LITIGATION | | | BILL ME SHAMELESSLY |
| level 6 | I DO ANYTHING FOR MONEY | | | |

FIG. 7

```
<!DOCTYPE html PUBLIC "-//W3C//DTD XHTML 1.0 transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site: Landing Page walkthrough | Widemile Optimization Platform</title>
<style type="text/css">
body { margin: 0; padding: 0; background: #b3b3b3; text-align:center; } img{ border:none; }
#container{ background: #fff url(images/demo_site_bg.jpg) no-repeat 0 0; margin:36px auto;/*center*/ height:660px; width:952px; }
#header{ padding:24px 24px 0 24px; }
#left{ float:left; width:369px; margin:36px 0px 0px 24px; } * > #left { margin:36px 0px 0px 48px; }/*reset ie6 double margin bug*/
#right{ float:right; width:459px; margin:36px 24px 0px 0px; } * > #right { margin:36px 48px 0px 0px; }/*reset ie6 double margin bug*/
#wm_offer{ margin:36px 0px; }
</style>
<!-- insert: Widemile Optimization Platform Client Library -->
<script type="text/javascript" src="http://www.widemile.com/js/wm_capi.js"></script>   ─ 1402
</head>
<body>
<!-- insert: Widemile PageView Tracking Code -->
<script type="text/javascript">WM.setup();</script>   ─ 1404
<div id="main_ext">
    <div id="container">
        <div id="header">
        <div id="wm_headline">
            <img src="images/demo_site_hd_green.jpg" alt="Green Headline 1" />
        </div>
</div>
<div id="left">
    <div id="wm_hero">
        <img src="images/demo_site_hs_green.jpg" alt="Green Hero 1" />
    </div>
</div>
<div id="right">
    <div id="wm_offer">
        <img src="images/demo_site_offer_green.jpg" alt="Green Offer 1" />
    </div>
    <a href="conversion.htm"><div id="wm_button">
        <span id="wm_INSERT_BUTTON">
            <img src="images/demo_site_btn_green.jpg" alt="Green Button 1" />
        </span>
    </div></a>
</div>
    </div>
></div>
</body>
</html>
```

FIG. 14 simplecapi.js

```javascript
//modify the page based on the experiment data
var g_data=null;
var g_moniker=mull;
var g_uid=null;
function loadExperiment() {
            getExperimentDataFromServer();
            var replacements = g_data;
            //render the new elements that where loaded from the server
            for ( var i = 0; i < replacements.length; i++) { document.getElementById(replacements[i].divID).innerHTML=replacements[i].content;
                }
}

//this simulates the kind of data the widemile server would return.
//control.js contains contents of factors and levels to update on the page see below.
//control.js call setExperimentData(data)
//{divID:"hero",content:"<img src='pentagon.png'alt='pentagon'/>"},
//{divID:"info",content:"This is a green pentagon.Look how pretty it is."};

function getExperimentDataFromServer(){
    //create new script block and add to the browser DOM to load external server call
    var script=createElement("script",document.body);
    script.src="http://ots.server.com/js-control/"+g_moniker+"/"+g_uid+"/control.js";
}

//data[{divID:"hero",content;"<img src='pentagon.png'alt='pentagon'/>"},
//    {divID:"info",content:"This is a green pentagon. Look how pretty it is."}];
function setExperimentData(data){
    g_data=data;
} function createVisitorID() {
    var value=null;
    if (document.cookie["uid"]==null) {
       value=newDate().time+"-"+rand(10);
       document.cookie["uid"]=newCookie(value);
    } else {
       value=document cookie["uid"]
    }
      return value;
} function setup(moniker) {
    g_moniker=moniker,
    g_uid=createVisitorID();
    loadExperiment();
}
```

FIG. 15

```
{
    "meta" :
    {
        "schema_version" : "2.0",
        "api_version" : "2.0",
        "message_type" : "event",
        "stream_type" : "content"
    },
    "data" :
    {
        "k1" : "xxxxxx",
        "k2" : "xxxxxx",
        "wt" :
        {
            "k3" : [ "xxxxxx", "xxxxxx"],
            "k4" : "xxxxxx",
            "k5" : [ "xxxxxx ", "xxxxxx", "xxxxxx"],
            "k6" : [ "xxxxxx"]
        }
    }
}
```

```
"meta" :                                    ⟋ 2340
{
    "schema_version" : "2.0",
    "api_version" : "2.0",
    "message_type" : "event",
    "stream_type" : "content"
},
"data" :
{
    "k1" : "xxxxxx",
    "k2" : "xxxxxx",
    "wt" : "xxxxxx",              ⟋ 2342
    {
        "k3" : [ "xxxxxx" ],
        "k4" : "xxxxxx",
        "k5" : [ "xxxxxx", "xxxxxx", "xxxxxx" ],
    }
},
"ext" :
{                                            ⟋ 2344
    "geo" :
    {
              "k20" : "xxxxxx",
  2346 ⟋      "k21" : "xxxxxx",
    },          ⋮
    "device" :
    {
              "k30" : " xxxxxx",
  2348 ⟋      "k31" : " xxxxxx",
    },          ⋮
    "browser" :
    {
         ⟋    "k40" : "xxxxxx",
  2350       "k41" : "xxxxxx",
    }
}           ⋮
}
```

FIG. 23C

```
{
    "meta" :                                    ⎯ 2360
    {
        "schema_version" : "2.0",
        "api_version" : "2.0",
        "message_type" : "xxxxxx",
        "stream_type" : "xxxxxx"
    },
    "session_id" : "1353515717173",              ⎫
    "visitor_id" : "216.64.169.240-4057458896.30216649",  ⎬ 2362
    "session_closed" : false,                    ⎪
    "session_summary" :                          ⎭
    {
        "events" :
2364 ⎯⎯  {
            "k1" : "xxxxxx",
            "k2" : "xxxxxx"
        },
        "k10" :
        {
            "k11" : "xxxxxx",
            "k12" : "xxxxxx"
        },
        "k20"
        {
            "k21" : "xxxxxx"
        }                                        ⎯ 2366
    },
    "events" : [
        {
```

FIG. 23D-1

```
"k30" : "xxxxxx",
        "k31" : ["xxxxxx", "xxxxxx", "xxxxxx"],
        "data" :
        {
            "k32" : ["xxxxxx", "xxxxxx", "xxxxxx"],
            "wt" :
            {
                "k33" : ["xxxxxx", "xxxxxx", "xxxxxx"],
                "k34" : ["xxxxxx", "xxxxxx", "xxxxxx"],
            }
        },
        "ext" :
        {
            "geo"
            {
                "k35" : ["xxxxxx", "xxxxxx", "xxxxxx"],
                "k36" : ["xxxxxx", "xxxxxx", "xxxxxx"]
            },
            "source" :
            {
                "k38" : ["xxxxxx", "xxxxxx", "xxxxxx"],
                "k39" : ["xxxxxx", "xxxxxx", "xxxxxx"]
            },
            "device":
            {
                "k41" : "xxxxxx", "xxxxxx", "xxxxxx"],
                "k42" : ["xxxxxx", "xxxxxx", "xxxxxx"]
            },
            "browser":
            {
                "k44" : ["xxxxxx", "xxxxxx", "xxxxxx"],
                "k45" : ["xxxxxx", "xxxxxx", "xxxxxx"]
            }
        }
    },
    {
```

FIG. 23D-2

```
"k50" : "xxxxxx",
    "k51" : ["xxxxxx", "xxxxxx", "xxxxxx"],
    "data" :
    {
        "k52" : ["xxxxxx", "xxxxxx", "xxxxxx"],
        "wt" :
        {
            "k53" : ["xxxxxx", "xxxxxx", "xxxxxx"],
            "k54" : ["xxxxxx", "xxxxxx", "xxxxxx"]
        }
    },
    "ext" :
    {
        "geo"
        {
            "k55" : ["xxxxxx", "xxxxxx", "xxxxxx"],
            "k56" : ["xxxxxx", "xxxxxx", "xxxxxx"]
        },
        "source" :
        {
            "k58" : ["xxxxxx", "xxxxxx", "xxxxxx"],
            "k59" : ["xxxxxx", "xxxxxx", "xxxxxx"]
        },
        "device":
        {
            "k61" : "xxxxxx", "xxxxxx", "xxxxxx"],
            "k62" : ["xxxxxx", "xxxxxx", "xxxxxx"]
        }
        "browser":
        {
            "k64" : ["xxxxxx", "xxxxxx", "xxxxxx"],
            "k65" : ["xxxxxx", "xxxxxx", "xxxxxx"]
        }
    }
}
]
}
```

FIG. 23D-3 select * ⟵ 2520 select event.data.wt.k1, event.data.wt.k2, . . . ⟵ 2522 select event.data.*, event.ext.geo.* ⟵ 2524 select session.visitor_id, session.time_on_site, session.events.* ⟵ 2526
where session.closed = 'true' where session.closed = 'true' AND session.session_summary.purchase.event_count = 0 ⟵ 2528

FIG. 25B

```
function WebTrends() { var that = this; this.dcsid =
"dcscyjdor000004fu02p6j55k_7z2q"; this.domain = "statse.webtrendslive.com";
this.timezone = -8; this.fpcdom = ".motorcycle-superstore.com";
this.onsitedoms = (function () { return (window.RegExp ? new
RegExp(".*motorcycle-superstore.com", "i") : ""); })();this.downloadtypes =
"xls,doc,pdf,txt,csv,zip"; this.navigationtag = "div,table"; this.adclickparam
= "WT.ac"; this.trackevents = true; this.trimoffsiteparams = true;
this.enabled = true; this.i18n = false; this.fpc = "WT_FPC";
this.paidsearchparams = "gclid"; this.splitvalue = ""; this.preserve = true;
this.vid = { params: "WT.dcsvid,WT.i_e_dcsvid", name: "WT_VID", path: ";
path=/", expiry: "; expires=" + (function () { var cur = new Date(); var exp =
new Date(cur.getTime() + 315360000000); return exp.toGMTString(); })(),
domain: "; domain=" + this.fpcdom }; this.DCS = {}; this.WT = {}; this.DCSext
= {}; this.images = []; this.index = 0; this.qp = []; this.exre = (function ()
{ return (window.RegExp ? new
RegExp("dcs(uri)|(ref)|(aut)|(met)|(sta)|(sip)|(pro)|(byt)|(dat)|(p3p)|(cfg)|(
redirect)|(cip)", "i") : ""); })(); this.re = (function () { return
(window.RegExp ? (that.i18n ? { "%25": /\%/g, "%26": /\&/g} : { "%09": /\t/g,
"%20": / /g, "%23": /\#/g, "%26": /\&/g, "%2B": /\+/g, "%3F": /\?/g,
"%5C": /\\/g, "%22": /\"/g, "%7F": /\x7F/g, "%A0": /\xA0/g }) : ""); })(); }
                                                            2818
WebTrends.prototype.dcsCreateImage = function (dcsSrc) {
    if (document.images) { this.images[this.index] = new Image();
2816  this.images[this.index].src = dcsSrc; this.index++; }
    else { document.write('<img alt="" border="0" name="DCSIMG" width="1"
    height="1" src="' + dcsSrc + '">'); }
}

WebTrends.prototype.dcsTag = function () {
    if (document.cookie.indexOf("WTLOPTOUT=") != -1) { return; }
    var WT = this.WT; var DCS = this.DCS; var DCSext = this.DCSext; var i18n =
this.i18n; var P = "http" + (window.location.protocol.indexOf('https:') == 0 ?
's' : '') + "://" + this.domain + (this.dcsid == "" ? '' : '/' + this.dcsid) +
"/dcs.gif?"; if (i18n) { WT.dep = ""; }
    for (var N in DCS) { if (DCS[N] && (typeof DCS[N] != "function")) { P +=
2812  this.dcsA(N, DCS[N]); } }
    for (N in WT) { if (WT[N] && (typeof WT[N] != "function")) { P +=
this.dcsA("WT." + N, WT[N]); } }
    for (N in DCSext) {
        if (DCSext[N] && (typeof DCSext[N] != "function")) {
            if (i18n) { WT.dep = (WT.dep.length == 0) ? N : (WT.dep + ";" +
N); }
```

FIG. 28A

```
        P += this.dcsA(N, DCSext[N]);
    }
}
if (i18n && (WT.dep.length > 0)) { P += this.dcsA("WT.dep", WT.dep); }
if (P.length > 2048 && navigator.userAgent.indexOf('MSIE') >= 0) { P = P.substring(0, 2040) + "&WT.tu=1"; }
    this.dcsCreateImage(P); this.WT.ad = "";          — 2814
}
WebTrends.prototype.dcsCollect = function () {
    if (this.enabled) {
        this.dcsVar(); this.dcsMeta(); this.dcsAdv(); if (typeof (this.dcsCustom) == "function") { this.dcsCustom(); }
        this.dcsTag();
    }                       — 2810
}
```

2808

```
    <script type="text/javascript">           var _tag = new WebTrends();
_tag.dcsGetId();</script>
    <script type="text/
javascript">_tag.trackAllEvents=true;_tag.dcsCollect();</script>
```

2804

2806  2802

FIG. 28B $t \in \{ (A_0 = a_{0,0}),$
$(A_0 = a_{0,1}),$
$(A_0 = a_{0,2}),$
$(A_1 = a_{1,0}),$
$(A_1 = a_{1,1}),$ ⎫ 1 term contrast sets  4302

$(A_0 = a_{0,0} \land A_1 = a_{1,0}),$
$(A_0 = a_{0,0} \land A_1 = a_{1,1}),$
$(A_0 = a_{0,1} \land A_1 = a_{1,0}),$
$(A_0 = a_{0,1} \land A_1 = a_{1,1}),$
$(A_0 = a_{0,2} \land A_1 = a_{1,0}),$
$(A_0 = a_{0,2} \land A_1 = a_{1,1}),$
$\}$ ⎫ 2 term contrast sets  4304 goal: Find those contrast sets $t$, that can be used to select or identify a subset $\mathbf{H}'$ of $\mathbf{H}$.

Example 1: $\mathbf{G} = \{ \text{city\_converted} \}$
$t = \{ \text{main\_photo} = \text{waterfront\_cityscape} \land \text{catalog\_theme} = \text{rainwear} \}$ —— 4310

4306 —— $P(t|\text{city} = \text{"Seattle"}, \text{converted}) \cong P(t|\text{city} = \text{"Portland"}, \text{converted}) \gg P(t|\text{city} \notin \{\text{"Seattle"}, \text{"Portland"}\})$
$P(t|\text{city} = \text{"Seattle"}, \text{converted}) \cong P(t|\text{city} = \text{"Portland"}, \text{converted}) \gg P(t|\text{city} \in \{\text{"Seattle"}, \text{"Portland"}\}, \text{not converted})$

FIG. 43A

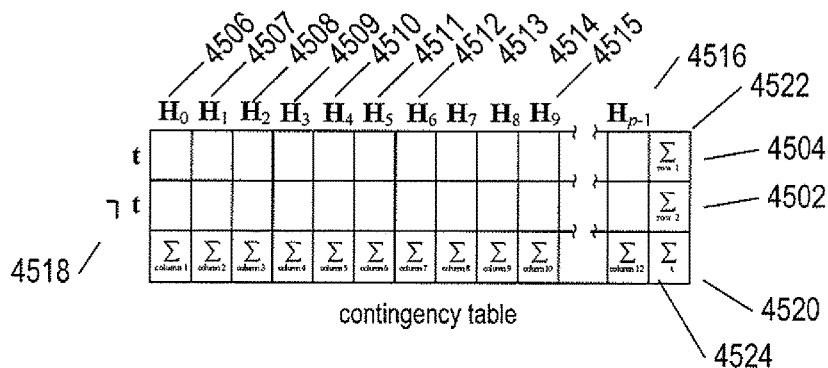

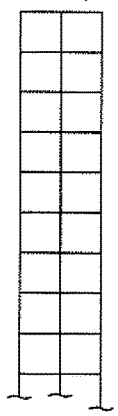

$H_0 = \sum_{row\ i} and \sum_{column\ j}$ values are independent — 4530

$H_a = \sum_{row\ i} and \sum_{column\ j}$ values are not independent — 4532

$$\chi_C^2 = \sum_{i=1}^{2}\sum_{j=1}^{2}\frac{(O_{ij} - E_{ij})^2}{E_{ij}}$$

where $O_{ij}$ is observed frequency at row $i$ and column $j$;

$$E_{ij} = \left(\sum_{row\ i} \times \sum_{column\ j}\right) / \sum_{t} \text{ and}$$

degrees of freedom = $(r-1) \times (C-1) = p - 1$

⎫
⎬ 4534
⎭

$$p = \min_{\alpha}(\chi_c^2 > \chi_t^2)$$ — 4538 when $p < a_t$, node is significant $$\text{lift} = \frac{P(H_i | t) - P(H_i)}{P(H_i)}$$ — 4540

FIG. 45 pruning criteria $$\max_{H_j}\left(S(\mathbf{t}_{node}, \mathbf{H}_c)\right) < \delta \quad \text{——— 4602}$$

$$\min_j (O_{ij}) < \text{threshold} \quad \text{——— 4604}$$

$P$ value associated with $\chi^2_{max} > \alpha_{i,j}$ ——— 4606 where $\chi^2_{max} = \max_{CT} \chi^2_c (CT_i)$;

$CT = \{$set of $2^{|u|}$ contingency tables ordained for node by substituting for each element of first row $O_{i,j}$ one of the $U_{i,j}, l_{i,j}\}$;

| City | Impressed Header | Converted |
|---|---|---|
| New York | Header A | True |
| Chicago | Header B | False |
| New York | Header A | True |
| Los Angeles | Header B | False |
| Los Angeles | Header A | False |
| New York | Header B | False |
| New York | Header A | True |
| Chicago | Header B | False |
| New York | Header A | True |
| Los Angeles | Header B | True |

METHOD AND SYSTEM THAT IDENTIFY MARKET SEGMENTS AND THAT FACILITATE TARGETED INFORMATION DISTRIBUTION

CROSS-REFERENCE TO RELATED APPLICATION

This application claims the benefit of Provisional Application No. 61/822,828, filed May 13, 2013.

TECHNICAL FIELD

The current document is directed to automated analysis and optimization systems and, in particular, to methods and systems that employ information collected with regard to information distribution and retailing and identifying market segments from the collected information that can subsequently be used for targeted retailing and information distribution.

BACKGROUND

Market researchers have, for years, developed strategies, techniques, and semi-automated systems for analyzing retailing and distribution information in order to identify market segments. Market segments are groups of individuals or organizations that share some type of common behavior with respect to retail purchases and actions taken after receiving distributed information, including actions taken, as one example, following accessing particular web sites and web pages. As one example, a broad market segment might be defined as males with incomes between $50,000 and $200,000 per year between the ages of 25 and 35. Individuals of this market segment may be, for example, more receptive of advertising related to motorcycles and more likely to purchase motorcycle-related items as a result of receiving such advertisements. Market segments may be defined by using values or ranges of values with many different attributes. In the case of purchasers of items from retailing web sites, these attributes may include attributes that describe the purchaser, attributes that describe the purchaser's interaction with the web site, and attributes that describe the particular information distributed to the purchasers by the web site, as one example. Because there are many different possible market segments, even when only a relatively modest number of attributes and associated attribute values are considered, it is practically impossible to propose and test market-segment definitions manually, by manual analysis, even when analysts employ computer-based statistical-analysis packages and routines. Furthermore, because of the wide variation in the frequency of occurrence of particular attribute values or ranges of attribute values in the generally very large data sets obtained, as one example, using automated web-analysis and web-optimization systems, it is difficult to employ even sophisticated automated cluster-detection methodologies in order to discover market segments. A further complexity in Internet-retailing analysis is that the information content in web sites is highly dynamic, in nature, so that an analyst cannot generally determine which particular content a particular visitor to a web site may have seen. Thus, retailers, retail-data analysts, web site developers, and many other professionals associated with retailing and marketing continue to seek effective methods and systems for market-segment discovery. Fast, reliable, and precise market-segment discovery can provide the basis for automated targeting of market segments for particular types of information distribution, promotions, and other such services to more efficiently and effectively distribute information and retail products and services.

SUMMARY

The current document is directed to automated market-segment-discovery methods and systems that may be incorporated within, or used in combination with, various types of analysis and optimization automated systems for automated discovery of market segments for subsequent use in targeted marketing and information distribution. In one implementation, a log of visitor records collected by an analysis and/or optimization system is processed to generate a segment-discovery tree. Construction of the segment-discovery tree produces a set of candidate market-segment-defining rules. Various different techniques and metrics can be applied to produce a set of market-segment-defining rules from these candidate rules. The market-segment-defining rules can then be exported to marketing systems or subsystems to facilitate targeted marketing and information distribution.

BRIEF DESCRIPTION OF THE DRAWINGS

FIGS. 6-7 illustrate factors, factor levels, and test design.

FIG. 14 shows the HTML modifications used to virtually incorporate a testing service.

FIG. 15 provides an exemplary script library downloaded service.

FIGS. 23A-E illustrate the various types of data messages that are transmitted between computers in the example system shown in FIG. 20.

FIGS. 25A-B illustrate query-based filtering of the data stream by the processing center prior to directing the data stream to a client application.

FIGS. 28A-B provide an example of the instrumentation inserted within a web page that carries out data collection.

FIGS. 43A-B illustrate contrast sets and illustrate goals and criteria for automated market-segment discovery.

FIG. 45 illustrates the assessment of whether a contrast set represented by a node in the segment-discovery tree meets the confidence criterion.

FIG. 46 illustrates three criteria that are used for evaluating a node of the segment-discovery tree for expansion.

DETAILED DESCRIPTION

The current document is directed to automated market-segment-discovery methods and systems that may be incorporated within, or used in combination with, various types of automated analysis, optimization, and data-acquisition systems for automated discovery of market segments for subsequent use in targeted marketing and information distribution. In one implementation, a log of visitor records collected by an analysis system, optimization system, and/or data-acquisition system is processed to generate a segment-discovery tree. Construction of the segment-discovery tree produces a set of candidate market-segment-defining rules. Various different techniques and metrics can be applied to produce a set of market-segment-defining rules from these candidate rules. The market-segment-defining rules can then be exported to marketing systems or subsystems to facilitate targeted marketing and information distribution. The following discussion includes three subsections: (1) An Automated Analysis and Optimization System, which described an example analysis/optimization system within which, or in conjunction with, the currently disclosed automated market-segment-discovery subsystem or system may be employed; (2) A Real-Time Data Acquisition System, which described an example data-acquisition system within which, or in conjunction with, the currently disclosed automated market-segment-discovery subsystem or system may be employed; and (3) Automated Segment Discovery, a discussion of the currently disclosed automated market-segment-discovery subsystem or system and related methods.

An Automated Analysis and Optimization System

Figure 1:
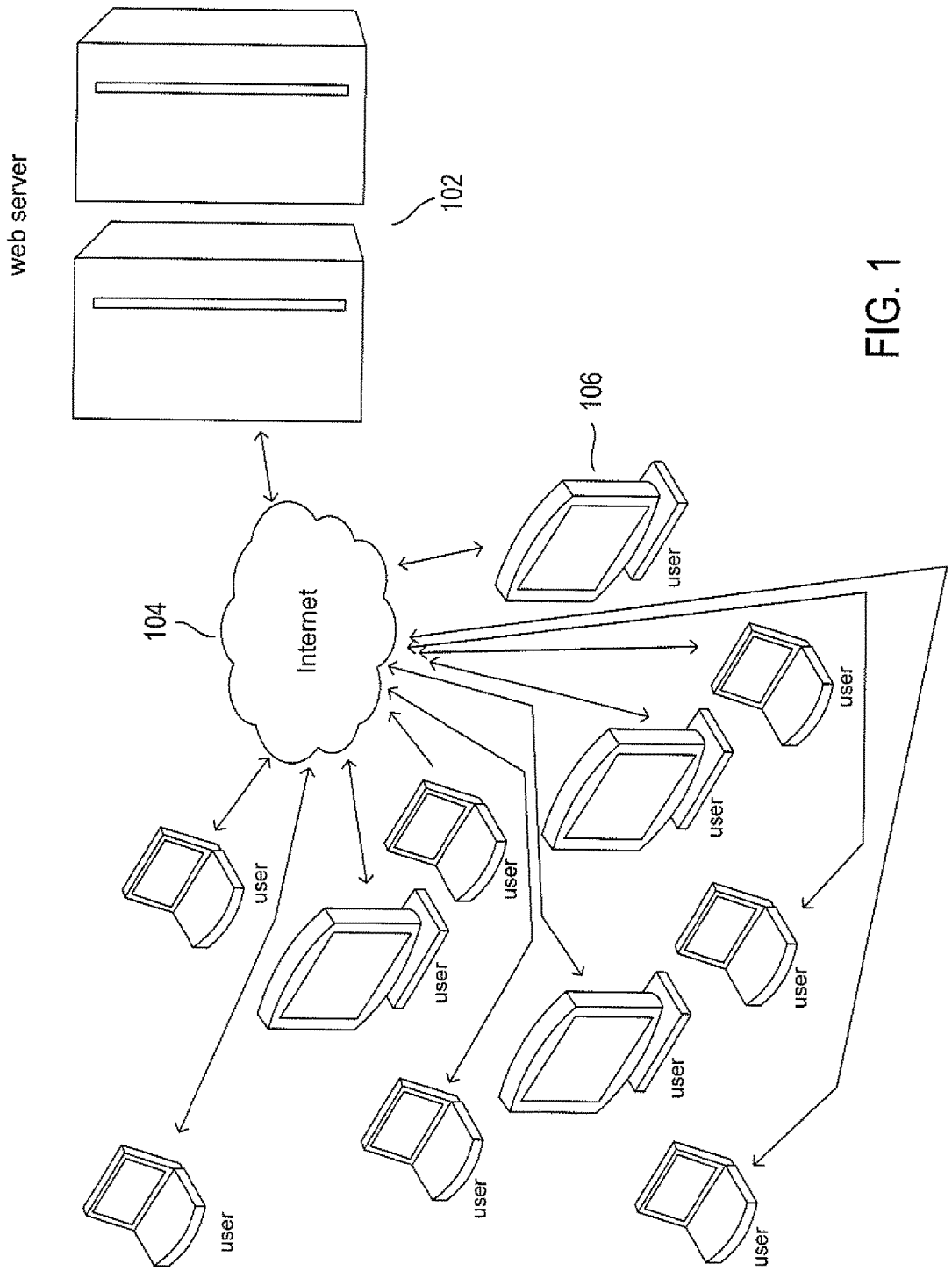
FIG. 1 provides a context for discussion of automated testing.

There are many different types of web sites and web-site servers that can be tested. In the following discussion, a generalized web site is tested by a testing system. FIG. 1 provides a context for discussion of automated testing. In FIG. 1, a server 102, comprising one or more servers and/or other types of computer systems, transmits HTML-encoded web pages through the Internet 104 to a large number of user or customer computers, including as user computer 106. As discussed above, the web server may be owned and operated by an Internet retailing organization, an information-distribution system, a social-networking system, or another type Internet-based transactional or content-distribution system. In general, the web server runs continuously, at all times during the day and night, providing HTML-encoded web pages and, usually, additional types of information and services, including downloads of executable code, scripts, and other such information for specific types of web-based applications.

Figure 2:
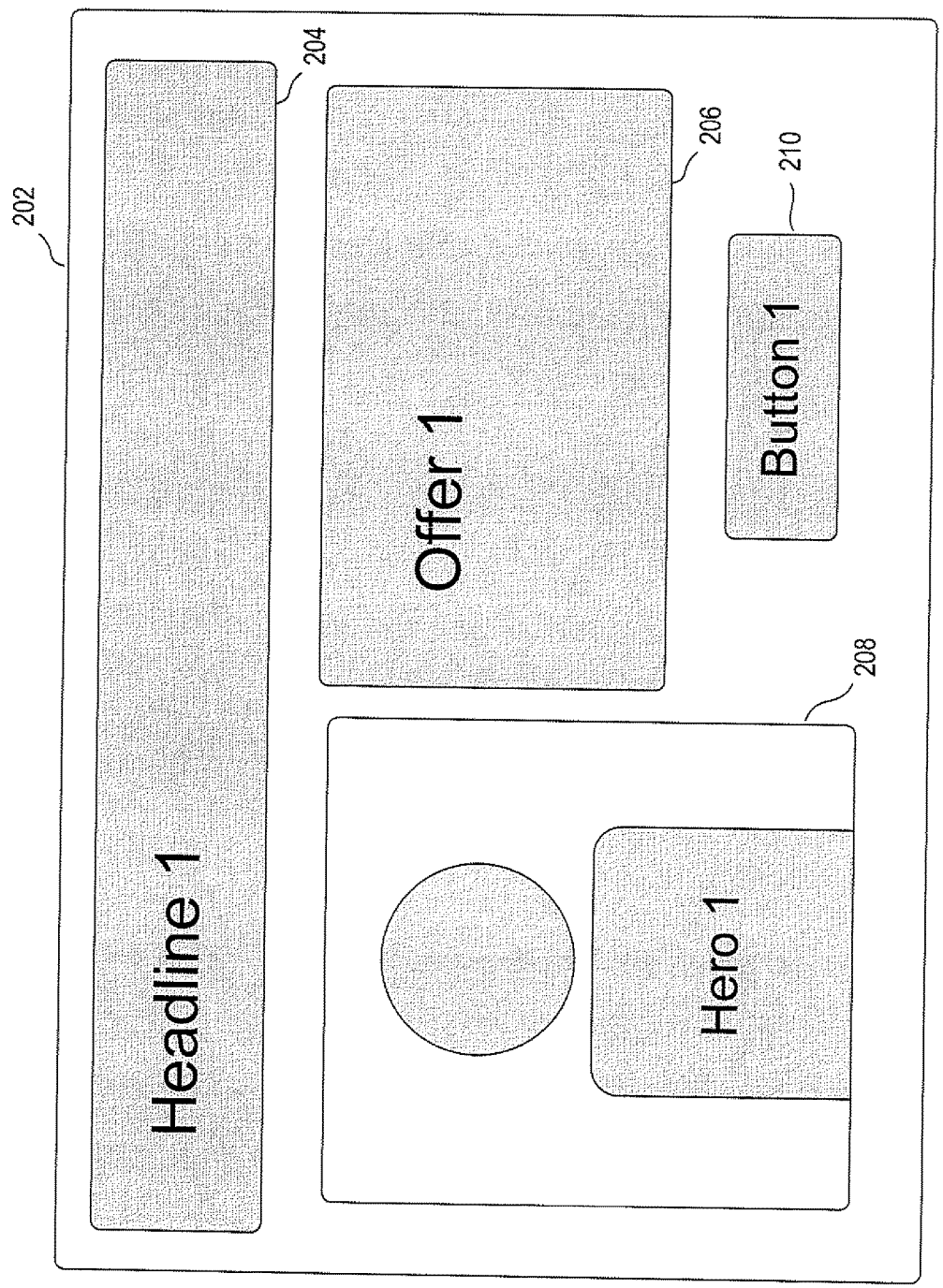
FIG. 2 shows a simple, exemplary web page.

FIG. 2 shows a simple, exemplary web page. A web page is described by an HTML file, discussed below, which is processed by a web browser executing on a computer in order to generate a web page, as shown in FIG. 2, that is displayed to a user on a display device. The exemplary web page 202 includes a headline graphic 204, an offer graphic 206, a hero graphic 208, and a button graphic 210. The exemplary web page is subsequently discussed in the context of tests and experiments in which altered versions of the web page are provided to users of the web server that serves the web page in order to test the effects of modifications to the web page.

Figure 3:
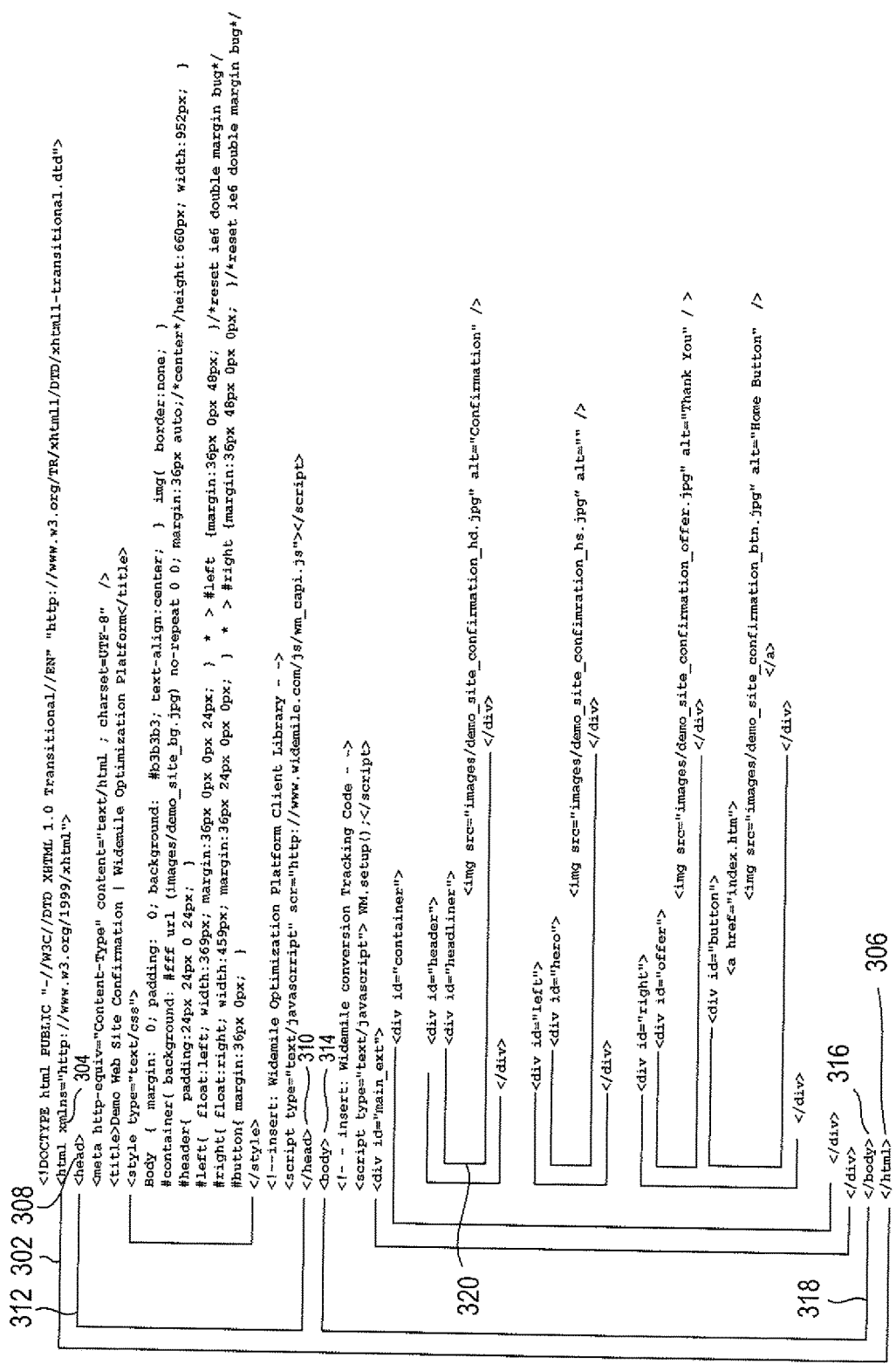
FIG. 3 shows the contents of an HTML file that encodes the exemplary web page shown in FIG. 2 and that includes simple modifications to facilitate automated testing.

FIG. 3 shows the contents of an HTML file that encodes the exemplary web page shown in FIG. 2 and that includes simple modifications to facilitate automated testing. Modifications, used to virtually incorporate a testing service into a website are discussed below, with reference to FIG. 14.

A complete discussion of HTML is beyond the scope of the current discussion. In FIG. 3, portions of the HTML file are correlated with features in the displayed web page shown in FIG. 2. In addition, general features of HTML are illustrated in FIG. 3. HTML is hierarchical, in nature. In FIG. 3, double-headed arrows, such as double-headed arrow 302, have been drawn to the left of the HTML code in order to illustrate tags and tag scoping within the HTML file. In general, HTML statements are delimited by a pair tags, and are hierarchically organized by scope. For example, an outermost statement begins with a first tag of a tag pair that begins with the text "<html xmlns=" (304 in FIG. 3) and ends with a last tag of the tag pair that begins with the text "</HTML" (306 in FIG. 3). The scope of outermost statement encompasses the entire HTML code. The double-headed arrow 302 at the left of the HTML code, which represents the scope of this statement, spans the entire HTML file. A second-level that begins with the first tag of a tag pair "<head>" 308 and ends with the last tag of the tag pair "</head>" 310 spans a first portion of the HTML file, as indicated by double-headed arrow 312, and a second statement bounded by the first and last tags of a tag pair "<body>" 314 and "</body>" 316 span a second portion of the HTML file, indicated by double-headed arrow 318. By examining the tags within the exemplary HTML file, shown in FIG. 3, and the double-headed indications of the scope of tag-delimited statements, the hierarchical nature of HTML can be readily appreciated.

Figure 4:
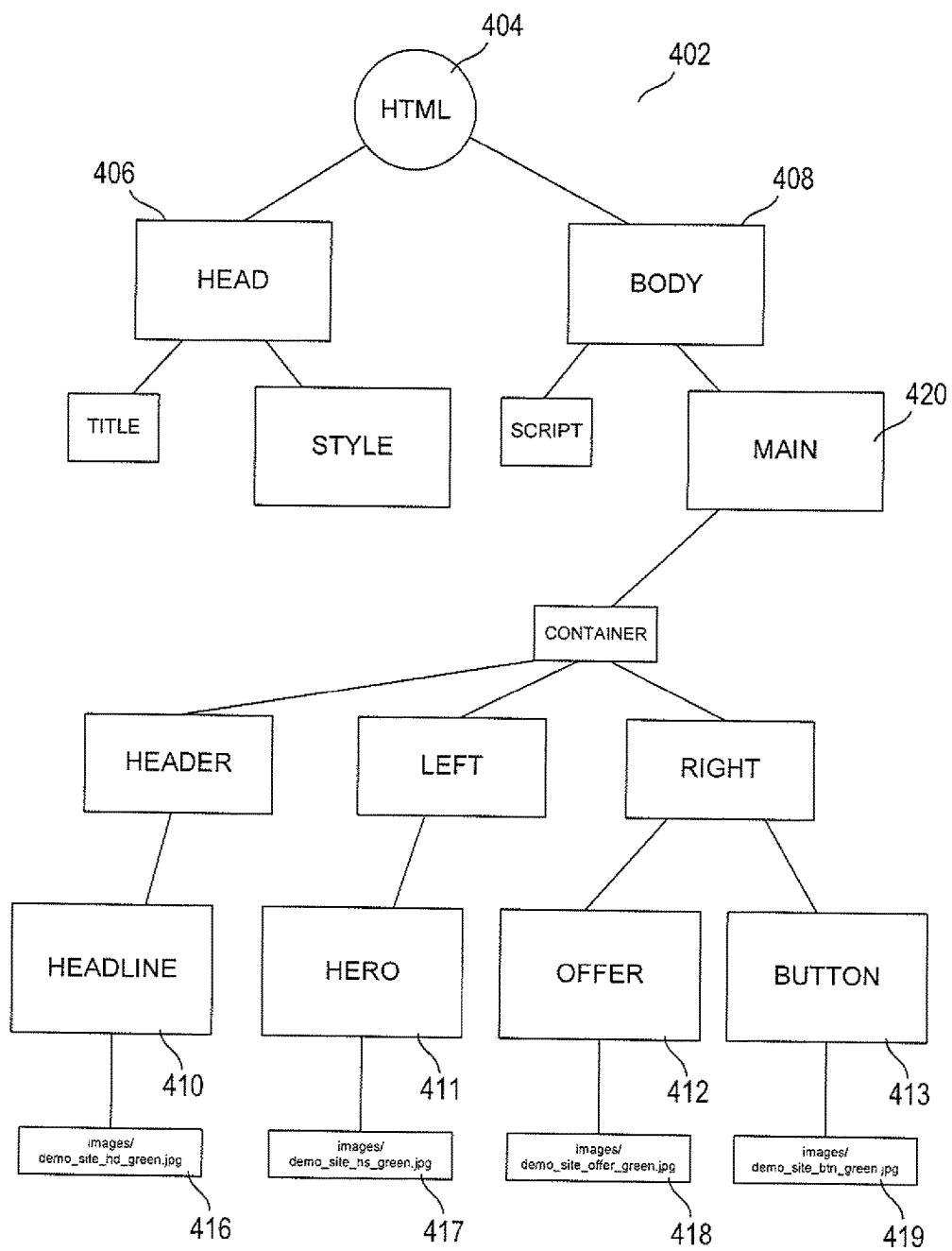
FIG. 4 provides a tree-like representation of the contents of the exemplary HTML file shown in FIG. 3.

FIG. 4 provides a tree-like representation of the contents of the exemplary HTML file shown in FIG. 3. The tree 402 shown in FIG. 4 is constructed from the double-headed arrows that annotate the HTML code, in FIG. 3, that span the scopes tag-delimited statements in the exemplary HTML file. For example, the root node 404 corresponds to double-headed arrow 302, and the second level "head" 406 and "body" 408 nodes correspond to double-headed arrows 312 and 318 in FIG. 3, respectively. Note that, at the very bottom of the tree representation of the HTML file, shown in FIG. 4, the four leaf nodes 416-419 represent the four features 204, 206, 208, and 210 of the displayed web page encoded by the exemplary HTML file, shown in FIG. 2. Each of these nodes is essentially a reference to an image file that contains a jpeg image of the corresponding web-page feature. The head statement, represented by node 406 in FIG. 4, includes formatting information, references to highest-level resource-location directories, and a great deal of additional information that is used by a browser to plan construction of a displayed web page. The body statement, represented by node 408 in FIG. 4, includes references to image files, text, and other features that are rendered by the browser into displayed features of the web page. Intermediate nodes include identifiers, particular met-data information, and references to scripts that are downloaded and run by the web browser during web-page rendering and/or display.

As a specific example, node 416, a direct and only descendant of the node labeled "headline" 410 in FIG. 4, corresponds to the headline feature 204 displayed in the exemplary web page shown in FIG. 2. This node also corresponds to double-headed arrow 320 in FIG. 3. The statement "<img src="images/demo_site_hd_green.jpg" indicates that the displayed object is encoded as a jpeg image "demo_site_offer_green.jpg" that can be found in a file-system sub-directory "images."

In order to transform an HTML file into a displayed web page, a web browser constructs a tree-like binary-encoded data object referred to as a "document object model" ("DOM"). Once a browser has created a DOM from the exemplary HTML file shown in FIG. 3, DOM-editing routines can be used to locate the node in the DOM corresponding to the node "headline" 410 in FIG. 4 and replace or modify that node to reference a different image. Following modification, the web browser would then display a modified web page in which the headline image 204 in FIG. 2 is replaced by a different image. To effect more dramatic changes, an entire subtree of a DOM, such as the subtree rooted by a node corresponding to the node "right" 420, can be removed or replaced, to change groups of display features.

Another feature of the exemplary HTML file shown in FIG. 3 is that the various features displayed in FIG. 2 are, in HTML, wrapped by tag-delimited identifiers. For example, the "wm_headline" tag indicated by double-headed arrow 320 and by node 410 in FIG. 4 is an identifier for the headline-image-reference statement 322. Alphanumeric identifiers, such as the identifier "wm_headline," are introduced into an HTML file in order to give easy-to-understand and easy-to-use labels or handles for various objects, particularly objects that correspond to displayed features in a web page. Although objects can be easily identified in this manner, other methods for identifying objects within an HTML file, as well as corresponding nodes of DOM trees and other such binary representations of a rendered page, can be used to reference display objects.

Figure 5:
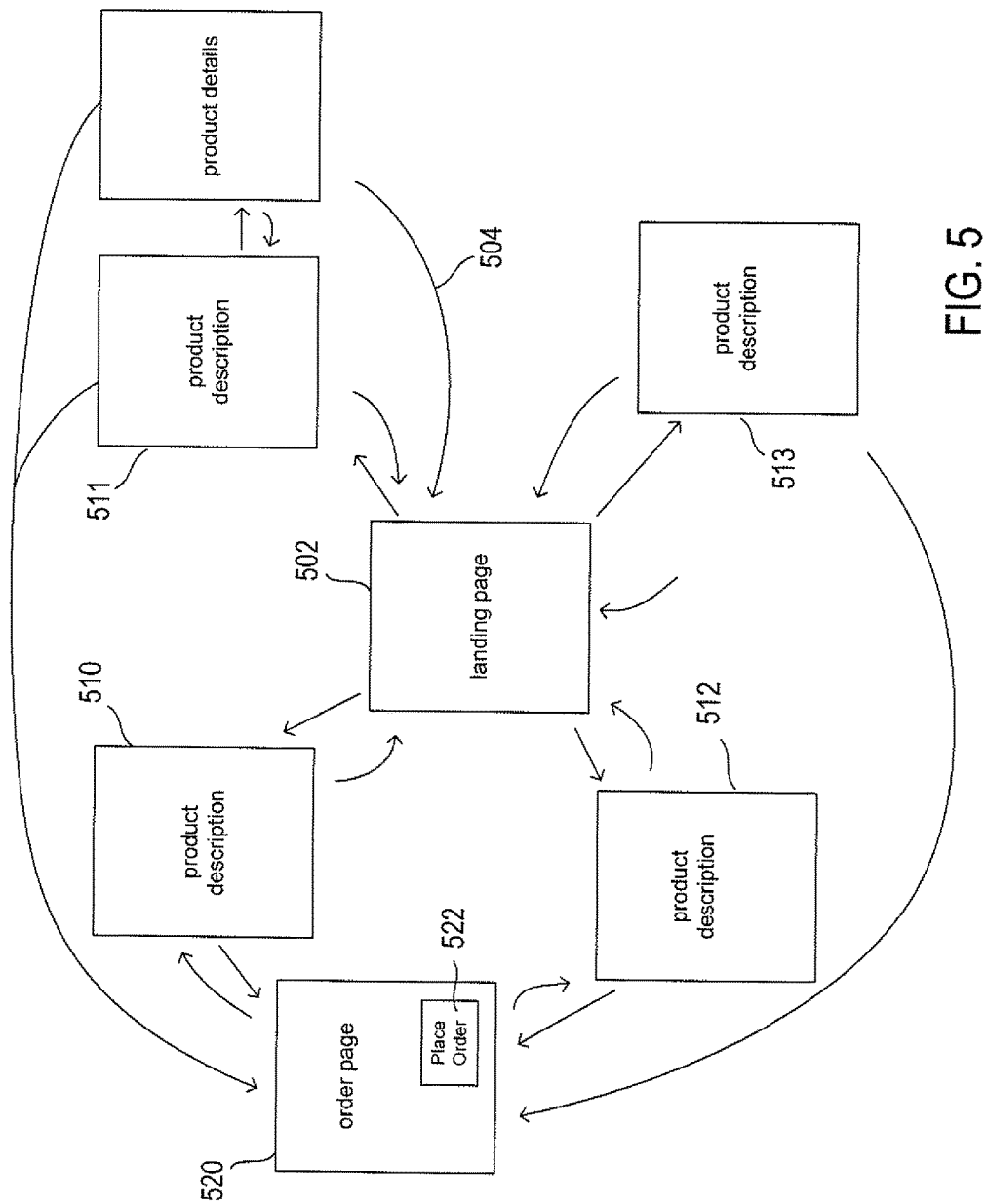
FIG. 5 illustrates a simple web site comprising seven web pages.

FIG. 5 illustrates a simple web site comprising seven web pages. Each web page, such as web page 502, is represented by a rectangle in FIG. 5. Curved arrows, such as curved arrow 504, indicate navigational paths between the web pages. Accessing the web site illustrated in FIG. 5, a user generally first accesses a landing page 502 as a result of clicking a link provided by another web page, such as a web page provided by a search engine, or provided in a list of bookmarked links by a web browser. The landing page is often, but not necessarily, a home page for the website. A home page is a central portal for access to all of the remaining web pages in the web site. In general, a user navigates through the web site by clicking on displayed links embedded in web pages. For example, the web site illustrated in FIG. 5 is a retailing web site. The landing page provides links to four different pages 510-513 that provide product descriptions for four different products. A user, after viewing the landing page 502, may click a link in order to navigate to a display of a product-description page 510. In the exemplary web site shown in FIG. 5, a user may subsequently navigate from a product-description page or product-details page to a central order page 520 that contains a button or feature 522 to which the user can input a mouse click in order to order one or more products. In certain cases, web sites may comprise a single page and, in other cases, a web site may comprise tens to hundreds or more pages, linked together in a network-like graph describing various navigational paths between web pages.

An example application of web-site testing would be to monitor access, by users, of the web pages shown in FIG. 5 in order to attempt to determine how often users end up navigating to the order page and clicking the place-order button 522. One might then modify one or more of the pages, and again monitor users' access to the pages and subsequent input to the place-order button 522. In this way, by testing collective user response various alternative web pages, web-site developers and managers may be able to determine an optimal set of web pages that provides the highest ratio of inputs to the place-order button 522 to user accesses of the landing page 502. In testing parlance, clicking the place-order button 522, in the exemplary web site shown in FIG. 5, is, in this example, considered to be a conversion event. One goal of optimizing the web site might be to increase the percentage of users clicking on the place-order button 522 after initially accessing the landing page 502. However, conversion events may be arbitrarily defined, and there may be multiple conversion events for a particular web site. Optimization of a web site may also involve multiple, often at-least partially contradictory goals. One goal may be to increase the number of accesses to any page other than the landing page by users who have initially accessed the landing page. Another goal may be to increase total accesses to the landing page, regardless of subsequent page accesses by users accessing the landing page. Another goal may be to obtain maximum possible conversion rates, even at the expense of decreasing the overall rate of page accesses.

Figure 6:
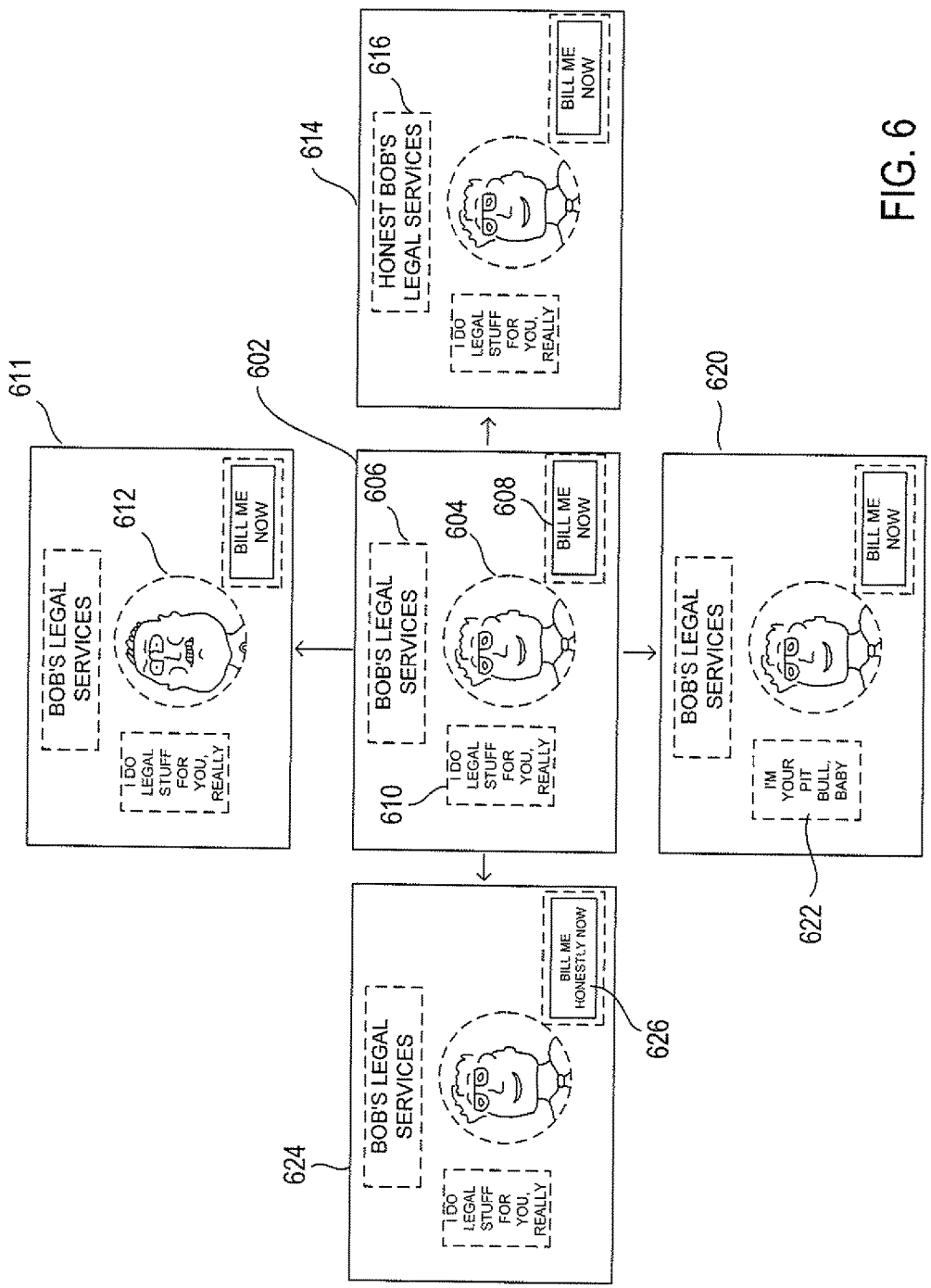

FIGS. 6-7 illustrate factors, factor levels, and test design. In FIG. 6, an initial, prototype web page 602 is shown. A web-site owner or developer may decide to systematically alter the prototype web page in order to test the effects of the systematic alterations, so that alterations that appear to maximize goals can be made to the web page in order to optimize the web page. The prototype web page includes a portrait image 604, a title 606, a user-input feature 608, and an informational message 610. A systematic tester may decide to alter each of these web-page features, one-at-a-time, in order to determine the effects of the altered features on measured user response. For the web page shown in FIG. 6, the measured user response, or conversion event, would likely be user input to the user-input feature 608. As shown in FIG. 6, a tester may devise a first test web page 611 in which the prototype image 604 is replaced with a different image 612. The tester may devise a second test page 614 in which the title feature 606 is replaced with a different title feature 616. Similarly, the tester may devise a third test page 620 in which the informational message 610 of the prototype web page is replaced with a different informational message 622. Finally, the tester may create a fourth test web page 624 in which the user-input feature 608 of the prototype web page is replaced with a differently labeled user-input feature 626. The systematic tester may change a single feature, in each of the four test pages, in order to judge the effect of changing that feature in isolation from any other changes to the web page that might be contemplated. However, the strictly one-feature-change-at-a-time method would fail to provide data for the effects of various combinations of changes, such as changing both the headline and a portrait and, moreover, would require significant developer time and effort.

FIG. 7 illustrates a related approach to the testing approach discussed with reference to FIG. 6. In FIG. 7, the tester has prepared a table of factors and factor levels. Each factor in the table is represented by a column, such as the first column 702 corresponding to factor 1. Each factor is a feature, or group of related features, on a displayed web page that the tester wishes to alter in order to determine whether or not to alter the feature in order to optimize the web page with respect to one or more optimization goals. The various alternatives for each factor are referred to as levels. Thus, for example, factor 1, represented in the table by column 702, corresponds to the information message (610 in FIG. 6), for which the tester has devised six different alternatives, each corresponding to one of six different levels associated with that factor. The tester has devised four alternatives for factor 2, the title feature (606 in FIG. 6), five alternatives for factor 3, the portrait feature (604 in FIG. 6), and five alternatives for the fourth factor, the user-input feature (608 in FIG. 6). Then, having specified the factors, or web-page features, to be altered, and the various different alternatives for each feature, the tester might try generating all possible test pages corresponding to all possible combinations of level values for the factors in order to test the different alternative web pages to determine an optimal set of four levels corresponding to optimal alternatives for the four factors. Unfortunately, an exhaustive, combinatorial test, in most cases, is not feasible. Even for the very simple example of FIGS. 6 and 7, there are 1260 different alternative pages, including the prototype page, which can be constructed by varying between one and four factors according to the variations, or levels, provided in the table provided in FIG. 7. In general, for the statistics collected from testing to have significance, a sufficient number of tests need to be conducted so each of the different test pages is displayed a relatively large number of times during the test. In the example of FIGS. 6 and 7, each different alternative web page among the 1260 possible alternative web pages may need to be displayed hundreds or thousands of times to users in order to accumulate sufficient test data to make valid statistics-based judgments. In many cases, the number of factors and number of levels for each factor may be far larger than in the simple example shown in FIGS. 6 and 7.

The variations of factors, or levels, may include changes in content, display size, display color, object position in the displayed image, or many other different types of changes. Again, as discussed above, a factor may include multiple display features.

Because of the general infeasibility of full, exhaustive, combinatorial testing of all possible web-page variations, certain automated testing systems use an experimental-design method referred to as "the orthogonal-array method." This method devises a non-exhaustive test strategy that nonetheless gathers sufficient, well-distributed test data in order to make reasonable inferences with regard to the effects of altering the factors in all possible ways. In essence, the orthogonal-array method involves devising a sparse sampling of all possible variations of the web page that provides information about the various dependencies between the different levels of the different features. The orthogonal-array method involves specifying the factors and specifying the levels for each factor for a particular test run, and then, based on the factors and levels for each factor to be tested in a particular test run, devises a set of alternative web pages, by varying the specified factors according to the specified levels, that provide a good basis for collecting statistics for the features to be tested. The orthogonal-array method is well known in testing and statistics. Many additional types of test-design methods may also be used. Whatever test-design technique is employed, each test run defined by clients is associated with a test design that controls generation and distribution of experiments, or modified web pages.

Figure 8:
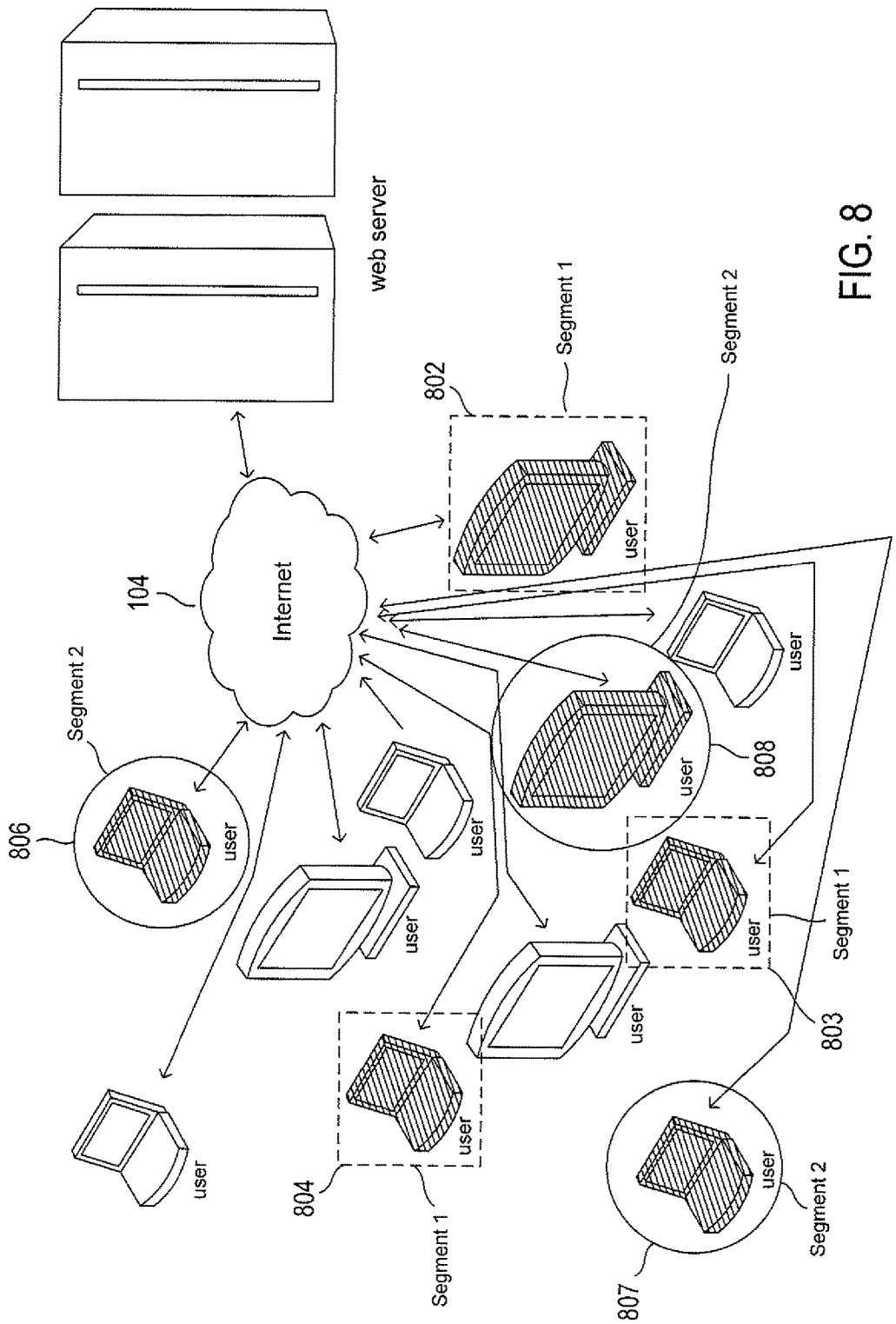
FIG. 8 illustrates the concept of segments in testing of web pages.

FIG. 8 illustrates the concept of segments in testing of web pages. FIG. 8 shows the web server and users of the web server using the same illustration conventions as used in FIG. 1. However, in FIG. 8, a first set of three users 802-804 are marked as belonging to a first segment, segment 1, and a second set of three users 806-808 are marked as belonging to a second segment, segment 2. During live, real-time testing of web sites, alternative versions of web pages are provided to subsets of the total number of users, or customers, accessing the web server. During a particular test run, altered web pages are provided to a specified segment of users. A segment of users, or customers, can be defined by any of a wide variety of different parameters. For example, a segment of users may be defined by the web page or link by which the users or customers navigated to a test page served by the web server. Segments may be defined by time periods, by the Internet domains through which users access the Internet, or by many other different criteria.

Figure 9:
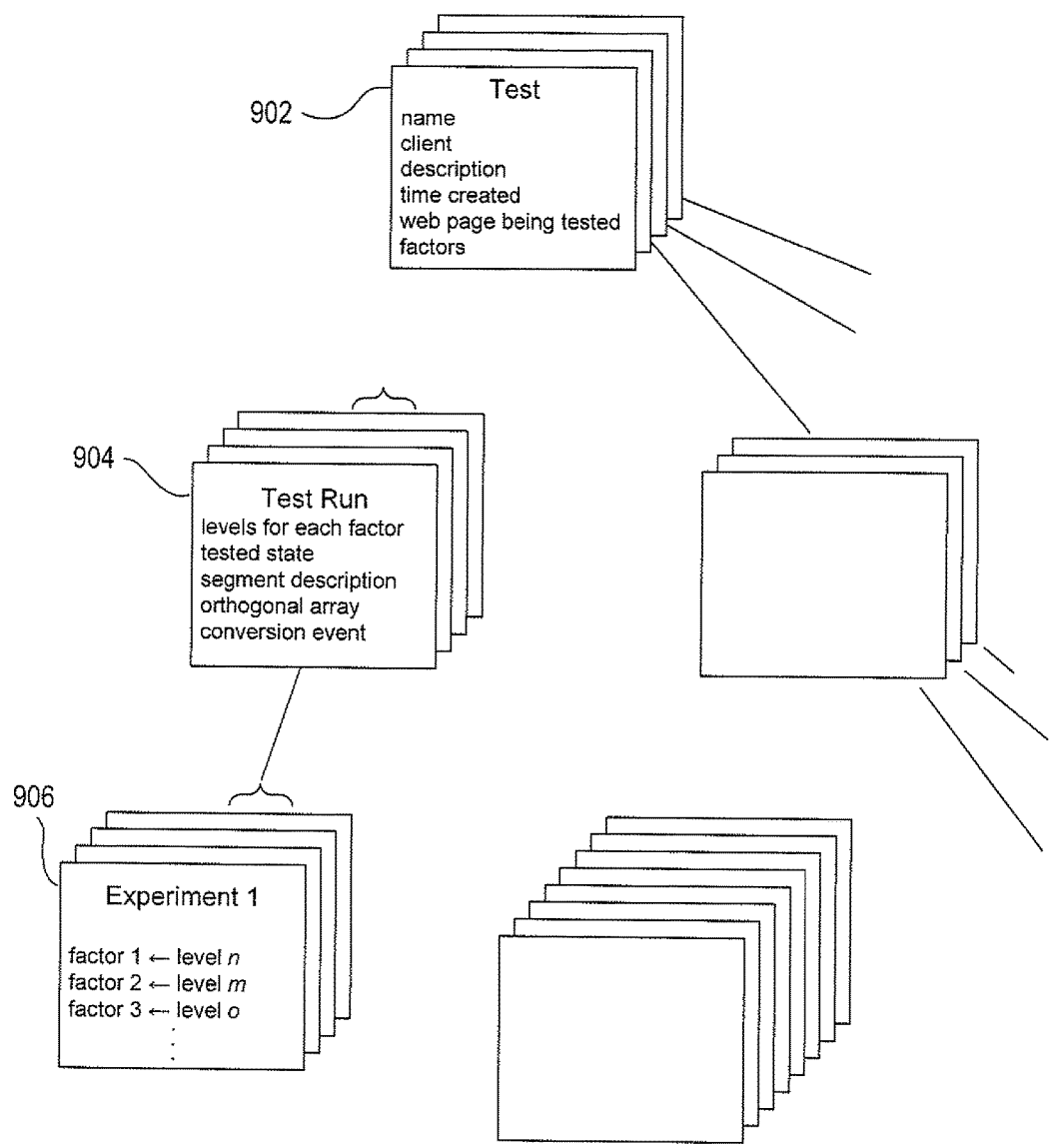
FIG. 9 illustrates the data and data structures that define tests, test runs, and experiments.

FIG. 9 illustrates the data and data structures that define tests, test runs, and experiments. A testing service may, at any given time, carry out a large number of different tests for many different client web-site-based organizations. Each test is defined by a test record, such as test record 902 in FIG. 9. Information contained in the test record includes an alphanumeric name of the test, an identifier for the client on behalf of whom the test has been created, a description of the test, an indication of the time that the test was created, an indication of the web page that is tested by the test, and a list of the factors that may be involved in any particular test run associated with the test. Note that the factors can be specified by the identifiers associated with features or objects displayed in the web page. For example, referring to FIGS. 2-4, a list of factors for a test of the exemplary web page shown in FIG. 2 may include the alphanumeric strings: "wm_headline," "wm_ hero," "wm_offer," and "wm_button."

Any particular test may be carried out over a series of test runs. For example, each test run may be carried out at a different time, with respect to a different segment of users, and may test a different array of features and feature levels. Thus, each test record, such as test record 902 in FIG. 9, may be associated with one or more test-run records, such as test-run record 904 in FIG. 9. Test-run records include information such as the levels to be used for each factor, with the levels specified as URLs, or other references to images and other resources, or as text strings or other data directly displayed by the browser, a current state of the test run, a description of the segment to which the test run is directed, an indication of the particular orthogonal-array basis or other test design for the test run, and an indication of one or more conversion events for the test run. Finally, using the orthogonal-array basis or other test design selected for the test run, a test run is associated with a set of experiments, such as experiment 906 in FIG. 9. Each experiment corresponds to an altered web page that is displayed to users during the test run. An experiment is essentially defined by associating each factor, tested in the test run, with a particular level, or referenced resource, according to a matrix of test pages generated by the orthogonal-array basis or other test design selected for the test run.

Figure 10:
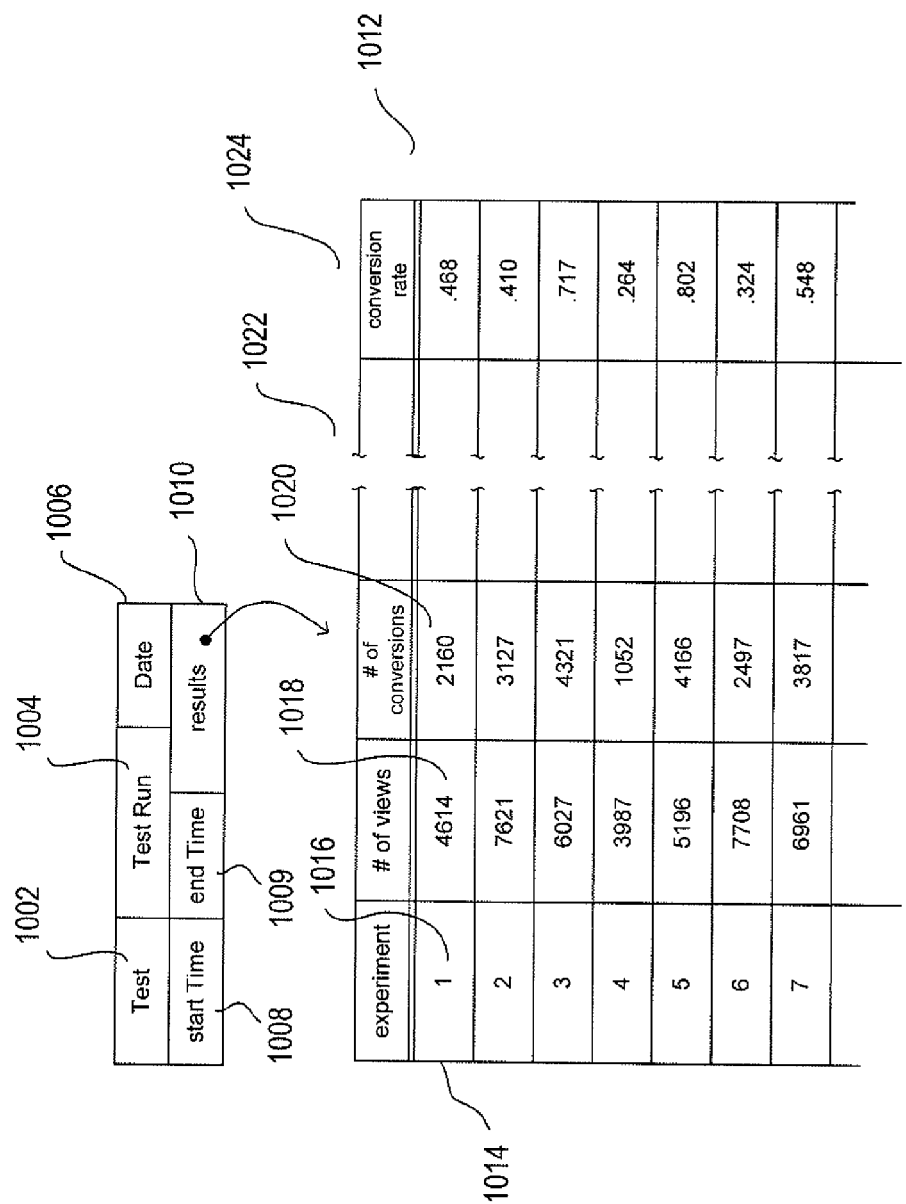
FIG. 10 illustrates the nature of the statistics, or test results, that are collected for a particular test run.

FIG. 10 illustrates the nature of the statistics, or test results, that are collected for a particular test run. The results include indications of the test 1002 and test run 1004, the date on which the test run was conducted 1006, a start time and an end time for the test run 1008-1009, and a reference 1010 to a results table 1012 in which test results are tabulated. The test results table includes a row for each experiment associated with the test run, such as row 1014 in experimental-results table 1012. The row includes an indication of the experiment to which the row corresponds 1016, a count of the number of the times that the page corresponding to the experiment was accessed by a user of an active segment 1018, an indication of the number of times that a user who accessed the test page generated a corresponding conversion event 1020, other similar numerical information in additional columns 1022, and, finally, a computed conversion rate 1024 for each experiment. The test results shown in FIG. 10 are but one example of the type of statistics and data that can be collected during a test run.

There are many different possible ways of testing a web server in order to accumulate test results, discussed above with reference to FIG. 10, for tests defined for particular web pages and factors associated with those web pages, as discussed above with reference to FIG. 9. One method would require the web server to design a test by creating all or a subset of possible alternative test pages and to then develop a test-page-serving system that would execute concurrently with, or as part of, the web server on an intermittent or continuous basis. As discussed above, testing methods and systems that require the web server to develop and run tests may be prohibitively expensive, both in time and resources, for web-site owners or web-site-based organizations. Furthermore, such testing methods can inadvertently cause serious financial losses and other non-financial damage to a web site. For example, were the test pages improperly constructed or served, sales or other activities generated by real-time users may be lost and, in worst cases, the web site could potentially lose business from particular customers and users altogether. Real-time testing additionally involves significant security risks. A malicious hacker or employee might be able to alter the test system to display fraudulent or offensive test pages, for example. Finally, similar to problems encountered in a variety of physical and behavioral systems, poorly or improperly design tests may so perturb the system being tested that the statistics collected from the tests are meaningless or, in worst cases, lead to false conclusions. For example, a poorly designed test engine may introduce significant delays in web-page service to customers or users. As a result, the conversion rate measured during a test run may fall precipitously, not because of particular alterations made to test web pages, but instead because the significant time delay encountered by users for whom the test page is constructed and to whom the test web page is transmitted. For these, and many other reasons, web-site-based-organization test design and execution can be undesirable and, in worst cases, disruptive and damaging to the web-site-based organization.

An alternative approach to testing involves using a third-party testing service, in tandem with the web server that serves the web site to be tested. However, simply conducting tests by a third-party server does not guarantee that the many pitfalls and disadvantages discussed above with respect to web-site-based-organization test design and execution are necessarily avoided. In fact, in many cases, the pitfalls and disadvantages discussed in the preceding paragraph may be exacerbated by third-party testing of web sites and web servers. For example, in the case that a test web page, requested by a customer, needs to be prepared by the third-party server, in response to a request generated by the web site as a result of a user request for the web page being tested, test-page serving may be significantly delayed, deleteriously perturbing the users' interaction with the web server to the point that the test statistics end up meaningless or misleading. As another example, security issues may be compounded by distributing testing tasks between a web-server computer system and a third-parting testing server. Automated testing systems may employ an array of techniques and features that address these pitfalls and disadvantages, and that provide minimally intrusive and cost-effective testing for web sites and web servers.

Figure 11:
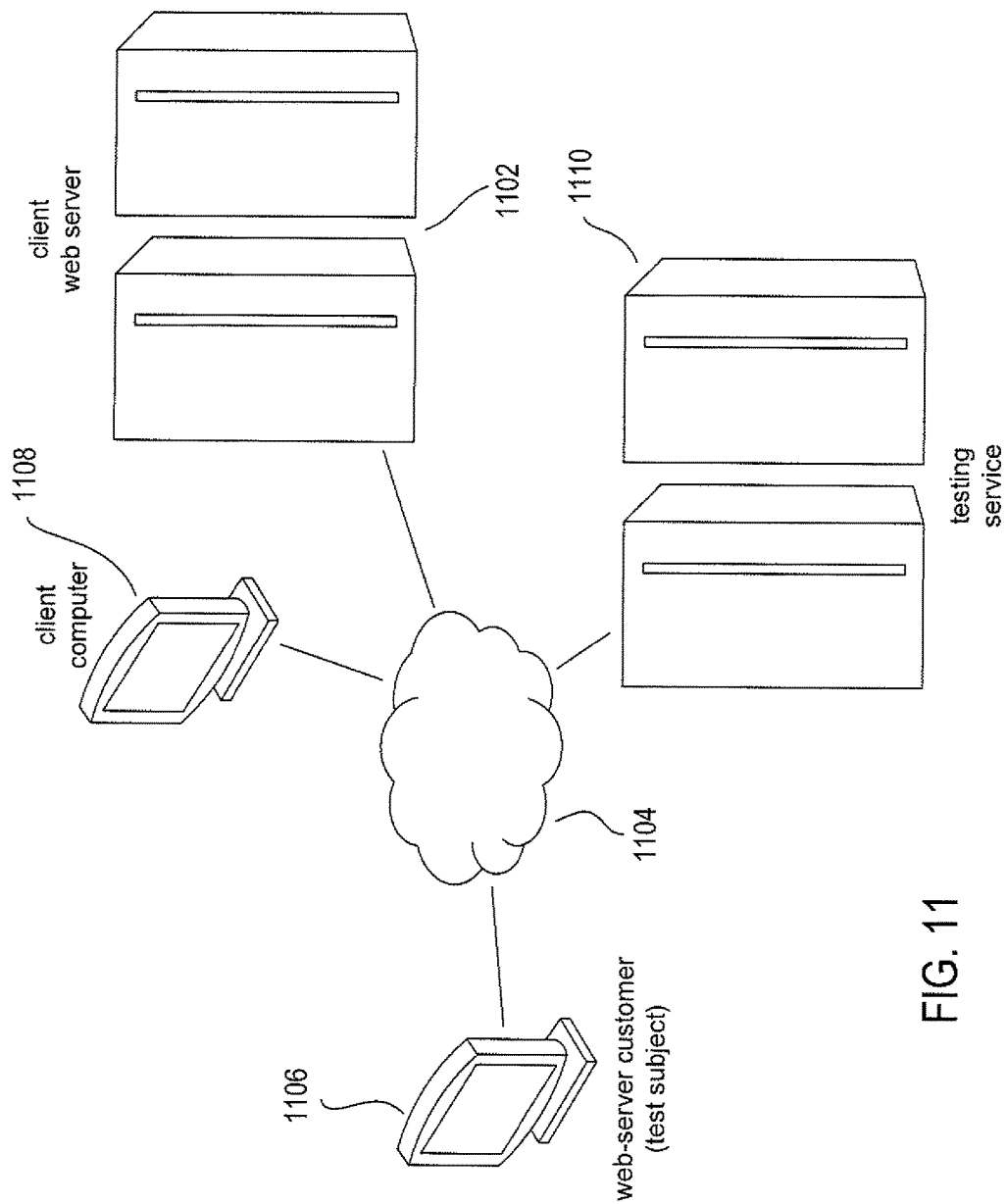
FIG. 11 illustrates an automated testing environment.

FIG. 11 illustrates an automated testing environment. In FIG. 11, the web site 1102 is represented as one or more servers or large computer systems that serve web pages through the Internet 1104 to a generally large number of web-site users or customers, including user 1106. The web site or web server is regarded, in the following discussion, as a client web server of the testing service. The client web server also includes a client computer 1108 by which the client web-server-based organization can access various third-party services and web servers through the Internet. Finally, a web-site testing service is provided by a distinct server or servers 1110 accessible to the client web server 1102, the web server customer 1106, and client computer 1108 via the Internet 1104.

The testing service is used by the client web-site-based organization, referred to as the "client," below, to design and run real-time, live tests of web pages provided by the client web server to users. A testing service may run on the same computer systems as the client web server. In general, the testing service is geographically distinct from the client web server, and is concurrently used by multiple, different clients for concurrently executing many different test runs on behalf of the multiple clients.

FIGS. 12A-H illustrate a general method and system for web-site testing. FIGS. 12A-H all use the same illustration conventions, in which large rectangles represent the four entities shown in FIG. 11.

Figure 12A:
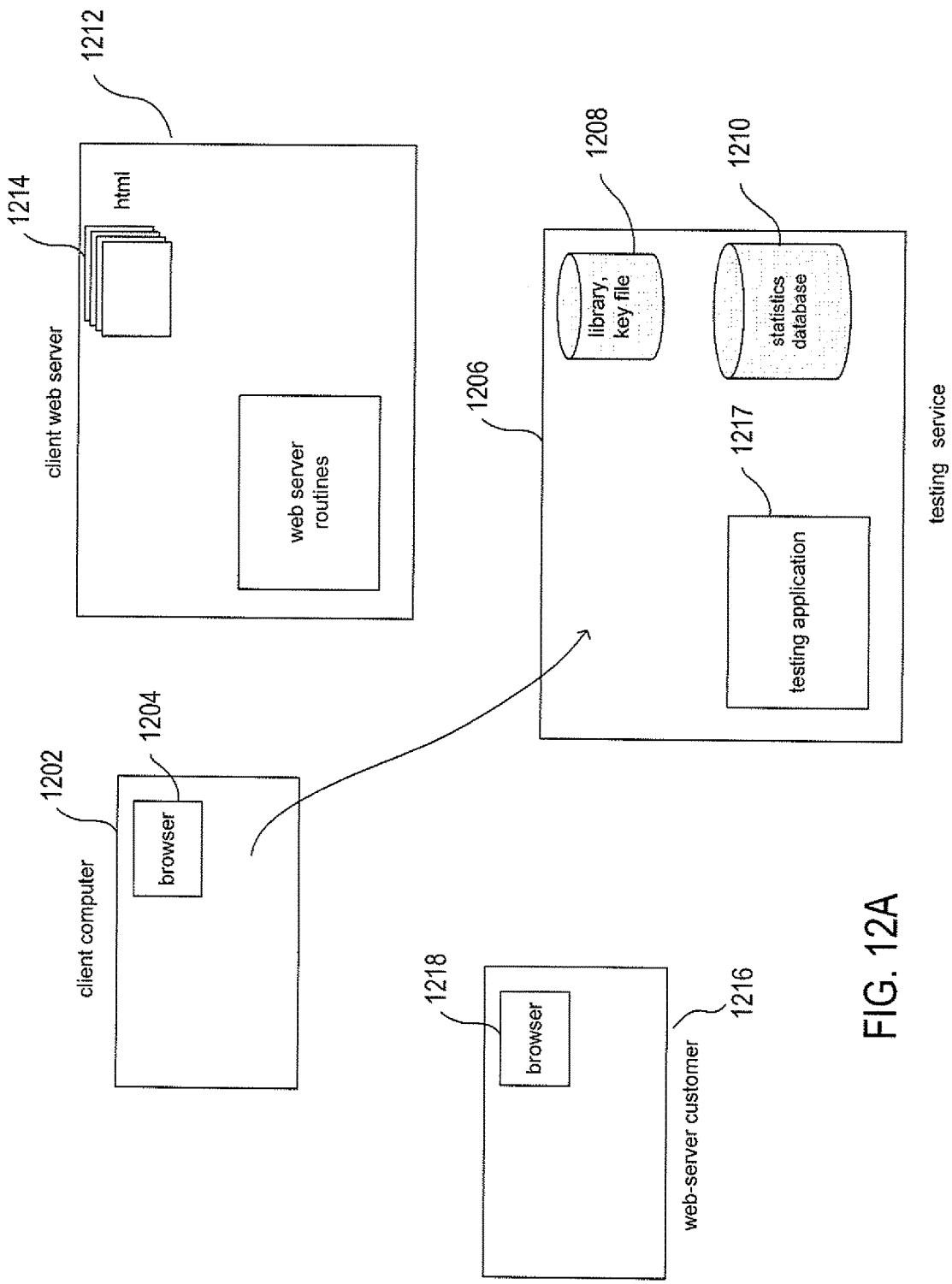
FIGS. 12A-H illustrate a general method and system for web-site testing.

A client establishes a relationship with the testing service, as shown in FIG. 12A, by accessing the testing service through a browser executing on the client computer. As shown in FIG. 12A, an employee or owner of the client web server uses the client computer 1202 to access a testing-service web site, via a browser 1204 running on the client computer, which allows the client web server to register as a client of the testing service. The testing service 1206 includes one or more databases 1208 and 1210 that store information used to construct library and key files that are downloaded to client web servers, store statistics collected during testing, and store various different data objects and records that describe clients, tests, test runs, experiments, and other data used to conduct web-site testing. The client web server 1212 serves a number of different web pages described by HTML files 1214 to users, represented by user 1216 who access the web pages served by the client-web server through a browser 1218 running on the customer computer 1216. The testing service and client web server additionally include web-server engines, application programs, and other components of servers and computer systems (1215 and 121 in FIG. 12A).

Figure 12B:
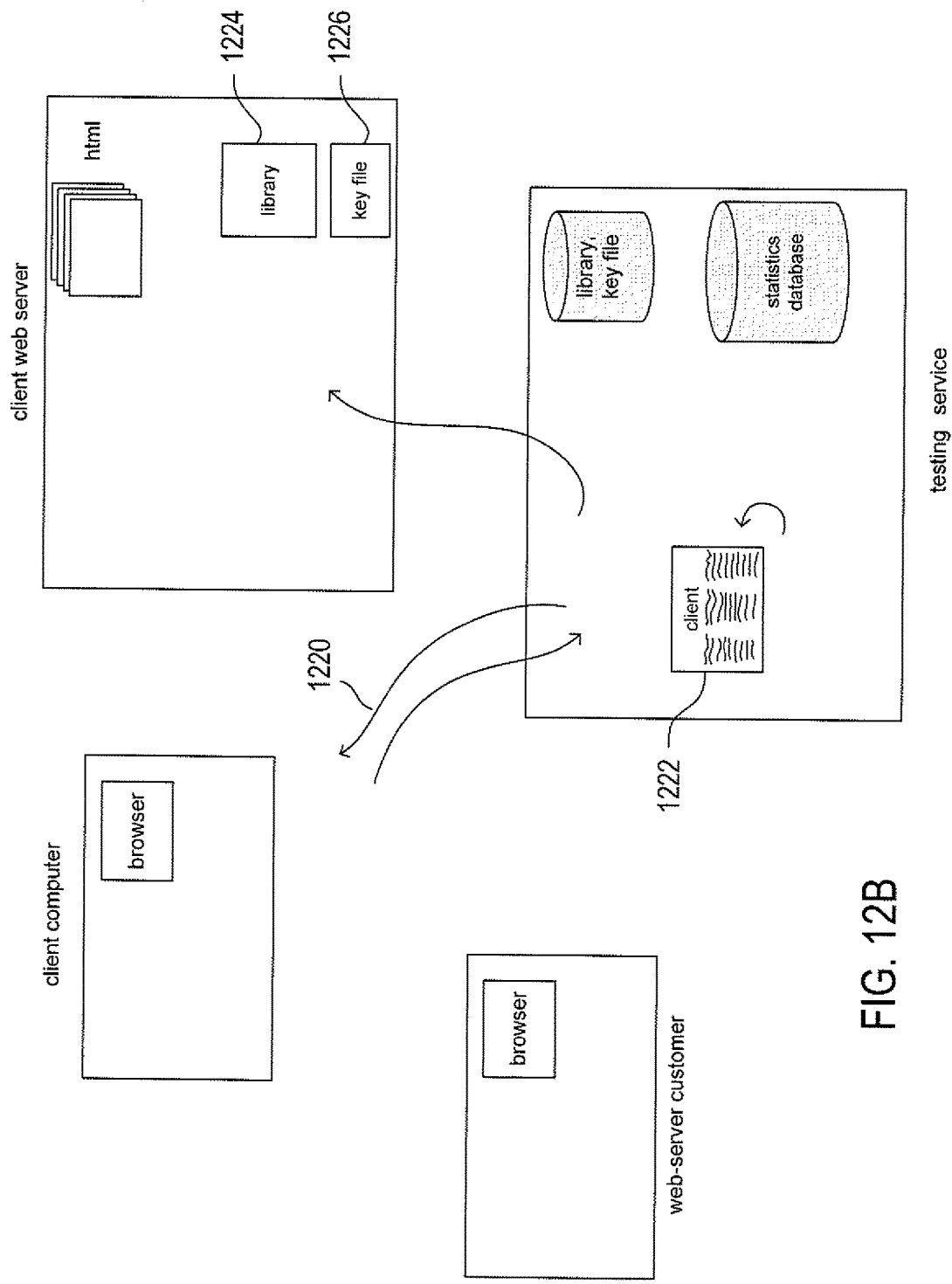

As shown in FIG. 12B, the client carries out a dialog 1220 with the testing service in order to provide the testing service with information about the client that allows the testing service to prepare a client record or records 1222 that describe the client and to store the client record or records in the database. In addition, the testing service may undertake various authorization and authentication steps to ensure that the client web server is a valid web server and that the client can transmit remuneration for testing services to the testing service. As part of client initialization, the testing service prepares a script library 1224 and a key file 1226 that the testing service downloads to the client web server. The script library 1224 includes routines that are called by client-web-server users during web-site testing. This library is referred to as a "script library" because script routines are often provided to browsers for execution. The key file 1226 includes cryptographic information that ensures that all information exchanges that occur between client users and the testing service are secure.

Figure 12C:
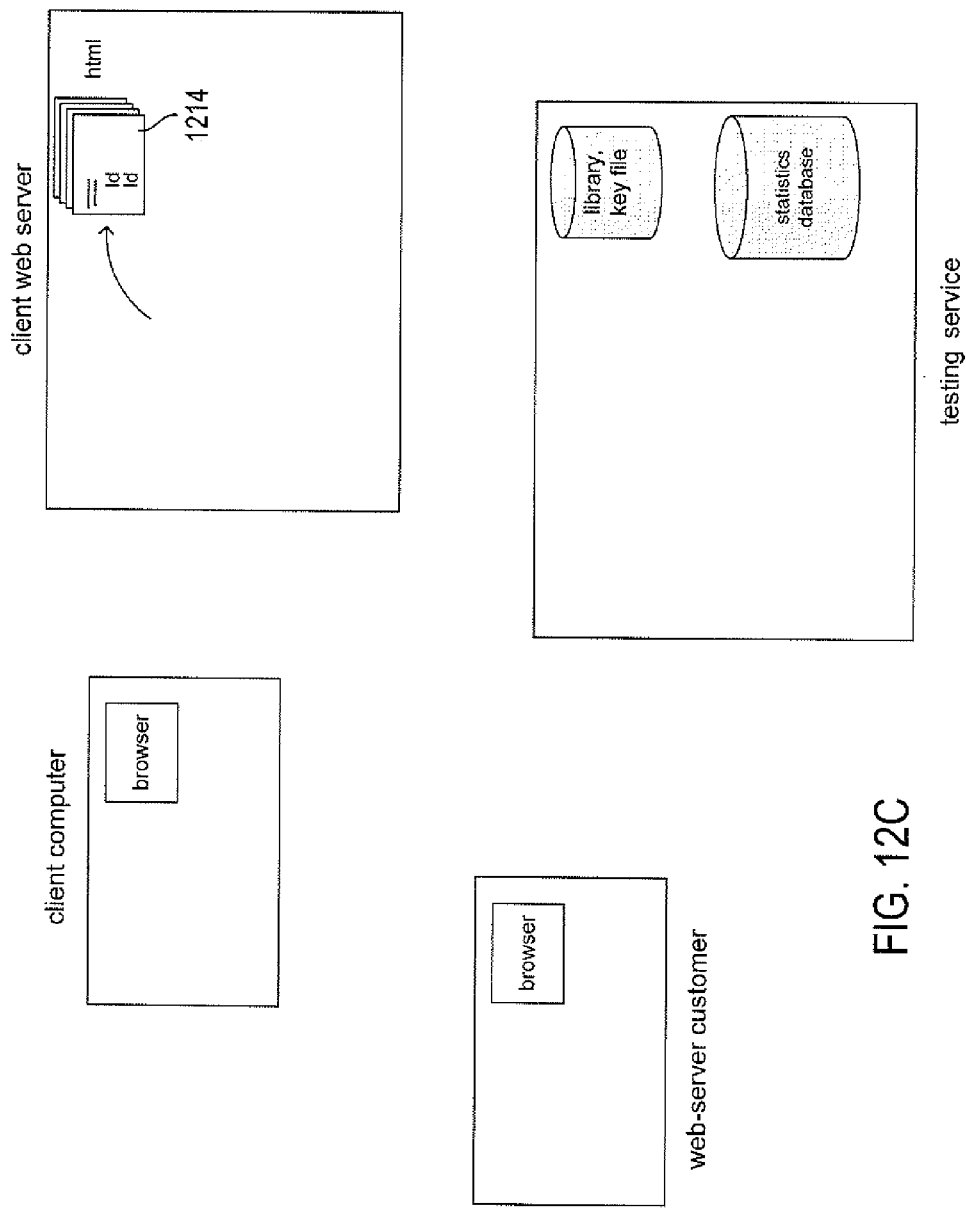

As shown in FIG. 12C, following client initialization, the client modifies any of the HTML encodings of web pages that may be altered during testing of the client-web server by the testing service. The alternations are minimal. To each HTML file that encodes a web page that may be tested, the client generally adds only two single-line statements and, in the case that display objects are not associated with identifiers, as discussed above with reference to FIG. 3, the client web server provide identifiers for each of the objects that may be specified as factors for testing of web pages. The single-line statements are generally identical for all client web pages, greatly simplifying the web-page modification carried out by the client. The first statement results in downloading of a script library from the client web server, and the second script launches one or more information exchanges between the testing server and user computer. In the case that a conversion event is tied to a specific user-activated display device, such as a button, a call to a conversion script is inserted into the HTML file, so that user activation of the user-activated display device generates an information-exchange transaction with the testing service corresponding to a conversion event. As discussed above, these may be the HTML identifiers discussed with reference to FIG. 3, or other types of identifiers. In many cases, simple changes to the HTML files can be automatically carried out by a script or by routines provided by a content-management-service application-programming interface.

Figure 12D:
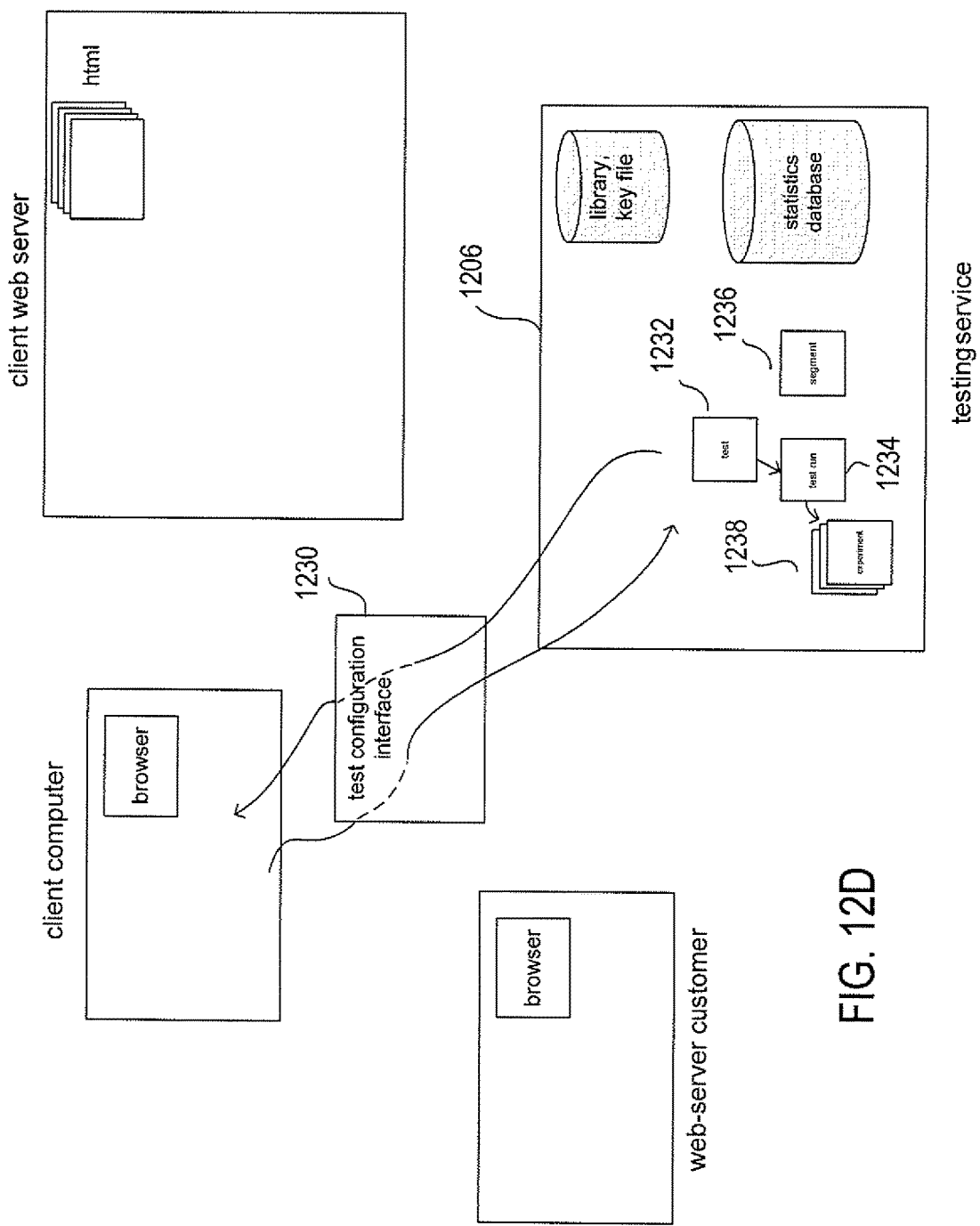

Following client initialization and modification of the HTML-file encodings of web pages that may be subsequently tested, the client can configure and run tests through a test-configuration interface provided as a website by the testing service to clients, as shown in FIG. 12D. The test configuration interface 1230 allows the client computer to define tests 1232, specify and modify already-specified test runs 1234, and specify segments 1236, and, using client-supplied test and test-run specifications, the testing service generates the experiments 1238 associated with each test run. All of the test, test-run, and segment information is stored in records associated with a reference to the client in one or more databases within the testing service. The test-configuration interface 1230 additionally provides run-time information to the client web server and allows the client web server to launch trial runs and test runs.

When a client web server has created a test and launched a test run for the test, the testing service provides modifications of the tested web page to users of the client-web-server during the test in order that the users receive altered web pages that constitute test experiments, and the testing service collects statistics based on users' access to web pages under test. This process is next described, with reference to FIGS. 12E-G.

Figure 12E:
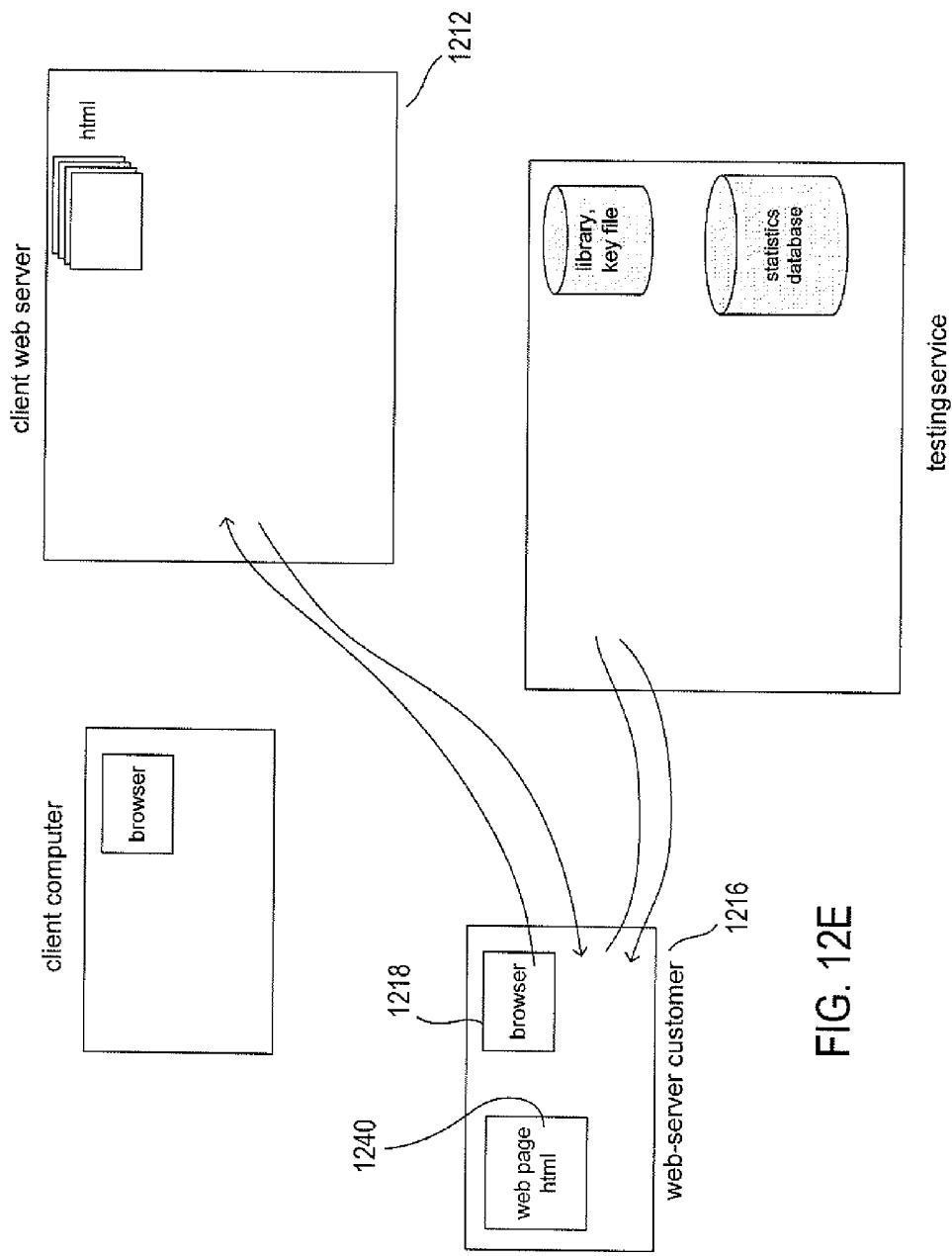

When a client-web-server user 1216 accesses a test web page, the client-web-server user sends an HTML-file request through the Internet to the client web server 1212, as shown in FIG. 12E, which returns the requested HTML page to the client-web-server user 1216 for rendering and display by the browser 1218 executing within the user's computer. As the browser begins to process the HTML file, the browser encounters a statement 1240 that causes the browser 1218 to request the script library from the client web server. When the script library is downloaded by the client web server, the HTML file is modified, on the user computer, to launch an additional information exchange with the testing service to download additional library routines from the testing service. This additional information exchange is carried out only when the web page being processed is an active test page, the user computer is a valid test subject for an active test, and the additional library routines are not already cached in the user computer's browser. Insertion of the library-routine-fetch statement is one of the two modifications to the HTML files corresponding to tested web pages made by the client.

Figure 12F:
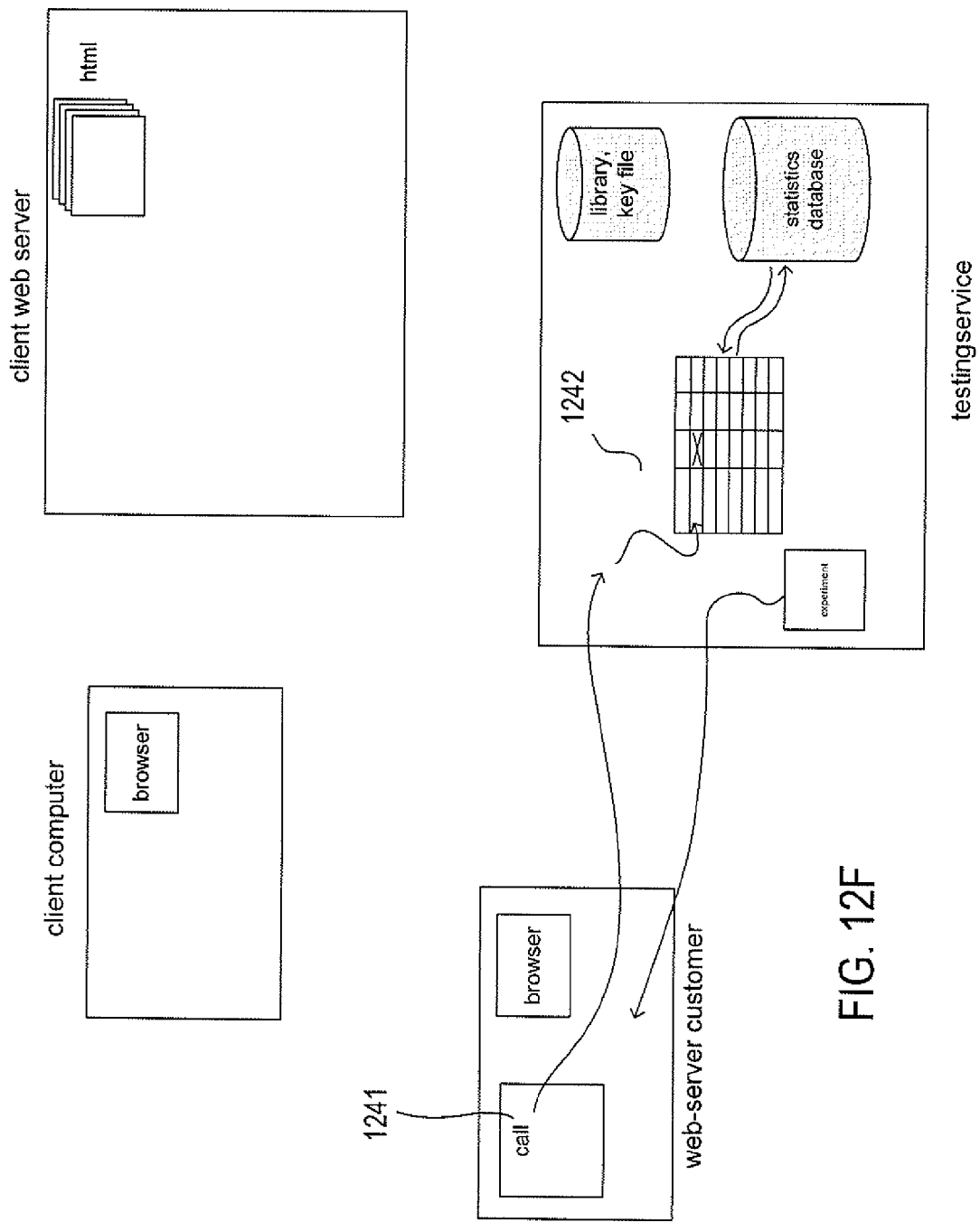
Figure 12G:
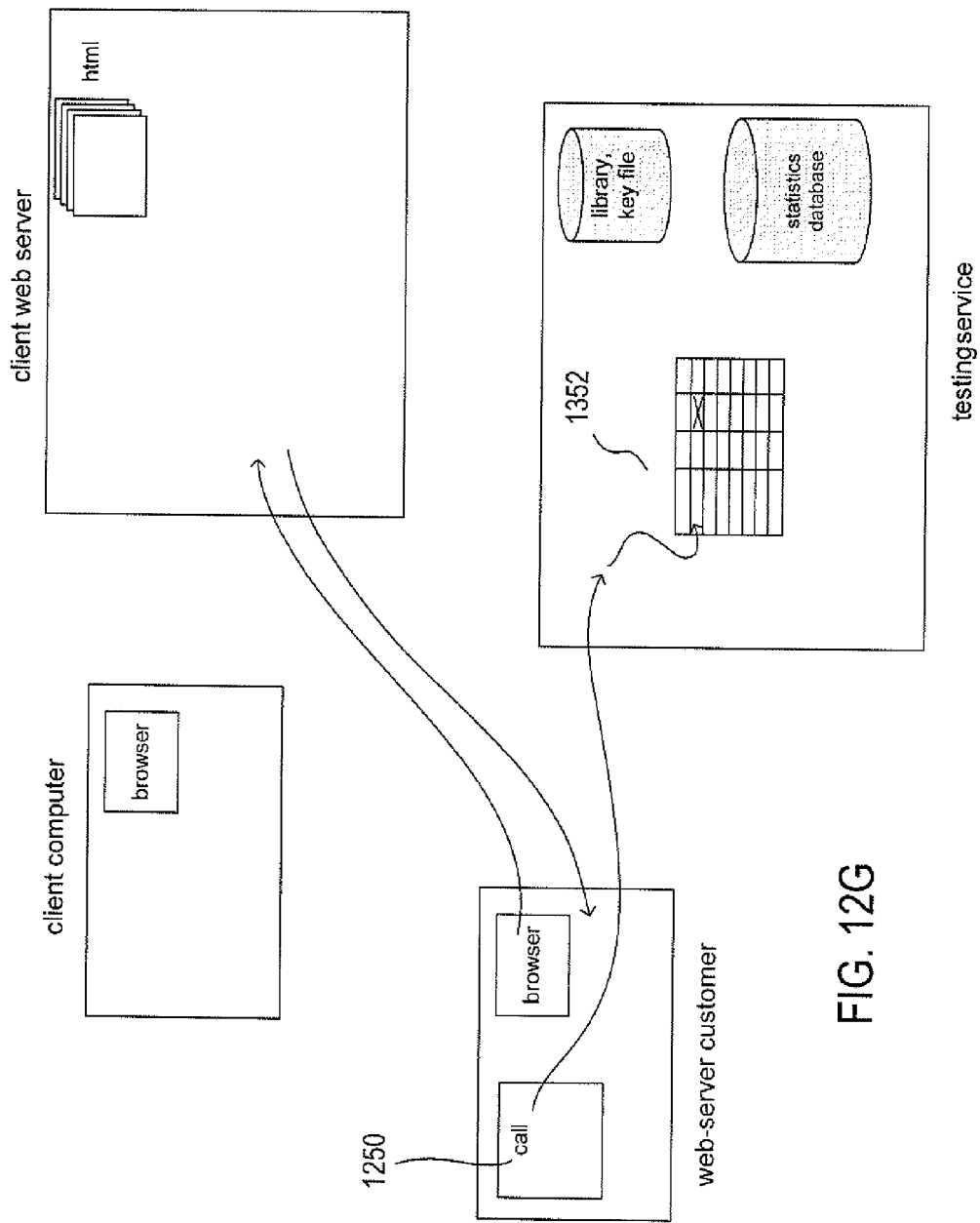

Next, as the browser continues to process the HTML, as shown in FIG. 12F, the browser encounters a call to the library routine "WM.setup" 1241. When executed by the browser, WM.setup initiates one or more information exchanges with the testing service during which the testing service can access cookies and other information associated with the web page on the user's computer, and the user computer receives web-page modifications from the testing service. Cookies can be used, for example, to ensure that a test subject who repeatedly accesses a landing page receives the same experiment, or test page, each time. Only when the web page being processed by the user computer is an active test page, and the user computer is an active test subject, are web-page modifications returned to the user computer by the testing service, and information uploaded by the testing service from the user computer. When this web page and user are validated, the testing service records the page accessed by the user, an identifier of the user, and a time of access in one or more database entries 1242 and returns a snippet, representing one or more nodes or sub-trees of the DOM corresponding to the web page, to the user computer, which modifies the DOM constructed by the browser to incorporate the snippet downloaded by the testing service to the user. In other words, the testing service downloads modifications that transform the web page downloaded by the user to a particular altered web page representing an experiment. Thus, following the information transaction illustrated in FIG. 12F, the user's browser alters the DOM and displays, to the user, the altered web page corresponding to an experiment as part of the test run. The snippet is constructed or retried by the testing service based on the orthogonal-array test basis or other test design. The stored test design defines the experiments, from which the testing service selects experiments for provision to users in order to obtain a well-distributed sampling of experiments during the test. Subsequently, as shown in FIG. 12G, should the user download a page, or invoke a feature on a page, corresponding to a conversion event, the user's browser, in processing the HTML file, encounters a library call 1250 that results in an information transaction between the user and testing service. The testing service checks to ensure that the web page is a valid conversion page for an active test, that the user is a valid test subject. When all of these tests are valid, the conversion event is recorded 1352 for the experiment by the testing service.

Figure 12H:
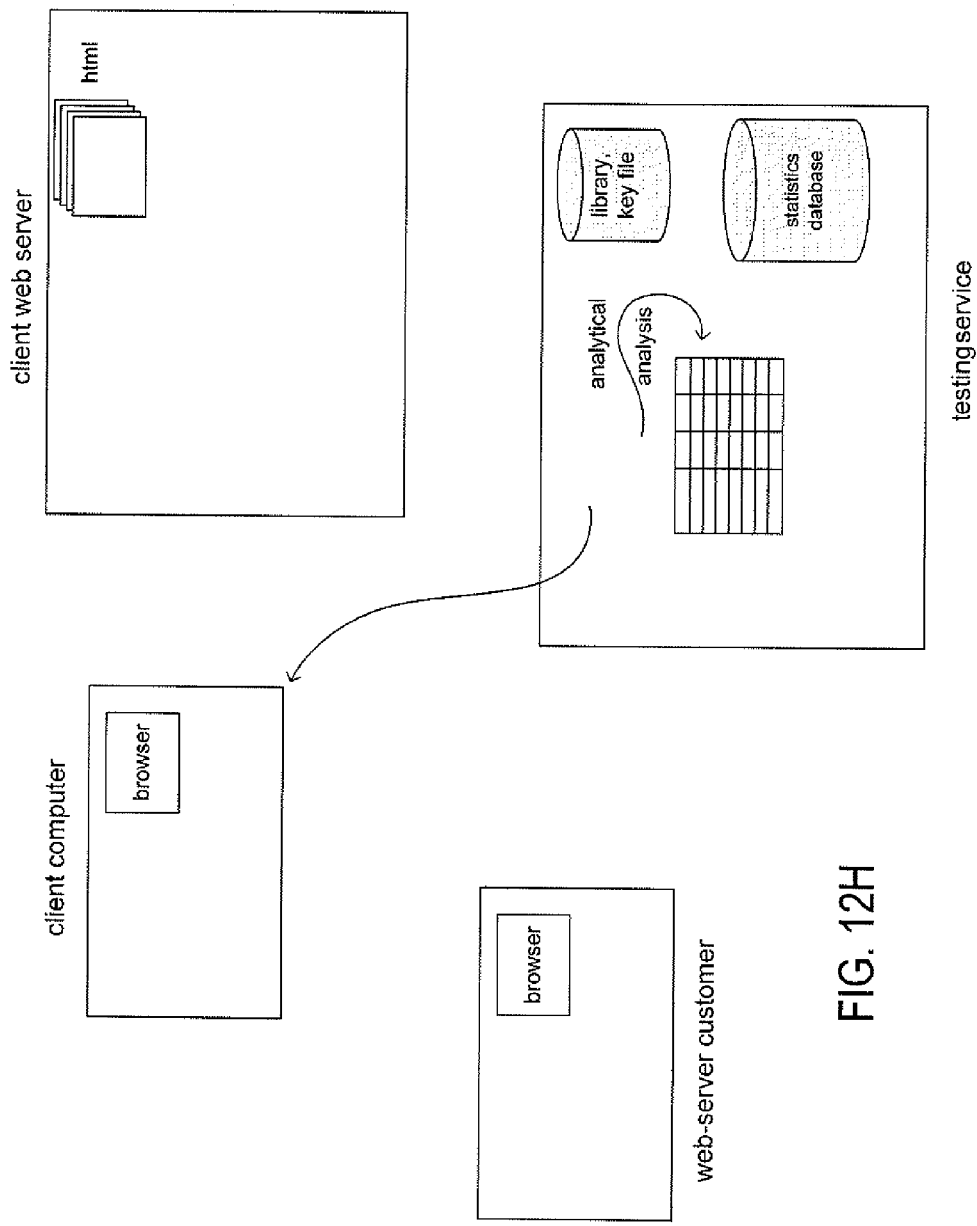

Finally, as shown in FIG. 12H, when the testing service has collected sufficient data to consider the test run to be complete, the testing service changes the status of the test run to complete, and may then undertake analysis and reporting of the test results. The test results may be automatically returned to the client web server, or may be subsequently returned, on demand, when the client checks the status of the test run and determines that the test run has been completed.

Figure 13A:
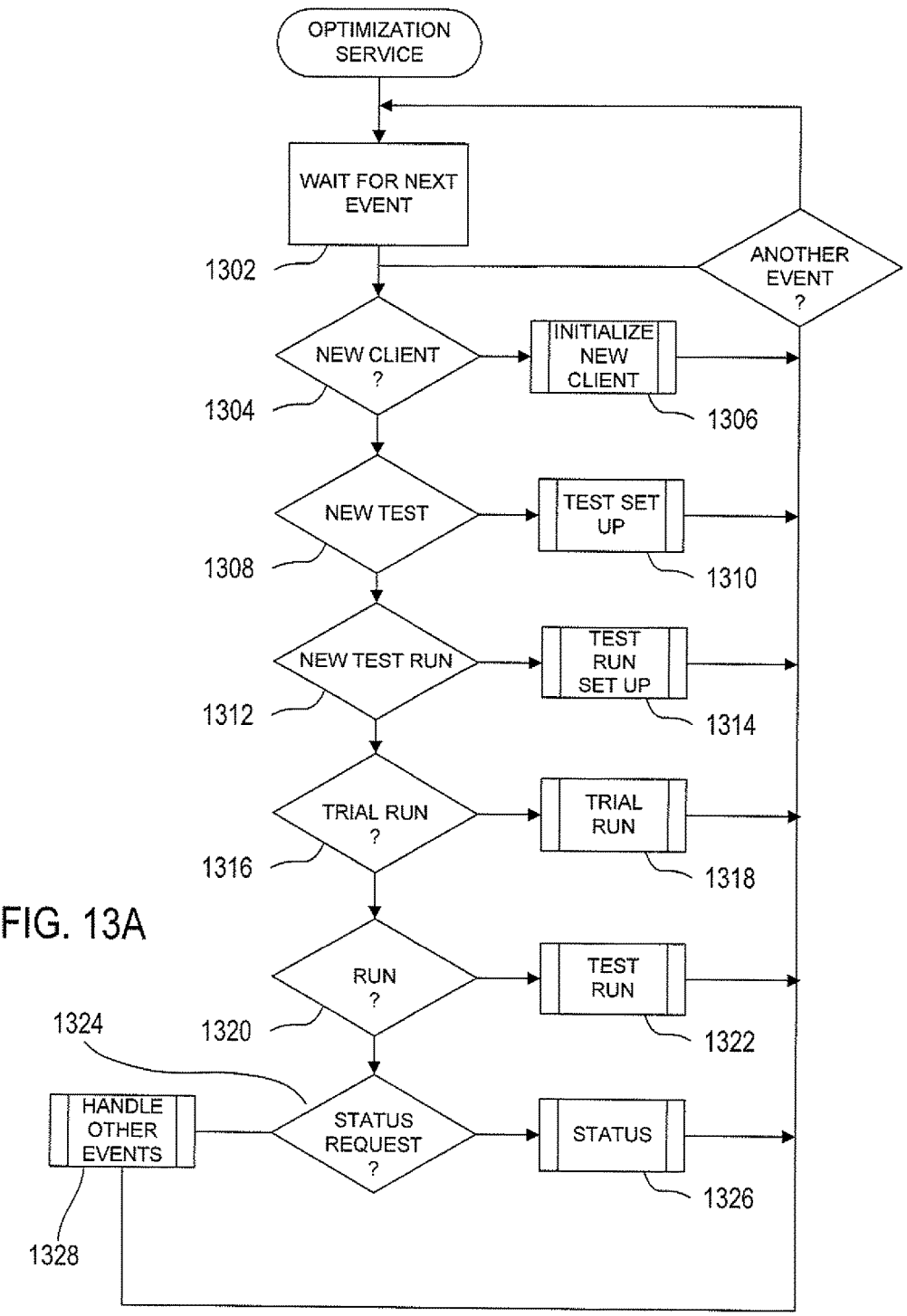
FIGS. 13A-H provide control-flow diagrams for a web-site testing service.

FIGS. 13A-H provide control-flow diagrams for a website testing service. FIG. 13A provides a high-level event loop carried out by the testing service on behalf of one or more clients. In step 1302, the testing services waits for a next client-generated event. When the event corresponds to access of the testing-service website for registration by a new client, as determined in step 1304, the routine "initialize new client" is called in step 1306. When the event is a request to construct a new test by an already-registered client through the test-configuration interface, as determined in step 1308, the routine "test setup" is called in step 1310. When the event is a request to configure a new test run, as determined in step 1312, the routine "test run setup" is called in step 1314. When the event is a request to launch a trial run, as determined in step 1316, the routine "trial run" is called in step 1318. When the event is a request to launch a test run, as determined in step 1320, the routine "test run" is called in step 1322. When the event is a status, information request, or information-update request, as determined in step 1324, then the routine "status" is called in step 1326. For example, a client can obtain test-result information during a test run, and can additional obtain analysis results following completion of a test run. Any of various additional types of events are handled in a default event handler in step 1328. Additional events include log-ons to the testing service web site by registered clients, during which clients are authorized and authenticated.

Figure 13B:
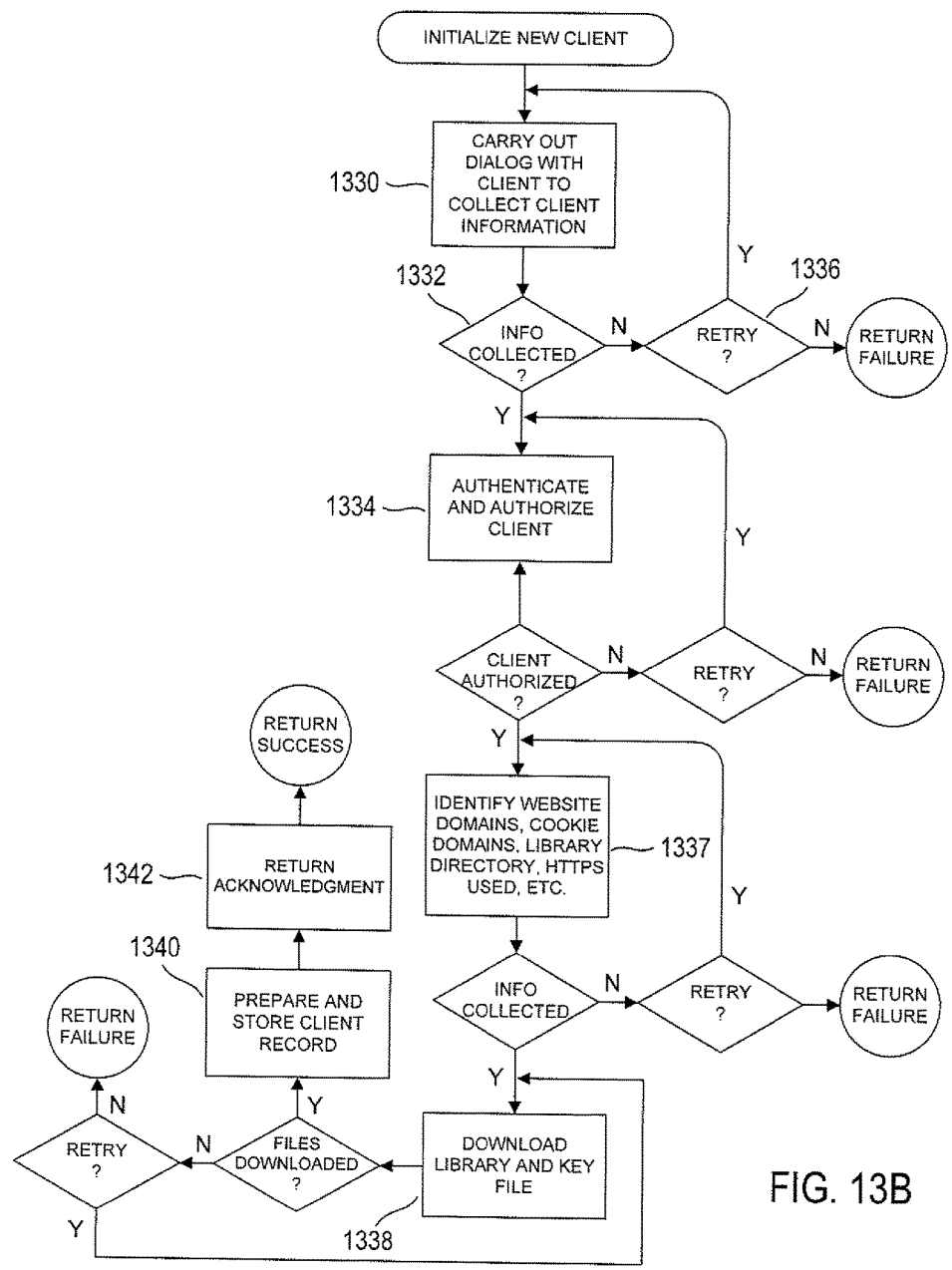

FIG. 13B provides a control-flow diagram for the routine "initialize new client" called in step 1306 of FIG. 13A. In step 1330, the testing service carries out a dialog, through the testing service web site interface, with a prospective client in order to collect information about the client. This information may include the client's name, address, billing address, web site URL, and other such information. If all needed information has been collected through this dialog, as determined in step 1332, then the testing service proceeds to authenticate and authorize the prospective client, in step 1334. Otherwise, as with most of the steps carried out by the testing service during dialogs with clients of the testing service, the testing service may elect to retry a previous step, as determined in the current case in step 1336, in order to make an attempt to acquire the remaining needed information or, in certain cases, may simply return an error message and fail. Once a client has been authorized, the testing service, in step 1337, either through a dialog or via automated methods, determines the web site domains and cookie domains of the client web server, and obtains, from the client, specification of a file-system location at which to download to the client web server the library and key files. In addition, the testing service determines whether or not to use a secure protocol when communicating with client-web-server users and any other information needed for executing tests. Then, in step 1338, the testing service creates and downloads the script library and key files to the client web server. In step 1340, the testing service prepares and stores one or more client records that describe the client and provide a basis for further interactions with the client and, finally, in step 1342, return an acknowledgement to the client. In an actual testing service system, client initialization may contain many additional steps, and may involve solicitation and acquisition of many additional different types of information.

Figure 13C:
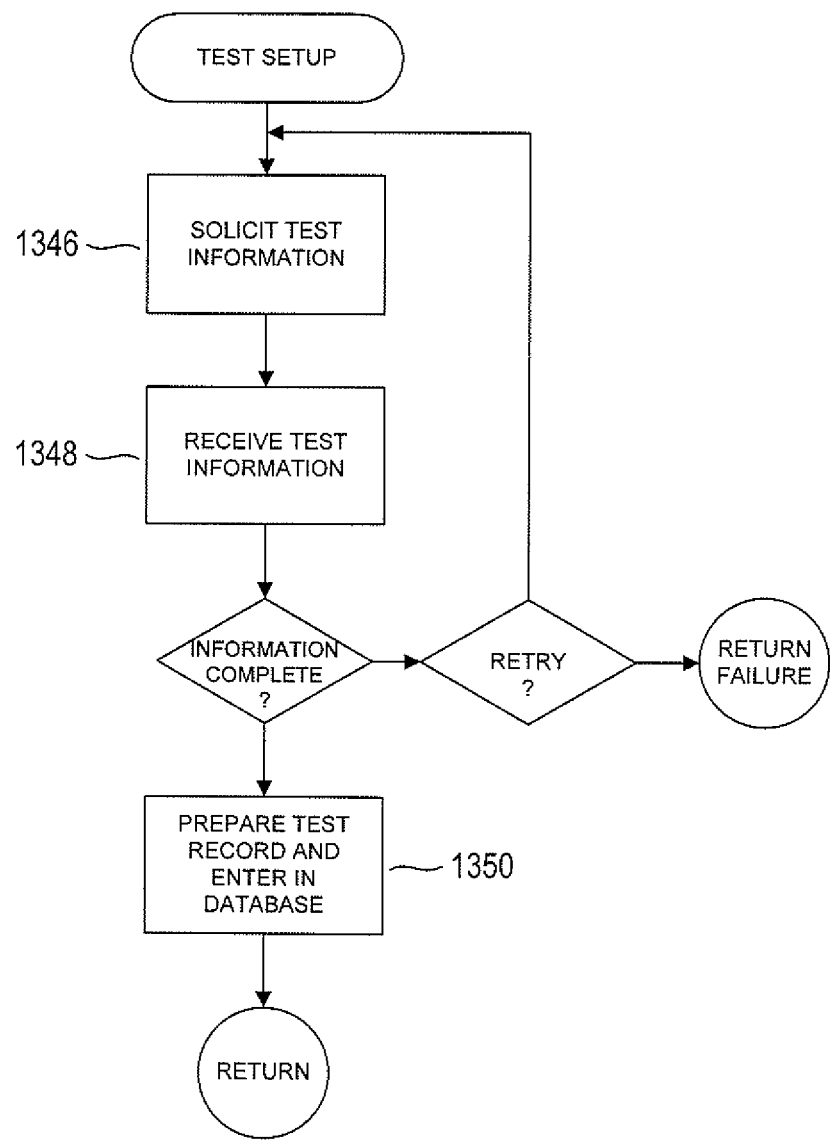

FIG. 13C provides a control-flow diagram for the routine "test set up" called in step 1310 of FIG. 13A. In step 1346, the testing service solicits test information from the client and receives the solicited information in step 1348. Steps may be iterated in order to carry out a dialog during which the needed information to prepare and store a record describing a test is acquired by the testing service. Once the information is received, the testing service prepares a test record and enters the test record in the testing service's database in step 1350 in association with, or referenced by, one or more client records. As discussed above, test information may include a test name, creation date, description, list of factors, and other information that provide a basis for subsequent construction of test runs.

Figure 13D:
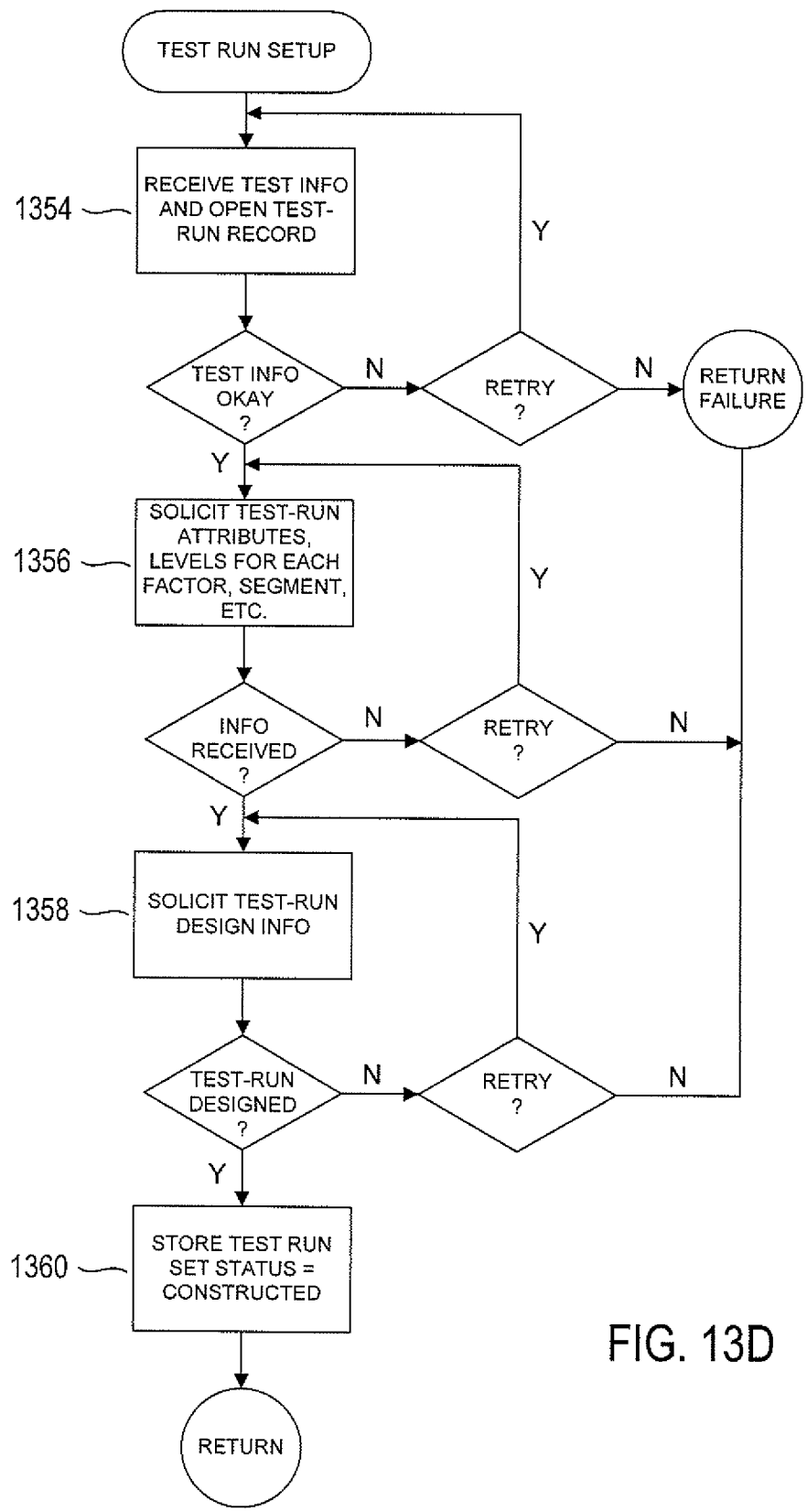

FIG. 13D provides a control-flow diagram for the routine "test run setup" called in step 1314 of FIG. 13A. In step 1354, the testing service receives information about a next test run and opens a test record for the test run. Step 1354 may involve multiple information exchanges with the client. It should also be noted that the client may elect to update or modify an already existing test run, in which case an already existing test-run record is accessed in step 1354. Next, in step 1356, the testing service carries out an information exchange with the client to obtain all the information that defines a test run, including various attributes, the levels for each factor, a specification of a test segment, and other such information. Once that information is received, then, in step 1358, the testing service provides various orthogonal-array-based or other test-design-based testing alternatives to the client, from which the client web server selects a particular test design. Various different orthogonal-array-based test designs or other types of test designs may be associated with different advantages and disadvantages, and selection of an orthogonal-array-based test or other test design may involve consideration of a number of different trade-offs, including potential length of the test run, computational requirements on the testing service, and many other such factors. Finally, in step 1360, the testing service prepares and stores a test-run record and, in addition, sets the test-run status to "constructed."

Figure 13E:
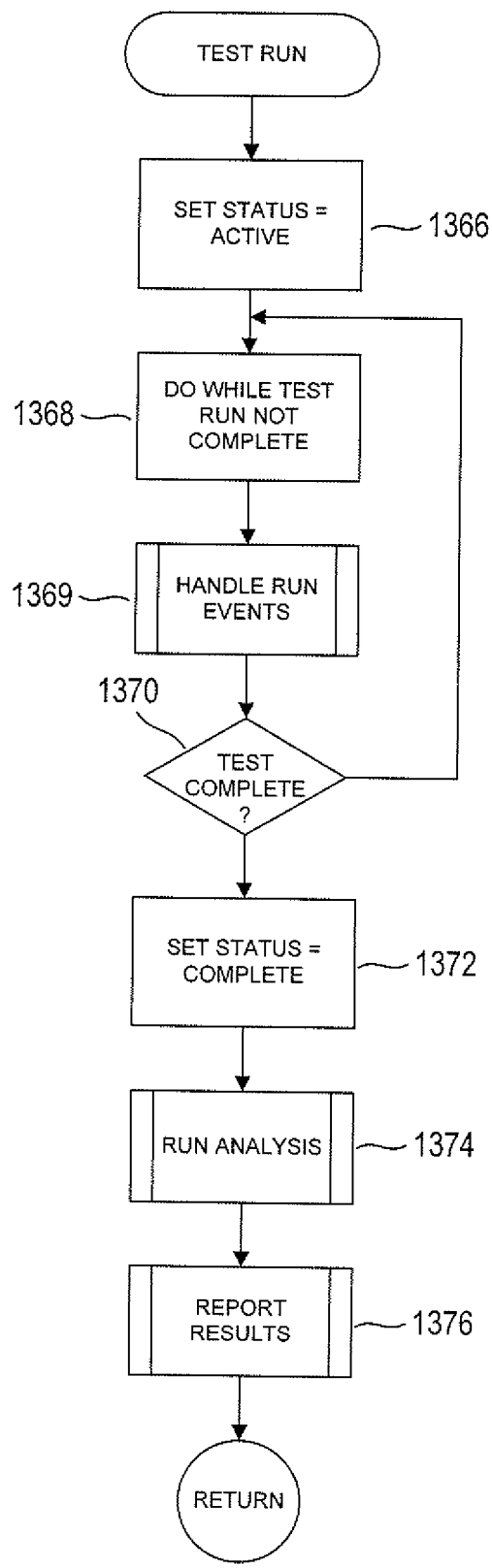

FIG. 13E provides a control-flow diagram for the routine "test run," called in step 1322 of FIG. 13A. In step 1366, the testing service sets the status of the test run to "active." Then, in a continuous loop comprising steps 1368-1370, the testing service continues to handle test-run events, primarily information exchanges with test subjects' computers invoked by execution of script-library routines by users' browsers, until the test is complete, as determined in step 1370. In general, a test run continues until sufficient data has been collected to provide statistically meaningful results. Once a test run is completed, the testing service sets the status of the test run to "complete," in step 1372, and then may undertake analysis of the test results and reporting of results of the analysis, in steps 1374 and 1376. As briefly discussed, above, results may also be reported to a client during the test run, through the web-site interface.

Figure 13F:
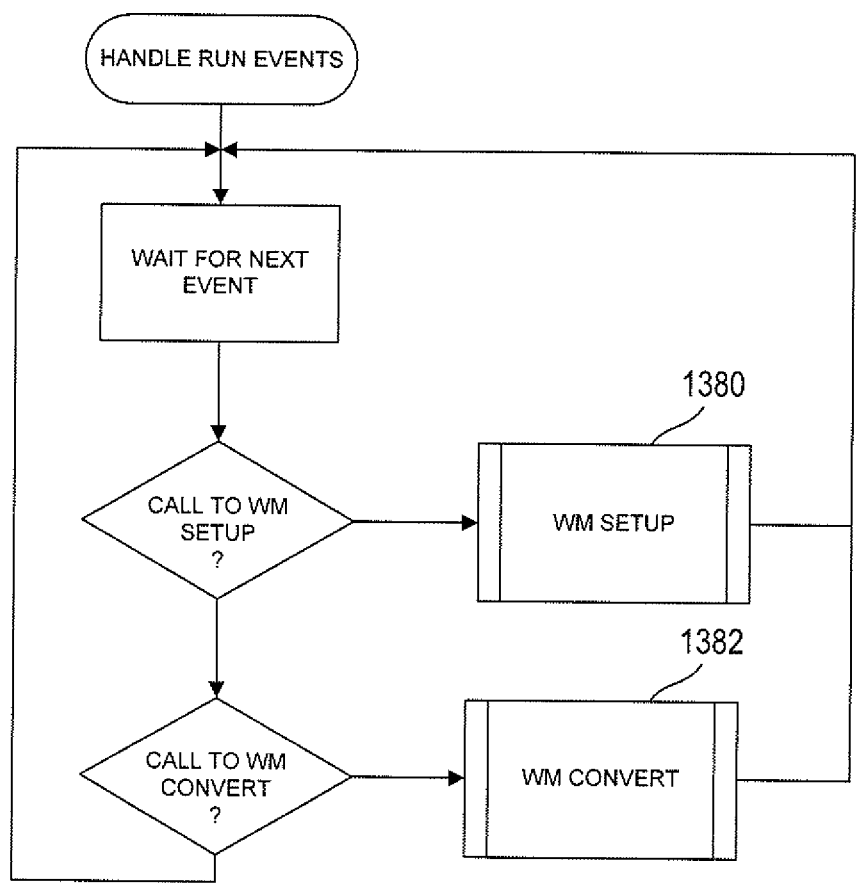

FIG. 13F is a control-flow diagram of the routine "handle run events" called in step 1369 of FIG. 13E. This routine is a simple event handler, in which messages sent from user computers as a result of calls to the script-library routine "WM.setup" by user browsers are handled by a call to the routine "wmsetup," in step 1380, and messages sent from user computers as a result of calls to the script-library routine "WM.convert" by user browsers are handled by a call to the routine "wm convert," in step 1382. Note that the script-library routines "WM.setup" and "WM.convert" are called by a browser running on the user computer, and those script routines, in turn, call routines that initiate an information transmission with the testing service.

Figure 13G:
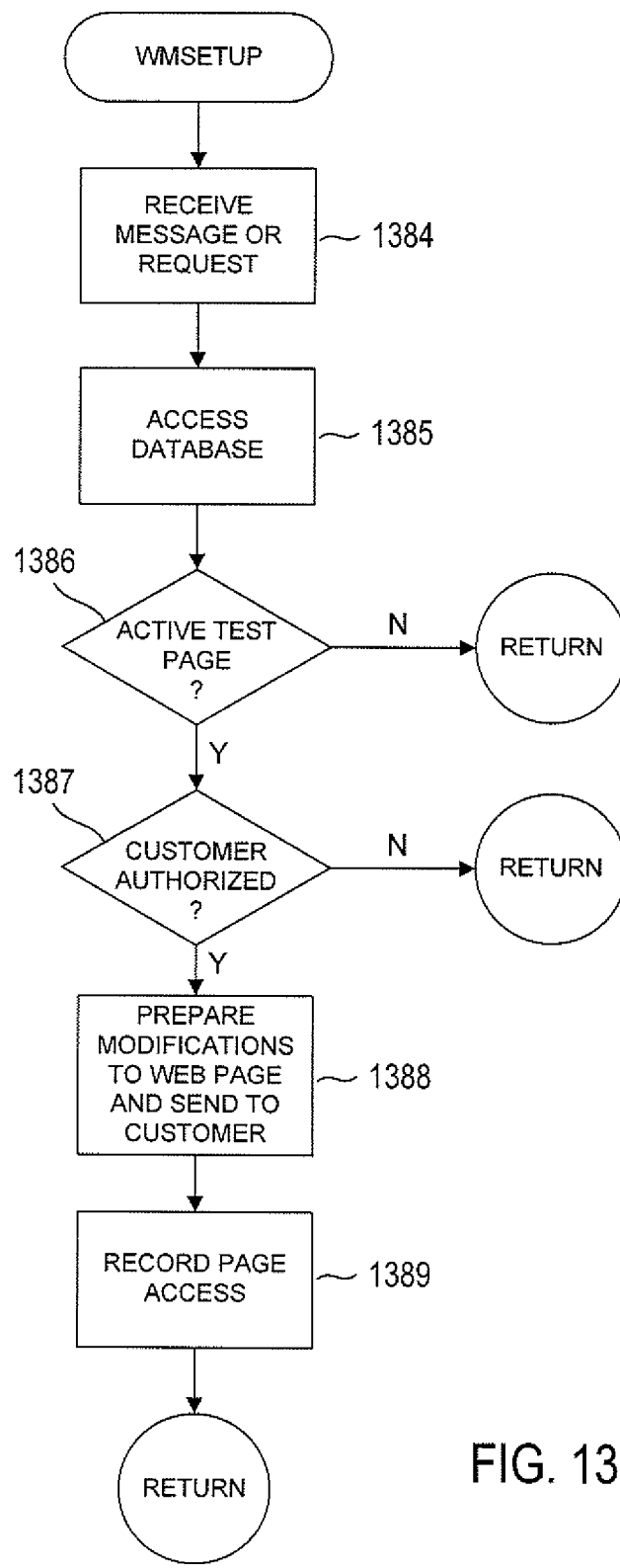

FIG. 13G provides a control-flow diagram of the routine "wmsetup" called in step 1380 of FIG. 13F. In step 1384, the testing service routine receives a message, for request, from a user computer as a result of execution, by a user's browser, of the script-library routine "WM.setup." In step 1385, the testing service uses a URL for the web page being processed to access the database or databases maintained by the testing service in order to determine whether or not the call to WM.setup represents a page-access event or a conversion event, the type of test being run, whether or not the web page is an active test page and the user computer is a valid and active test subject, and other such information. When the test page that included a call to "WM.setup," which, in turn, generated the message or request received in step 1384, is an active test page, as determined in step 1386 by the testing service, and when the user computer is an authorized test subject, as determined in step 1387, then, in step 1388, the testing service then in the case that the call to WM.setup represents a landing-page-access event, prepares the DOM modifications needed to generate an experiment for display on the user computer and transmits those modifications to the user computer. Finally, in step 1389, the testing services records either a landing-page-access event by the user computer or a conversion event, depending on the web page. Note that, in the case that the page from which the call to "WM.setup" was made is not an active test page, or in the case that the user computer is not an active and authorized test subject, the routine "wmsetup" simply returns. In other words, there is almost no performance penalty and no perturbation to the client's web server in the case that a user accesses an inactive test page or in the case that non-test-subject users access test pages. Steps 1384 and 1385 may include one or more information exchanges between the user computer and testing service.

Figure 13H:
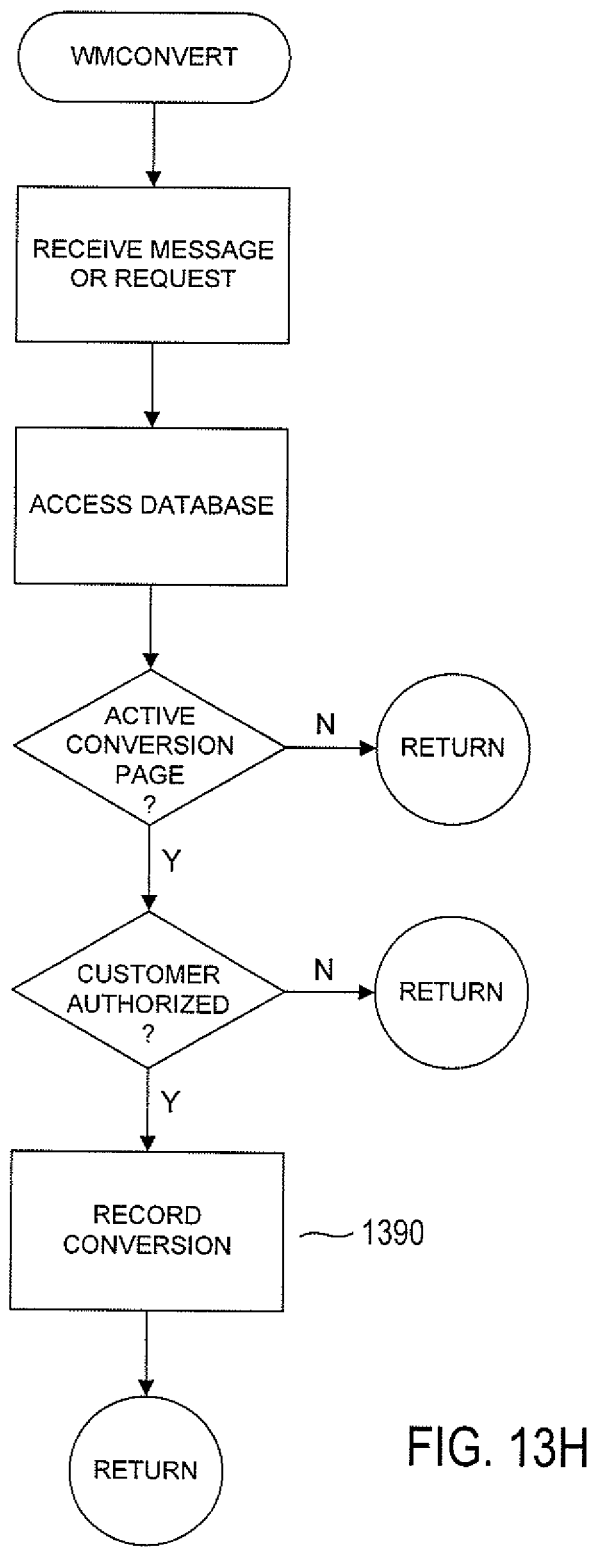

FIG. 13H is a control-flow diagram for the routine "wmconvert" called in step 1382 of FIG. 13F. This routine is similar to the routine "wmsetup," described with reference to FIG. 13G. The primary difference is that this routine is only called for a conversion event, which is recorded, in step 1390, as conversion event in a testing-service database.

The routine "trial run," called in step 1318 of FIG. 13A, is similar to the routine test-run, discussed above, with the exception that a trial-run status may be set for the test run during a trial run. The routine "trial run" is not further discussed. The routine "status," called in step 1326, returns status information with respect to test runs and other information about tests, test runs, and clients. Implementation of this routine is strongly dependent on the particular database organizations used by the testing service and on the particular web-site interface provided to clients, and is not further discussed.

FIG. 14 shows the HTML modifications used to virtually incorporate a testing service. The HTML code, previously shown in FIG. 3, includes first statement 1402 that directs a browser to download the script-routine library and a second statement 1404 that calls a script-library entry point "WM.setup" that results in sending a message or request to the testing service to indicate a landing-page-access event or page-access-conversion event. A page that includes a displayed object, activation of which is defined to be a conversion even, is similarly modified to include a call to the library routine "WM.convert." By merely adding two statements to an HTML file, or three in the case that the page corresponds both to a landing-page-access event and to a conversion event, the HTML file becomes a potential test web page, and the testing service is virtually incorporated into the client web server. Again, the statements used to modify landing-access-event-associated web pages are identical for all such web pages, as is the statement that is used to modify display-objects associated with conversion events. A client can easily write a script or other program, or use a content-management-system programming interface to introduce these identical statements into web pages. FIG. 15 provides an exemplary script library downloaded service.

Consider the problem of designing an experiment in which the effects of four different variables, or factors, are desired to be ascertained. As one example, a web page provided by a web site for marketing a particular product may include a number of different images, text features, and data-input features, including pictures of the product, textural descriptions of the product, product-order-initiation buttons, and other such features. The web site provider may wish to optimize the web page by considering four factors, or variables, and systematically altering the web-page features corresponding to the four variables in order to determine how the variables, or factors, affect the overall efficiency or effectiveness of the web page. The systematic variation of the four factors represents an experiment design. In this situation, the web-site provider may wish to systematically alter the web page, with respect to the four factors, to display, for each factor, one of three possible variations. For example, there may be three different product images, three different text captions for the product images, three different product-description paragraphs, and three different product-ordering-initiation buttons or other user-input features. The features may differ in content, form, size, color, or in any other manner that changes the appearance of the features to viewers of the web page.

Real-Time Data Acquisition System

Figure 16:
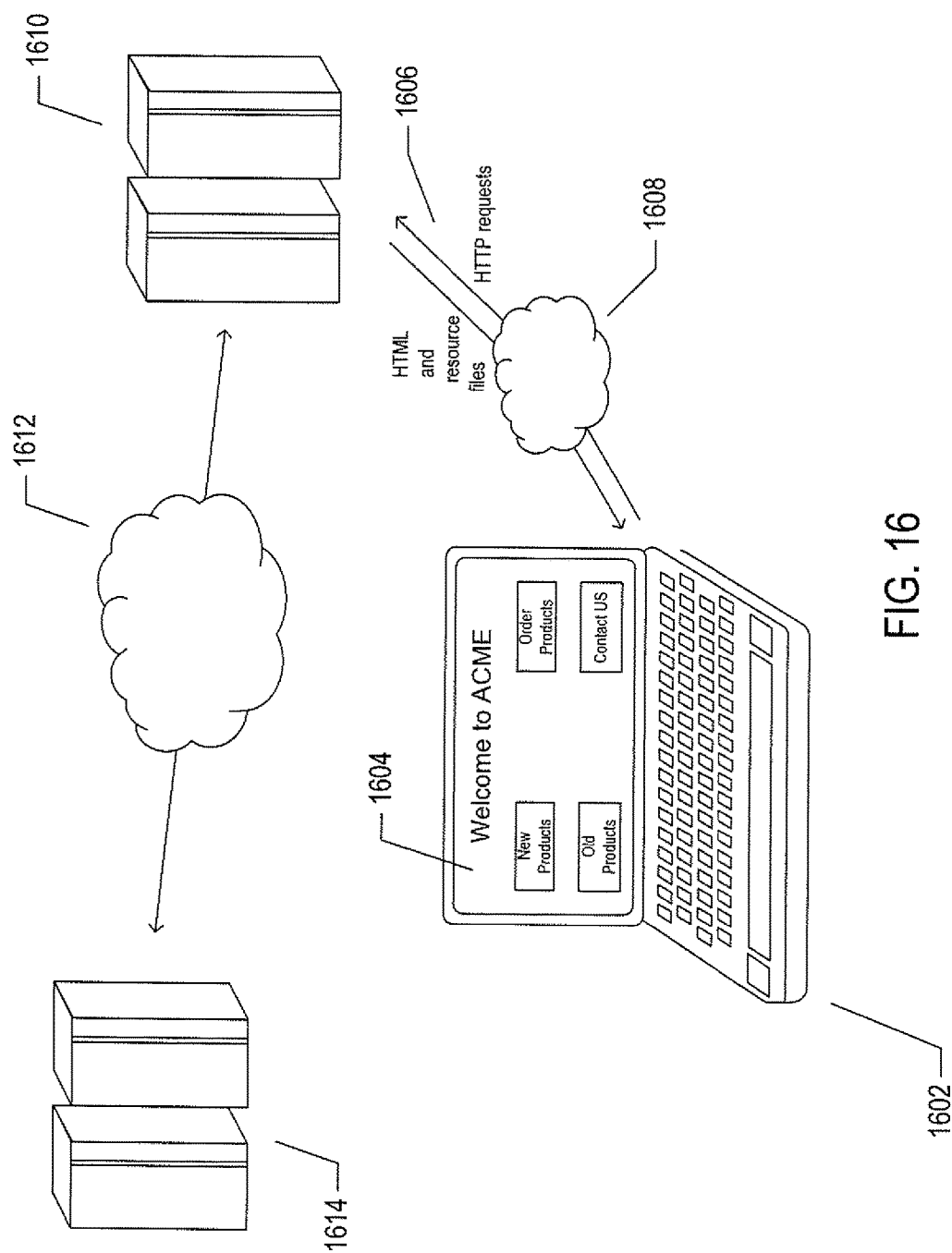
FIG. 16 illustrates an electronic-commerce environment.

FIG. 16 is one example of many types of many different types of processor-controlled user appliances from which a data-acquisition system can acquire data. These include systems that execute applications that render HTML-encoded information for display to a user, other than web browsers, and many other types of information-rendering systems, the control subsystems for which include processor-executed instructions into which data-collection instrumentation is introduced. Instrumentation can be introduced into instructions produced from compilation or interpretation of any of a large number of different types of programming, scripting, and other types of languages. The processor-controlled appliances may include desktop computers, mobile computers, such as laptops and tablets, mobile phones, processor controlled consumer appliances and vehicles, system components, and many other types of devices. In general, the processor-controlled appliance needs to be communicatively interconnected with a data-collection system. Frequently, the interconnection is a communications system that connects the processor-controlled appliance to the Internet.

Figure 17:
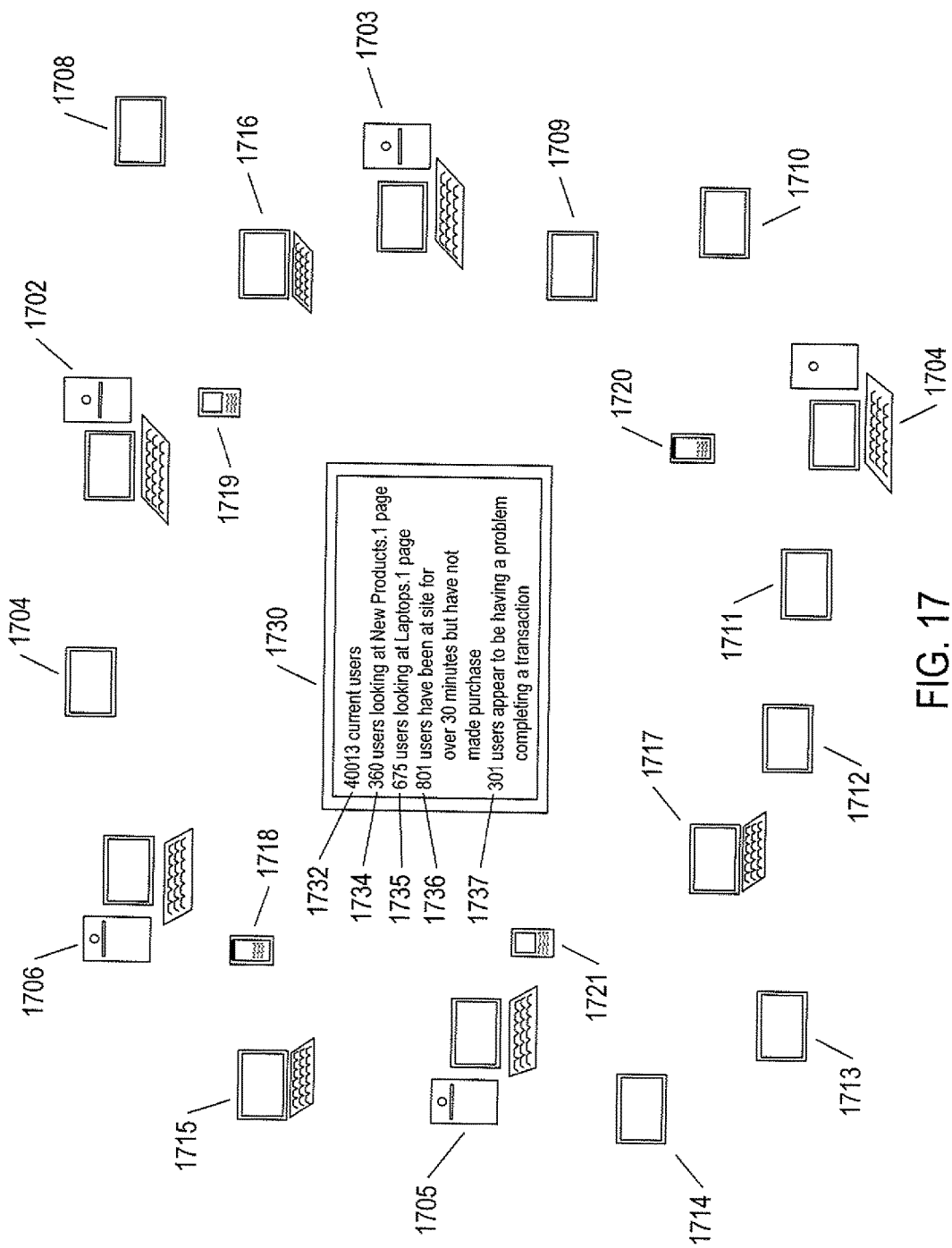
FIG. 17 illustrates an example of the type of application programs made possible by a data-acquisition system.

The data-acquisition system described in this subsection provides real-time, streaming, processed data from remote processor-controlled user appliances accessing the web pages of a web site to one or more application programs. FIG. 17 illustrates an example of the type of application programs made possible by the data-acquisition system. In FIG. 17, a web site is currently being accessed by a large number of different, geographically disperse users interacting with processor-controlled user appliances, including personal computers 1702-1706, electronic tablets 1707-1714, laptop computers 1715-1717, and mobile phones 1718-1721. The processor-controlled user appliances shown in FIG. 17 are a tiny subset of the potentially thousands or more processor-controlled user appliances through which users may be currently accessing the web site from all over the world. Data collected in real time from instrumentation within the HTML files and other resource files executed and rendered by browsers within the user appliances is processed and streamed to an application program running within a computer system that produces a console-or-monitor-like display 1730. The application program renders the streaming data to produce a dynamic, constantly changing console or monitor 1730 that indicates, in the example shown in FIG. 17, the number of current users accessing the web site 1732, the number of users looking at a particular web page within the web site 1734-1735, and the number of users in each of various different classes of users 1736-1737. The console-or-monitor-like display 1730 provided by an application program receiving real-time, processed, streaming data allows a client to view characteristics of the world-wide operation of a web site in real time. This is an extraordinarily dynamic and powerful tool for understanding the function and operation of a web site at any particular instant in time. These types of application-program-implemented consoles and monitors may allow a web-site owner, developer, administrator, or other client to track the activities of individual web-site users at any location in the world, as one example. This provides the ability for real-time adaptation of a web site in order to address needs of individual users in real time.

Figure 18:
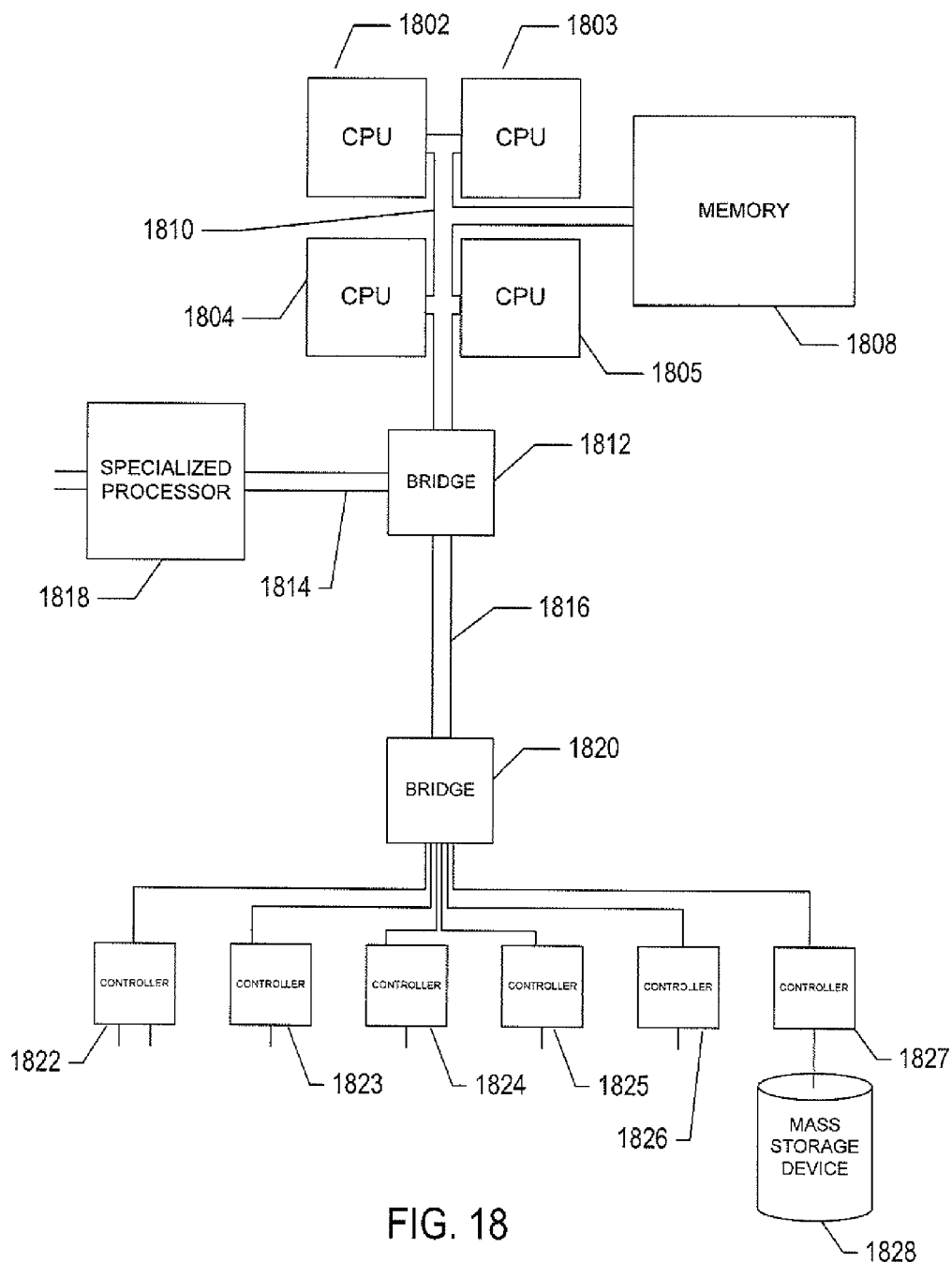
FIG. 18 provides a high-level architectural diagram of a typical computer system, such as a processor-controller user appliance or a server within a data-processing center.

FIG. 18 provides a high-level architectural diagram of a typical computer system, such as a processor-controller user appliance or a server within a data-processing center. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. These busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of mass-storage devices 1828, electronic displays, input devices, and other such components, subcomponents, and computational resources.

It should be noted, at the onset, that the current document is directed to tangible, physical systems and methods carried out by tangible, physical systems rather than to some type of abstract concept. The physical systems and methods to which the current document is directed include user computers, web browsers executing within, user computers that comprise computer instructions stored in physical memories and/or mass-storage devices, communications systems that implement Internet communications, data-collection systems, consolidation computer systems, data-processing centers, and, ultimately, client computers that execute application programs which receive streaming data and render the streaming data for display on electronic display devices to clients. As those familiar with science and technology well understand, these complex systems are not abstract, and the activities carried out by these complex systems could not possibly be carried out manually by human beings. While portions of these complex systems are implemented by stored computer instructions, these systems cannot be characterized as software or abstractions. It should also be noted that, as well understood by those familiar with science and technology, computer instructions cannot be stored in electromagnetic radiation, such as communications signals. Computer instructions and digitally encoded data can only be stored in physical data-storage devices, such as electromagnetic disks, optical disks, electronic memories, and other such physical data-storage devices. Electronic signals and electromagnetic radiation are instead used to transmit computer instructions from one computer to another.

Figure 19A:
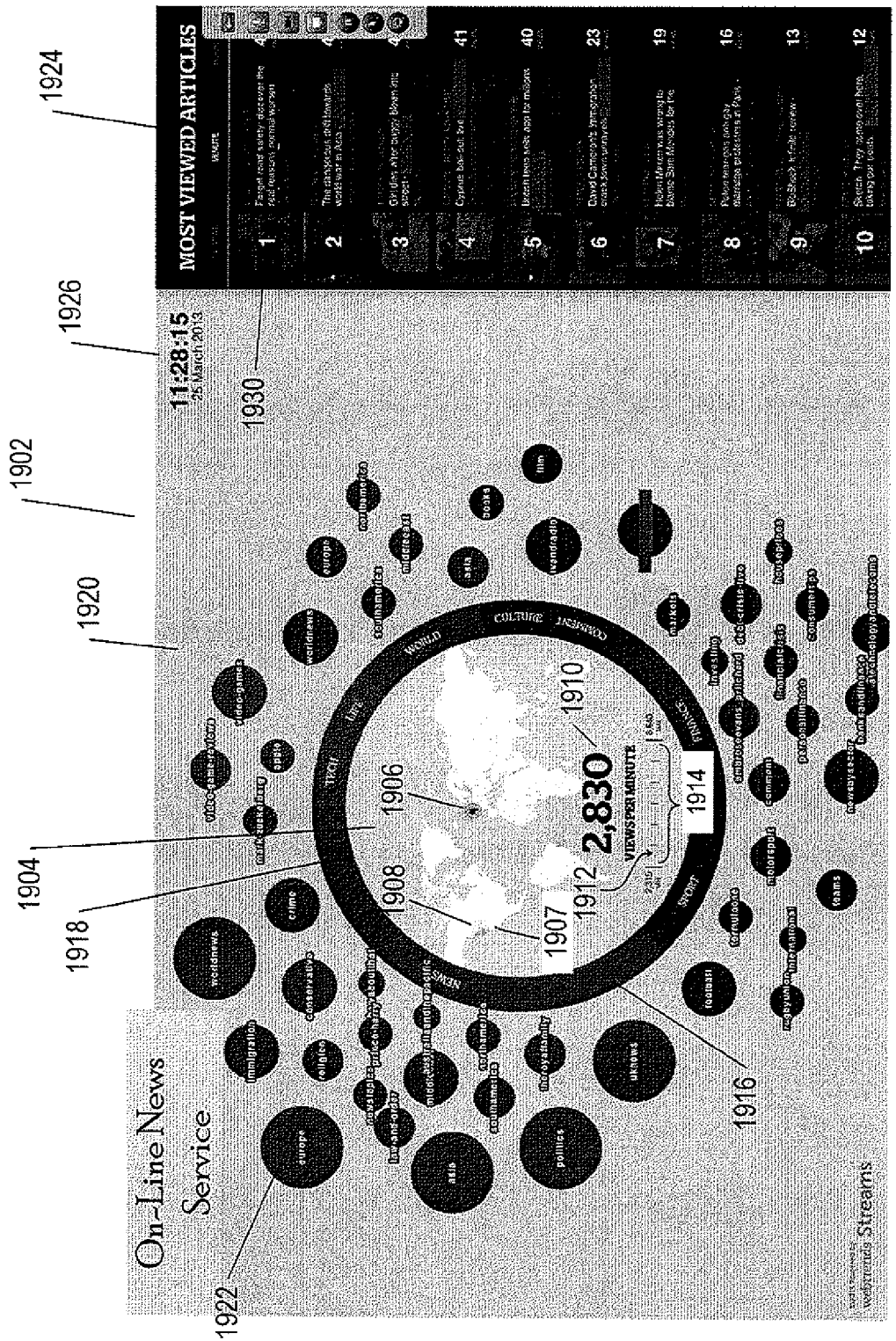
FIGS. 19A-D illustrate an actual console-or-monitor-type application that receives and renders real-time, processed, streaming data provided by the data-acquisition system.

FIGS. 19A-D illustrate an actual console-or-monitor-type application that receives and renders real-time, processed, streaming data provided by the data-acquisition system described in this subsection. As shown in FIG. 19A, the displayed console or monitor 1902 displays real-time readership information for a news website. A central, disk-shaped section 1904 of the displayed monitor shows a map of the world, with regions featuring the largest number of current viewers indicated by darkened pixels and shaded disks, such as regions 1906-1908. A large numeric value 1910 indicates the current number of viewers per minute on the web site, also indicated by an arrow-like icon 1912 within a range of views-per-minute values 1914 that have been displayed during the current instantiation of the monitor.

An annular section display bar 1916 indicates the portion of viewers currently viewing a page within various sections of the web site, with the number of viewers proportional to the area assigned to the section. For example, the largest number of current viewers are viewing the "news" section 1918. Other sections include "tech," "life," "world," "culture," "comments," "finance," and "sport." In the main panel 1920 of the monitor display, outside the annular display band 1916, the number of current readers within each of various subsections of the above-discussed sections are represented by the areas of labeled disks, such as disk 1922 labeled "europe." In a right-hand panel 1924 of the monitor display, the top ten most currently viewed articles are shown, in descending order, in entries that include a photograph, section, title, and author, and the current number of readers. The current time and date are displayed in the upper right-hand corner of the main panel 1926.

Figure 19B:
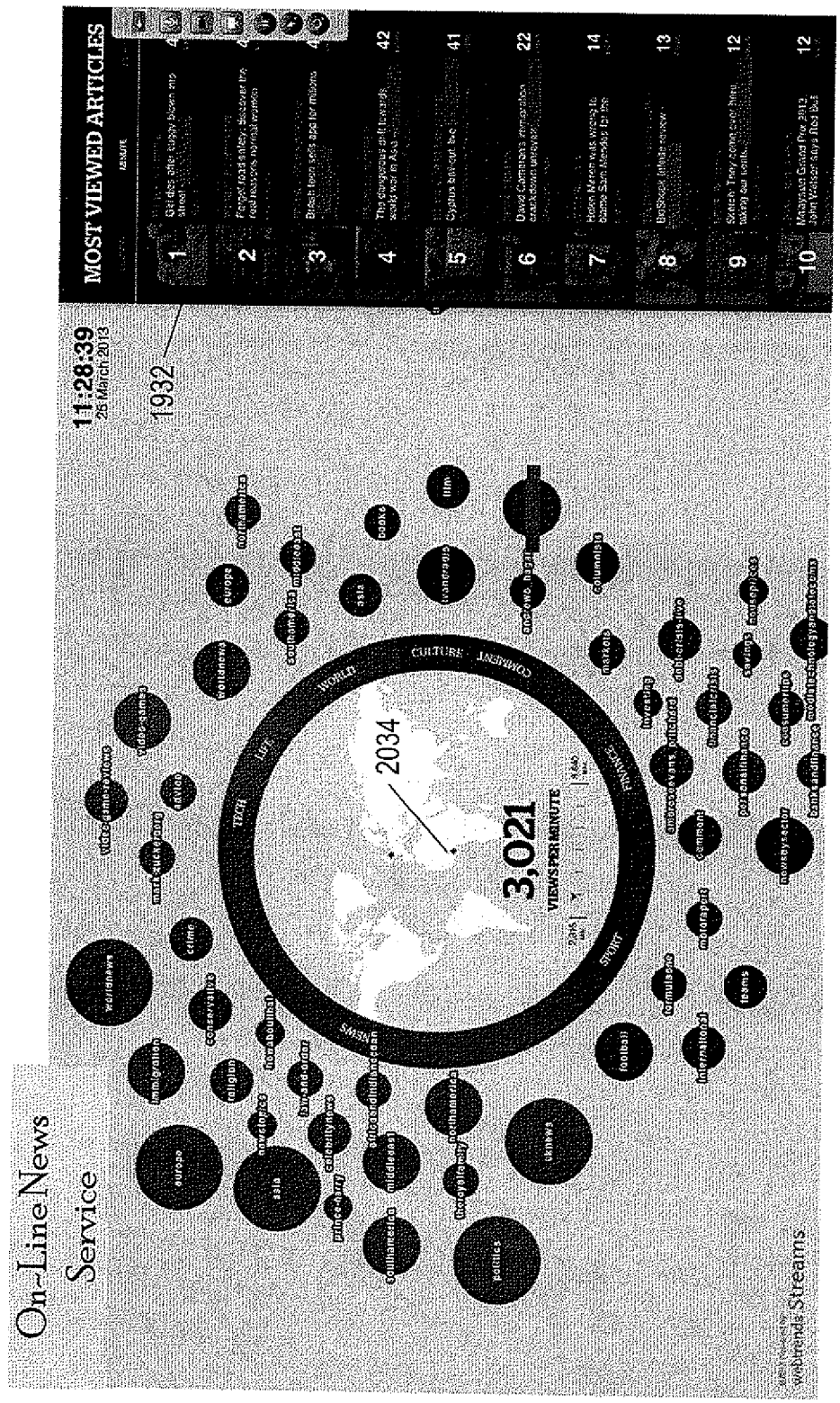
Figure 19C:
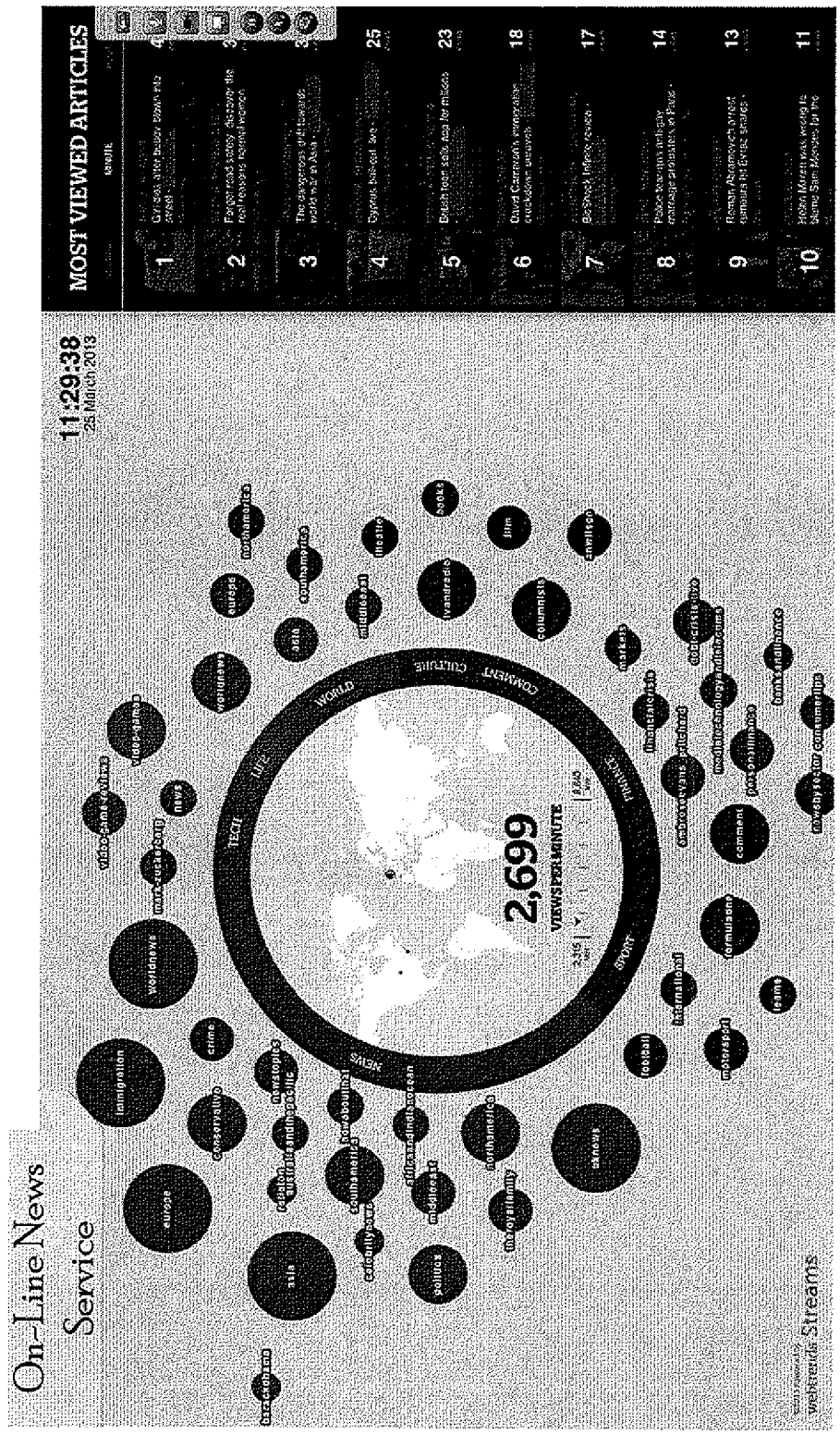
Figure 19D:
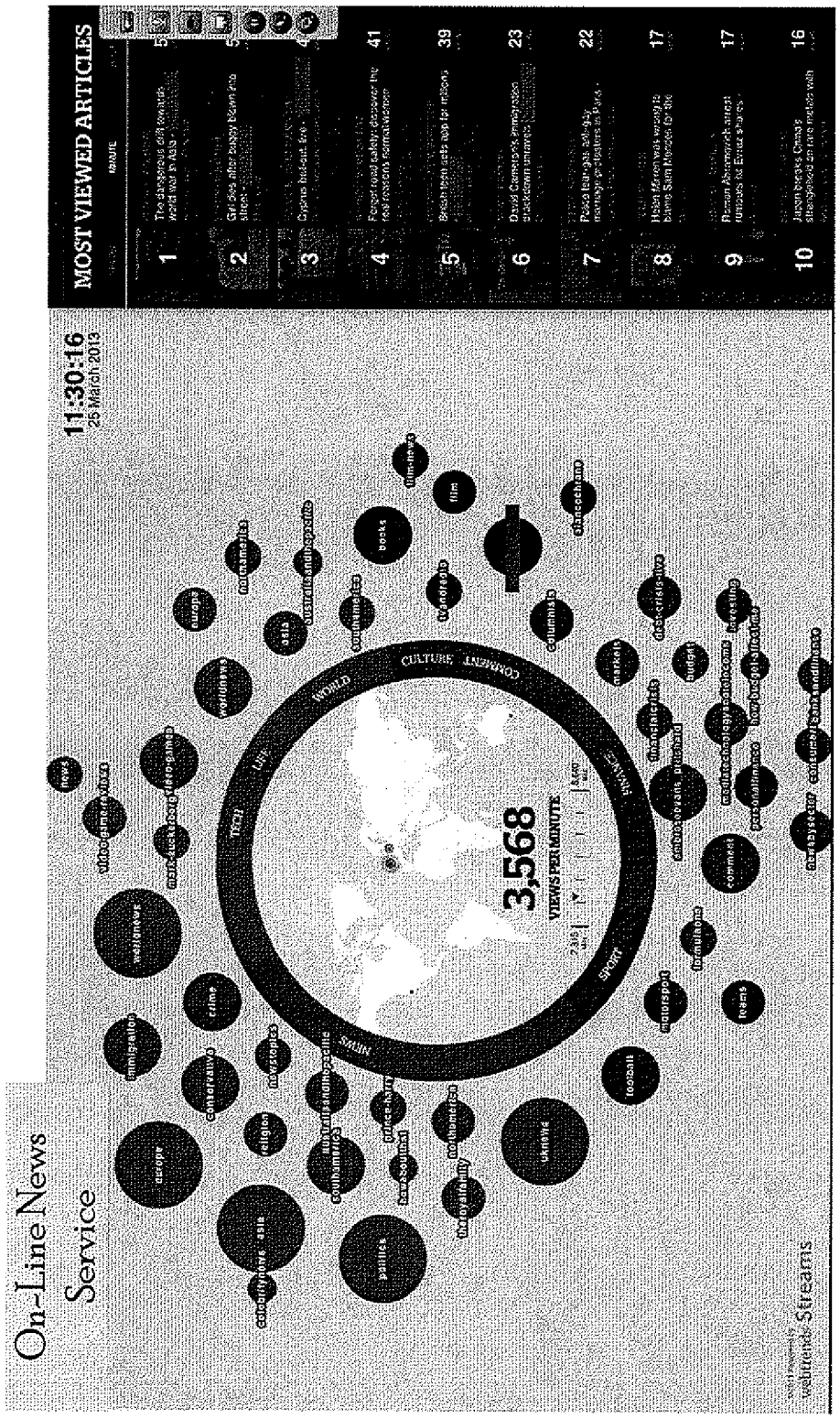

FIGS. 19B-D show screen captures of the same monitor display at various points in time following the time 11:28:15 at which the screen shot of the monitor display shown in FIG. 19A was recorded. FIGS. 19A-D illustrates the dynamic nature of the monitor display. For example, at the point in time represented by FIG. 19A, the most viewed article was a women's-section article about road safety 1930. By contrast, 24 second later, as shown in FIG. 19B, the most viewed article is a weather-section article about the death of a girl during a windstorm 1932. Another difference is the identification of a region in Africa 1934 as one of the regions with the most current viewers while, in FIG. 19A, that region of Africa was not so identified. Many other changes can be observed in the sequence of FIGS. 19A-D.

The display monitor illustrated in FIGS. 19A-D thus provides immediate, real-time data, in a visually compelling, dynamic, easy-to-understand format, related to current viewers of the news web site all across the world. This type of information may be used for selecting articles for the web site, for targeting particular geographical areas, for targeting advertisements, and for many other such purposes.

Figure 20:
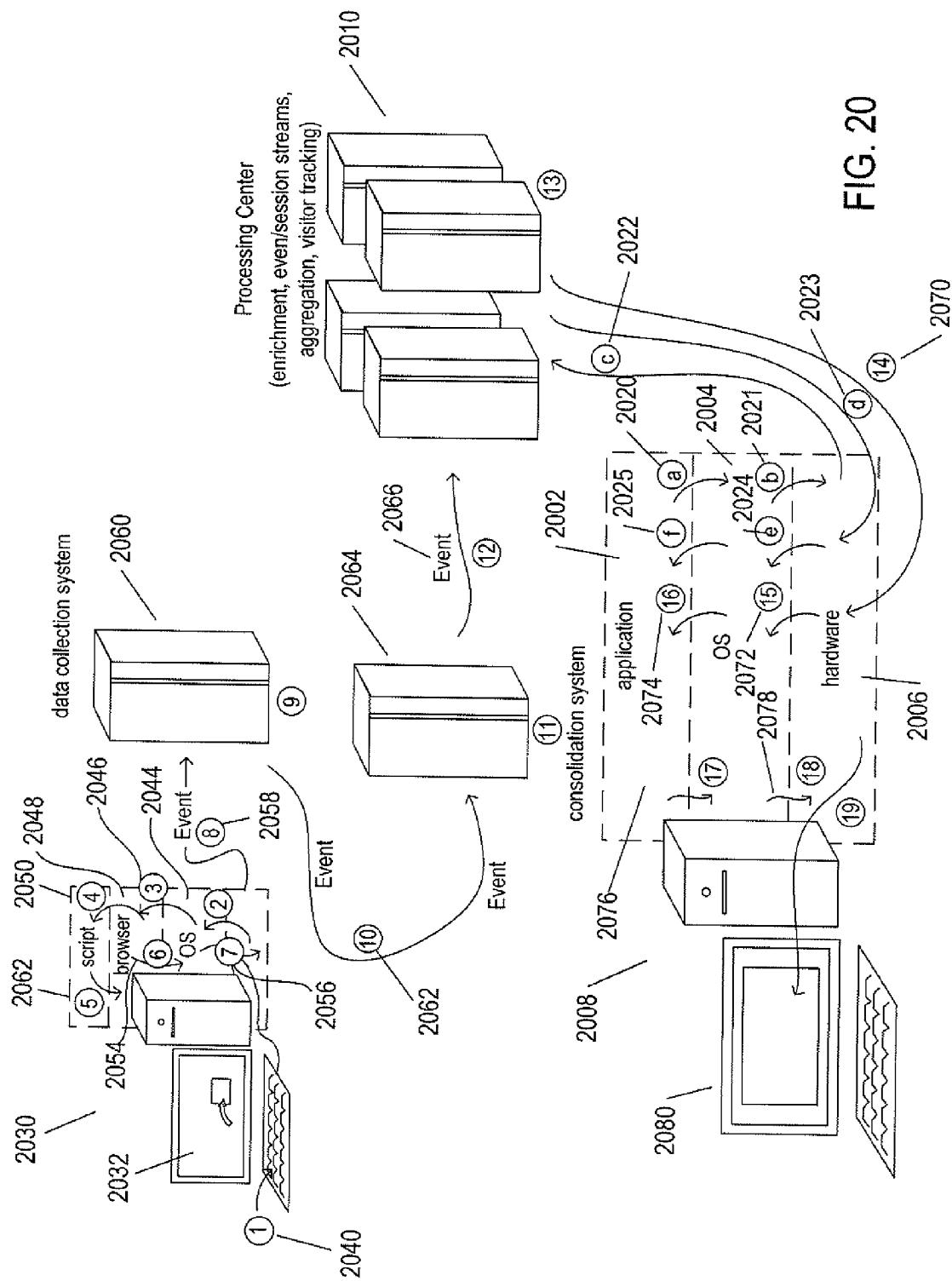
FIG. 20 illustrates the high-level components and data paths within one implementation of a system that streams real-time, processed data from web browsers executing on processor-controlled user appliances to a console-or-monitor-type application, such as that discussed above with reference to FIGS. 17 and 19A-D.

FIG. 20 illustrates the high-level components and data paths within one implementation of a system that streams real-time, processed data from web browsers executing on processor-controlled user appliances to a console-or-monitor-type application, such as that discussed above with reference to FIGS. 17 and 19A-D. Initially, when the application begins to execute, the application initializes various data structures and then opens at least one communications socket to a processing center. In FIG. 20, the console-or-monitor-like application 2002 executes within an execution environment provided by an operating system 2004 that executes above the hardware platform 2006 within a computer system 2008. The processing center 2010 is generally a remote, distributed computer system that includes tens to hundreds of server computers and other types of processor-controlled devices, systems, and subsystems. In order to open a communications socket and communicate with the processing center, the following high-level steps occur: (a) the application executes an open-socket system call 2020; (b) in response to the system call, the operating system creates an open-socket-request message and, via a device driver, queues the message to the input queue of a communications controller and signals the communications controller to transmit the message to the processing center 2021; (c) the communications controller controls a transceiver to transmit the open-socket-request message to a listening process executing on a computer within the processing center 2022; (d) the processing center returns an acknowledgement message to the transceiver 2023 within computer system 2008; (e) the operating system 2004 within computer 2008 is notified of the reception of the acknowledgement message and retrieves the acknowledgement message from a memory buffer 2024; and (1) the acknowledgement message is passed to the application program to indicate successful opening of the communications socket 2025. Various different types of socket requests and underlying communications protocols may be used to establish a communications link between the processing center and the application. Certain of these protocols may involve three or more different messages that implement a handshake operation. Furthermore, in most communications systems, various different types of information are exchanged between different levels of the communications stack. Errors may occur when the application program attempts to open a socket, with the type of error often indicated by return of an error message by the processing center to the application or return of an error indication by the operating system within computer system 2008 to the application.

Once the socket is opened, or, in other words, a protocol-based communications link is established between the application 2002 and the processing center 2010, the processing center begins to send a stream of data messages to the application program through the communications socket. This stream continues until the occurrence of some type of stream-ending event, such as closing of the socket via a system call by the application program, termination of the application program, or various types of failures and computational discontinuities. The application program may choose to open two or more different sockets to the processing center in order to concurrently receive two or more different streams of data messages.

Continuing with FIG. 20, the process by which a data message is created and transmitted to the application program is next described. The system depends on instrumentation introduced into HTML files and/or other resources that are used by a web browser or other type of application program or control program. In the example shown in FIG. 20, the instrumentation is included in HTML files that are processed by a web browser 2048 to render and display web pages to a remote user on a remote computer system 2030. In the example, a user is viewing a currently displayed web page 2032. The following events occur, in this example: (1) the user depresses a key or clicks a mouse button 2040 in order to input a command, make a selection, or carry out some other such input to the web browser; (2) the user input is sensed by the hardware of the remote computer system 2042, which generates an interrupt or other signal to the operating system 2044 within the remote computer system; (3) the operating system receives the interrupt and notifies 2046 the browser 2048 within the remote computer system of the input event; (4) as a result of receiving the input, the browser executes a script routine 2050 within which instrumentation has been embedded for collecting data; (5) instrumentation within the script collects data programmatically 2052, encodes the data within a uniform resource locater ("URL"), and requests that the browser retrieve a remote resource specified by the URL; (6) the browser executes an HTTP request for the resource 2054 that results in a system call to the operating system 2044; (7) the operating system creates a request message and passes the request message to a communications-device controller 2056 for transmission 2058 to a data-collection system 2060; (8) the data-collection system retrieves the encoded data from the URL request and packages the data in a JSON-encoded event message; (9) the event message is transmitted by the data-collection system 2062 to a consolidation system 2064; (10) the consolidation system consolidates event messages received from many different data-collection systems in temporary storage, with a temporary storage area allocated for the event messages corresponding to each of one or more different clients; (11) upon request from the processing center 2010, the consolidation system forwards 2066 a next set of events to the processing center for processing; (12) a processing center 2010 processes received event messages by adding derived and calculated data to the event messages and, in certain cases, aggregating and coalescing individual event messages into higher-level messages as well as filtering the messages for output to each connection/steam; (13) those processed messages that belong to the stream requested by the application program are forwarded 2070 by the processing center to the computer system 2008; (14) the hardware layer of the computer system notifies the operating system and passes the received processed message or messages to the operating system 2072; (15) the operating system notifies and passes the received processed messages to the application program 2074; (16) the application program then uses the data to generate and update to the monitor display or console display based on the received data and passes this update 2076 to the operating system; (17) the operating system controls a graphics processor and other video components of the hardware level 2078 to update the monitor display or console display; and (18) update operations are transferred from the graphics subsystem to the display device 2080 resulting in an update of the monitor display or console display.

Figure 21:
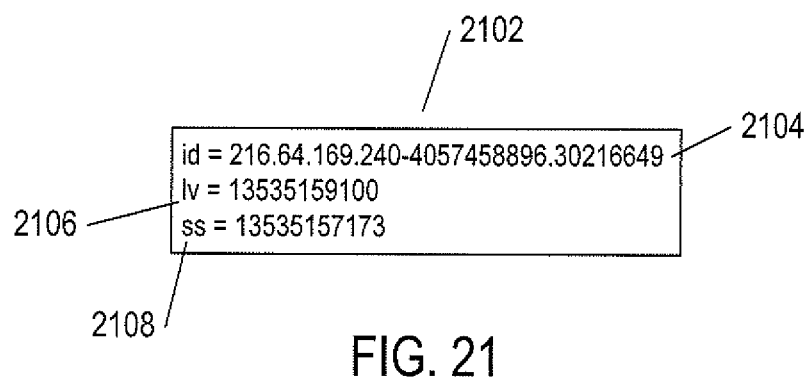
FIG. 21 shows a cookie, or small data structure, that is stored within the memory of each remote computer system that is instrumented for data collection.

State information is generally maintained within remote computer systems to facilitate data collection and processing. FIG. 21 shows a cookie, or small data structure, that is stored within the memory of each remote computer system that is instrumented for data collection. The cookie 2102 includes a unique identifier for the user/processor-controlled appliance 2104, a system time stamp 2106 that indicates the most recent event detected by the instrumentation, and a session-start time stamp 2108 that indicates the time at which a session that includes the most recent event began. The identification of the user/processor-controlled appliance, id, is generally a combination of an IP address and other numbers that uniquely identify the user/processor-controlled appliance. The time stamps that indicate the last detected event, or last visit, lv, and the start of the session, ss, are generally system time values that indicate the number of seconds or fractions of seconds that have elapsed since some arbitrary point in time. The data contained in the cookie is used by the instrumentation for encoding data within a URL for transmission to a data-collection system and subsequent downstream processing of the data.

Figure 22:
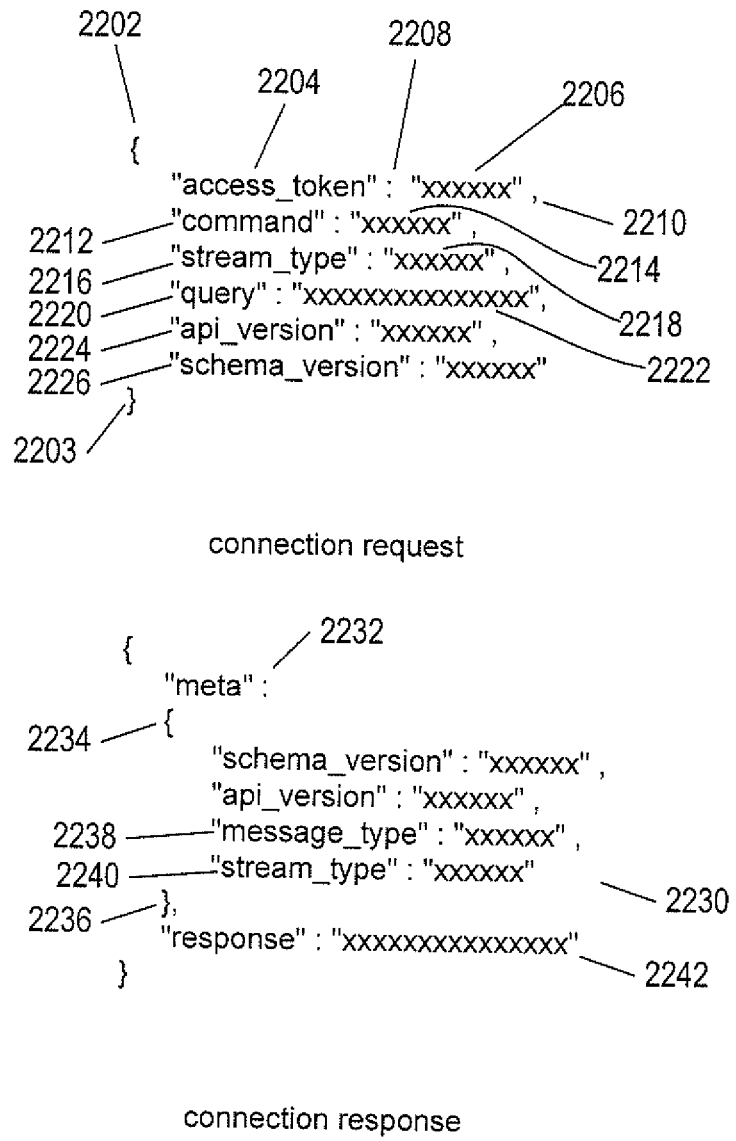
FIG. 22 illustrates JSON encodings of a connection request sent by an application to the processing center as part of the opening of a communications socket and a response message sent by the processing center back to the application program in response to a connection request.

FIG. 22 illustrates JSON encodings of a connection request sent by an application to the processing center as part of the opening of a communications socket and a response message sent by the processing center back to the application program in response to a connection request. In FIG. 22 and in subsequent figures, a pair of quotation marks enclosing a series of "x" symbols indicates where a symbol-string encoding of a data value occurs in the JSON encoding. The connection request and connection response include numerous key/value pairs. In the connection request, the outer brackets 2202-2203 indicate a JSON object composed of one or more key/value pairs. The first key is "access_token" 2204 and a value 2206 corresponding to the key occurs, within a pair of quotation marks, following a colon delimiter 2208. Each key/value pair, other than the final key/value pair, is separated from subsequent key/value pairs by a comma, such as comma 2210 following the first key/value pair 2204, 2206, and 2208. The access token is a symbol string that is obtained from a data-streaming service as a credential that allows access to data streams by application programs. The key "command" 2212 is associated with a symbol-string value 2214, such as the symbol string "stream," that requests a particular type of action or service from the processing center. The key "stream_type" 2216 is associated with a value 2218 that indicates one of various types of streams that the application program wishes to receive through the communications socket. Examples include event streams and session streams. The key "query" 2220 is associated with a symbol-string value 2222 that specifies a structured-query-language-("SQL")-like query that is used, by the processing center, to filter data messages and the contents of data messages prior to directing a filtered stream of data messages to the application program. The "api_version" key/value pair 2224 and "schema_version" key/value pair 2226 specify a streams application program interface ("API") version and a query-language version to the processing center. Because the streams API and query language may be revised and updated to generate a series of versions with increasing version numbers, these key value pairs inform the processing center of the API version being used by the application program and the query language version used by the application program to create the queries included as the value of the "query" key/value pair, allowing the processing center to appropriately respond to a connection request.

The connection response message 2230 has the form of a JSON-encoded data message. In all JSON-encoded data messages, in one implementation, the message object includes an initial "meta" object specified by the symbol string "meta" 2232 and a number of key/value pairs within the meta object delimited by brackets 2234 and 2236. The meta object includes the above-discussed "api_version" key/value pair and "schema_version" key/value pair. In addition, the meta object includes a "message_type" key/value pair 2238, example values of which include "success" and "error," and a "stream_type" key/value pair 2240, the value of which specifies the type of data stream that has been opened, examples including "event" and "session." Following the meta object, the connection response includes a response key/value pair 2242 with values indicating either success or providing an explanation of an error that has occurred. A JSON-encoded connection request is transmitted to the processing center as part of the open-socket request and a JSON-encoded connection response message is returned by the processing center in response to the open-socket request.

Figures 23A, 23B:
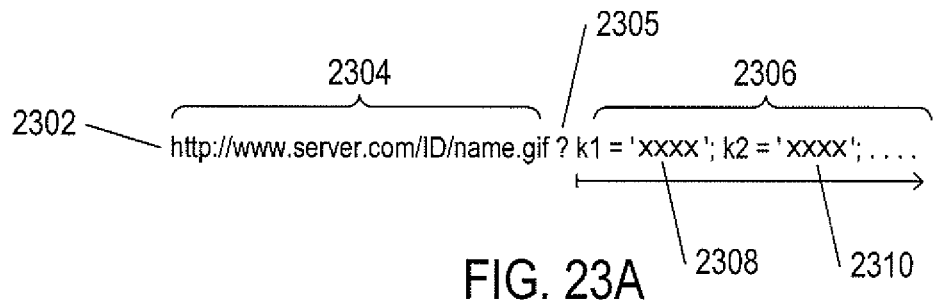
Figure 23E:
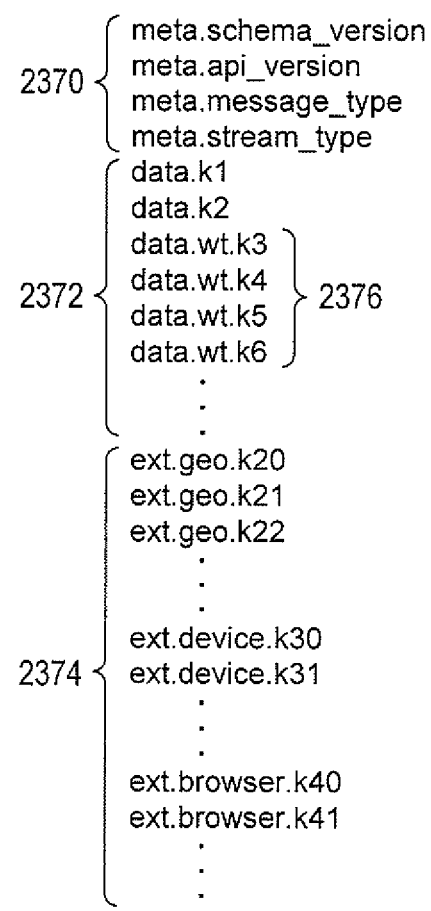

FIGS. 23A-E illustrate the various types of data messages that are transmitted between computers in the example system shown in FIG. 20. As discussed above, the data initially collected by instrumentation within the web browser is encoded as a series of key/value pairs within a URL. FIG. 23A illustrates the encoding of key/value pairs generated by instrumentation within a URL. The URL 2302 includes a path name to a resource stored on a data-collection server 2304 followed by a question mark 2305 and then a series of semi-colon-delimited key/value pairs 2306. In FIG. 23A, and in subsequent figures, the symbol strings "k1," "k2," . . . are used to indicate different keys and the corresponding values are generally indicated by a series of "x" symbols between pairs of single quotes or double quotes, such as "x" symbol strings 2308 and 2310 in FIG. 23A indicating the values corresponding to keys "k1" and "k2." The values may be any alphanumeric symbol string and the key names may also be arbitrary alphanumeric symbol strings.

FIG. 23B illustrates a JSON-encoded event message that is generated by a data-collection system, transmitted to a consolidation system for storage, and pulled from storage and transmitted to the processing center. A JSON-encoded event message includes a "meta" object 2312, previously discussed with reference to FIG. 22, and a "data" object introduced by the symbol string "data" 2314 and including key/value pairs and objects within the bracket pair 2316-2317. A "data" object may include key/value pairs, such as key/value pairs 2318 and 2320, and objects, such as the object named "wt" 2322 that includes key/value pairs within brackets 2324-2325. Key/value pairs may include two symbol strings separated by a colon, such as key/value pair 2326 or may comprise a key followed by a colon that is in turn followed by an array of symbol strings, such as key/value pair 2328. Arrays of symbol strings are delimited by square brackets, such as the pair of square brackets 2330. Event messages generally include a "meta" object and a "data" object.

FIG. 23C illustrates an enriched event message that is produced within the processing center (2010 in FIG. 20). An enriched event message includes a "meta" object 2340, a "data" object 2342, and an "ext" object 2344. The "ext" object includes three lower-level objects "geo" 2346, "device" 2348, and "browser" 2350. The geo object contains key/value pairs that describe the geographical location of a user/processor-controlled user appliance. The device object 2348 includes key/value pairs that characterize the user/processor-controlled appliance. The browser object 2350 includes key/value pairs that characterize the type of browser used by the user. The data values included in the "ext" object 2344 are derived from the data values included in the "meta" and "data" objects as well as additional calculated values and data sources accessible to the processing center and used for event-message enrichment. Many types of enrichments are possible. For example, an enriched even message may include indications of the current weather at a user's location, the size of the town or city in which the user is located, public data related to the user, and many other types of information.

FIG. 23D illustrates a session message. A session message is a higher-order message that includes session information as well as a "session_summary" object and an array of "event" objects. The "meta" object 2360 is the same as the "meta" object in previously described event messages. A number of key/value pairs 2362 describe session-related information. The "session_summary" object describes the number of events included in the session message and other information related to the session 2364. Finally, the key/array pair "events" 2366 includes the traditional enriched-event data for each of a series of events.

The data within a JSON-encoded data message may alternatively be described using a hierarchical notation. The alternate hierarchical notation for the extended event message shown in FIG. 23C is provided in FIG. 23E. The keys within the "meta" object are specified by strings that begin with the substring "meta" 2370. The keys contained in the data object 2342 are specified with strings that begin with the substring "data" 2372. The keys contained within the "ext" object 2344 are specified by symbol strings that begin with the substring "ext" 2374. Periods are used to delimit hierarchical levels. For example, there is only a single hierarchical level within the meta object and thus all of the keys within the meta object of FIG. 23E include a single period between the substring "meta" and the names of the keys of the key/value pairs contained in the meta object. By contrast, the keys that occur within the "wt" object that, in turn, lies within the "data" object 2342 include two periods 2376 to indicate two hierarchical levels. The hierarchical key names shown in FIG. 23E can be thought of as the names of variables, and the corresponding values are the values stored in the variables.

Figure 24A:
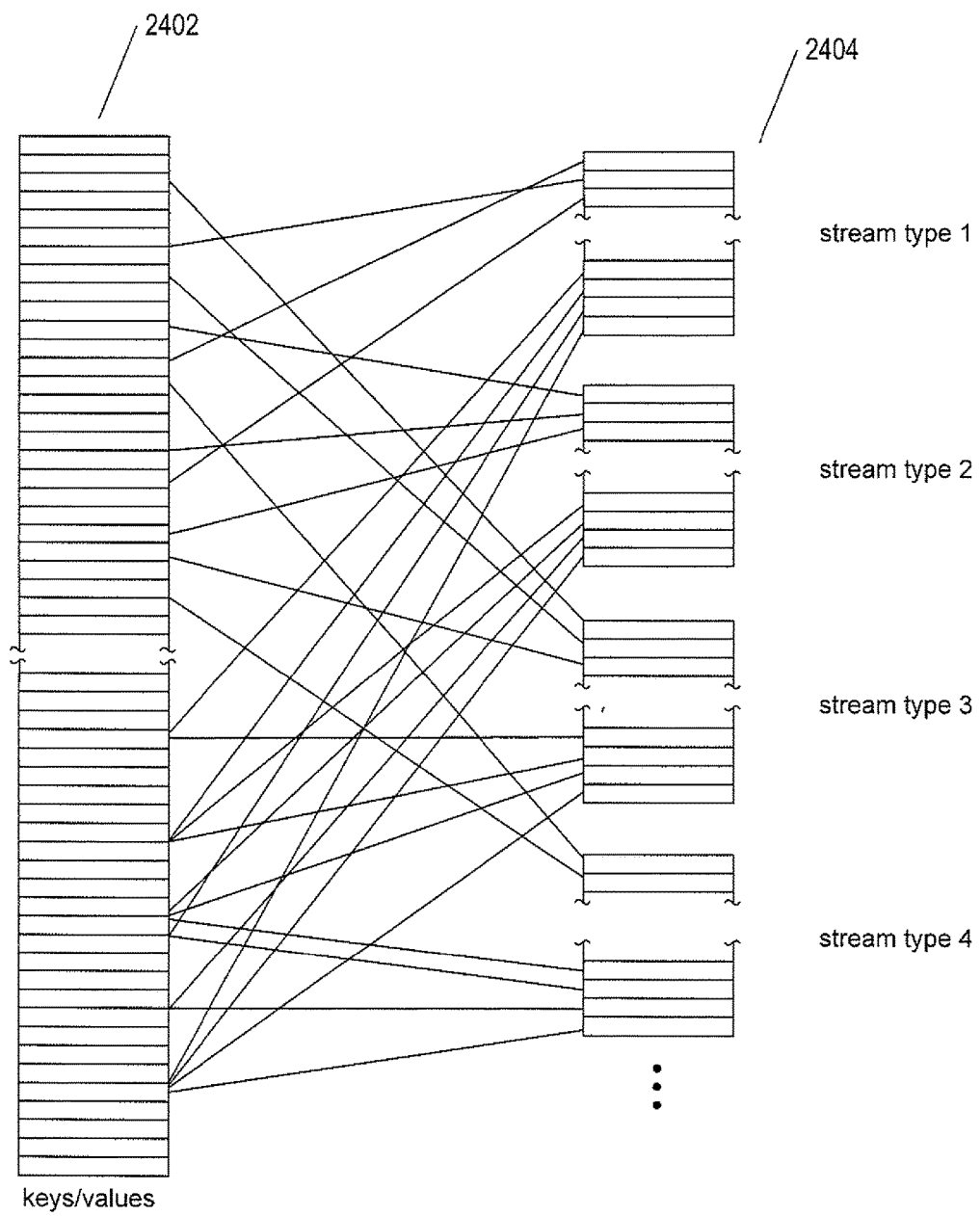
FIGS. 24A-B illustrate the data that is collected by instrumentation and eventually passed to consumers of data messages produced by the processing center.
Figure 24B:
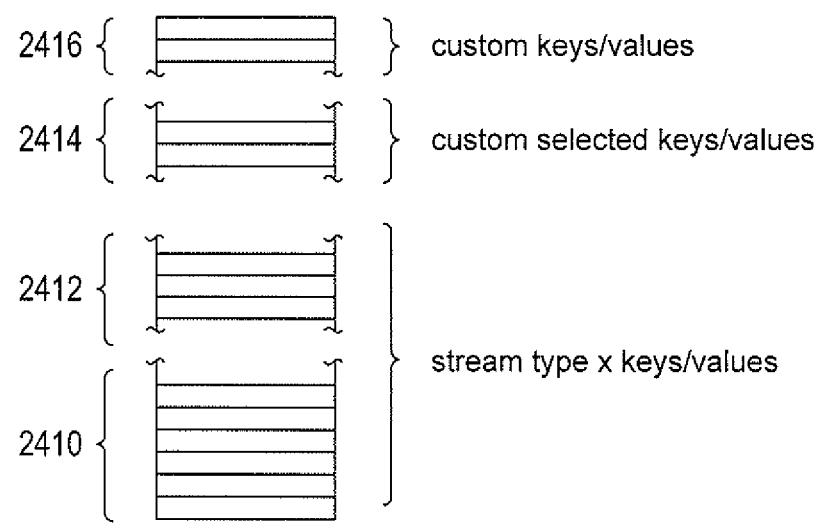

FIGS. 24A-B illustrate the data that is collected by instrumentation and eventually passed to consumers of data messages produced by the processing center. In FIG. 24, a left-hand column 2402 represents a very large number of different types of data values that may be collected within a script executing within an execution environment provided by a web browser by instrumentation code. Each cell within the column represents a different data value. Almost any type of data value that can be accessed from the script or computed by the script is a candidate for data collection by instrumentation. The data values may be values produced by system calls, such as a call to a system-time routine or a call to retrieve the IP address of the computer within which the web browser is executing. Other values include data values that indicate a particular state of a displayed web page within the context of a web site, such as indications of pages, sections, and subsections currently accessed by a user, indications of various types of input events to web pages, indications of other web sites through which a user passed in navigating to the current web site, information requested by and displayed to a user, and many other types of information related to a user's interaction with the web site. The data values are named hierarchically, as discussed above with reference to FIG. 23E, or, equivalently, associated with key symbol sequences encoded within a JSON-encoded message. In either case, each data value is uniquely named and can be extracted from the parameters within a URL passed to a data-collection system by a web browser executing on a remote user computer.

As discussed above, with reference to FIG. 22, a client of the real-time, processed-data streaming system may open up a communications socket to receive a stream of processed data messages. Different types of streams may be requested. As shown in FIG. 24, each different stream type, such as stream type 1 2404, represents a subset of the data values that may be collected by instrumentation. Each different stream type therefore identifies a different subset of data values and therefore represents a type of data filtering that results in streaming only a desired subset of the possible data types to a particular client through a particular communications socket, rather than streaming all possible collected data and requiring the client to expend communications and processing bandwidths to receive and process a large amount of data in each data message in order to obtain a desired subset of the data values.

FIG. 24B illustrates the types of data values that may be included in a data message streamed to a client. These data values may include a set of data values common to all data messages 2410, a set of data values unique to a particular stream type 2412, additional, custom-selected data values selected from the set of data values represented by column 2402 in FIG. 24A 2414, and additional data values specified by a particular client 2416. In the case of the latter data values, instrumentation is modified in order to collect the client-specified data values 2416 not included in the data values that may be collected by existing instrumentation within the real-time, processed-data-streaming service, represented by column 2402 in FIG. 24A.

Figure 25A:
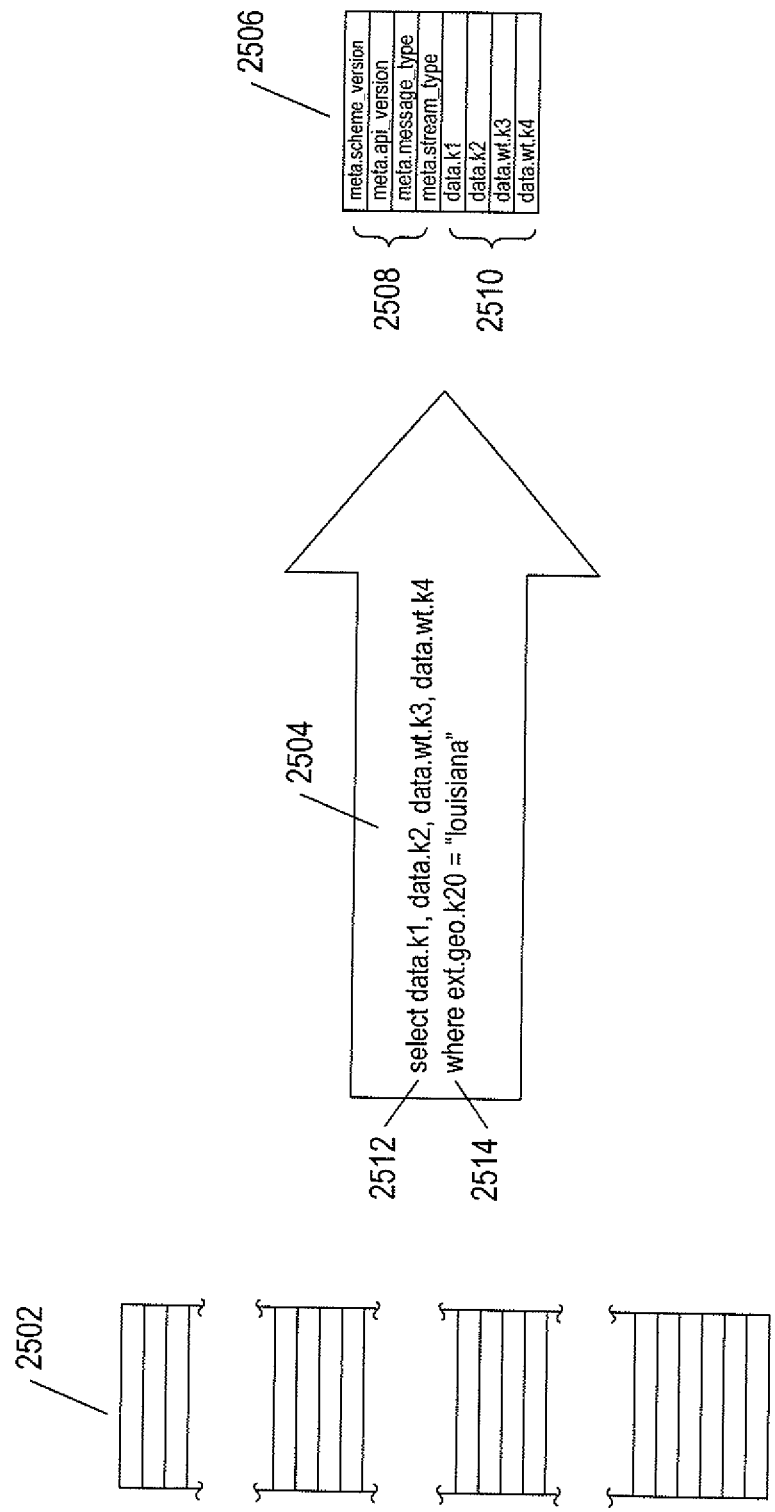

FIGS. 25A-B illustrate query-based filtering of the data stream by the processing center prior to directing the data stream to a client application. In FIG. 25A, the collection of data values that together represent those data values specified by a stream type as well as by custom selection or definition by a client are represented by column 2502, as they are represented in FIG. 24B. The processing center applies a client-specified query 2504 to each data message, prior to transmitting the data message into the stream of data messages directed to a client. The query represents a second-level filter that may filter out entire data messages or portions of data messages. In the example shown in FIG. 25A, as a result of query 2504, the final data message 2506 added to the stream directed to the client includes only the meta-object data values 2508 and four additional data values 2510 selected by the query 2504. Queries may include a "select" clause, a "where" clause, or both a "select" and a "where" clause. Query 2504 includes a "select" clause 2512 that selects four specific data values to include in data messages streamed to the client as well as a "where" clause 2514 that filters out data messages other than data messages that contain the data value "louisiana" associated with the key "ext.geo.k20."

FIG. 25B illustrates a number of different queries. The query 2520 selects all data values included in incoming data messages of a particular stream type and selects all of the incoming data messages, since there is no "where" clause associated with the query. The "*" symbol, in a query, is a wild-card symbol and, in query 2520, stands for all possible keys. Query 2522 selects a number of specific data values to include in data messages streamed to the client who issued the query in a connection request. Query 2524 is similar, but selects, using the wild-card symbol, all of the data values in the object "data" and the object "geo" within an event message. Query 2526 selects specific session-related data values and all of the events within a session message, but only for those session messages that represent a complete session, as specified by the "where" clause "where session.closed='true.'" Query 2528 includes only a "where" clause and selects only closed session messages that represent sessions in which users did not purchase anything from a web site. The query language is SQL like, supporting a variety of Boolean connectors, parentheses, comparison operators, and other common SQL-like query language features.

Figure 26:
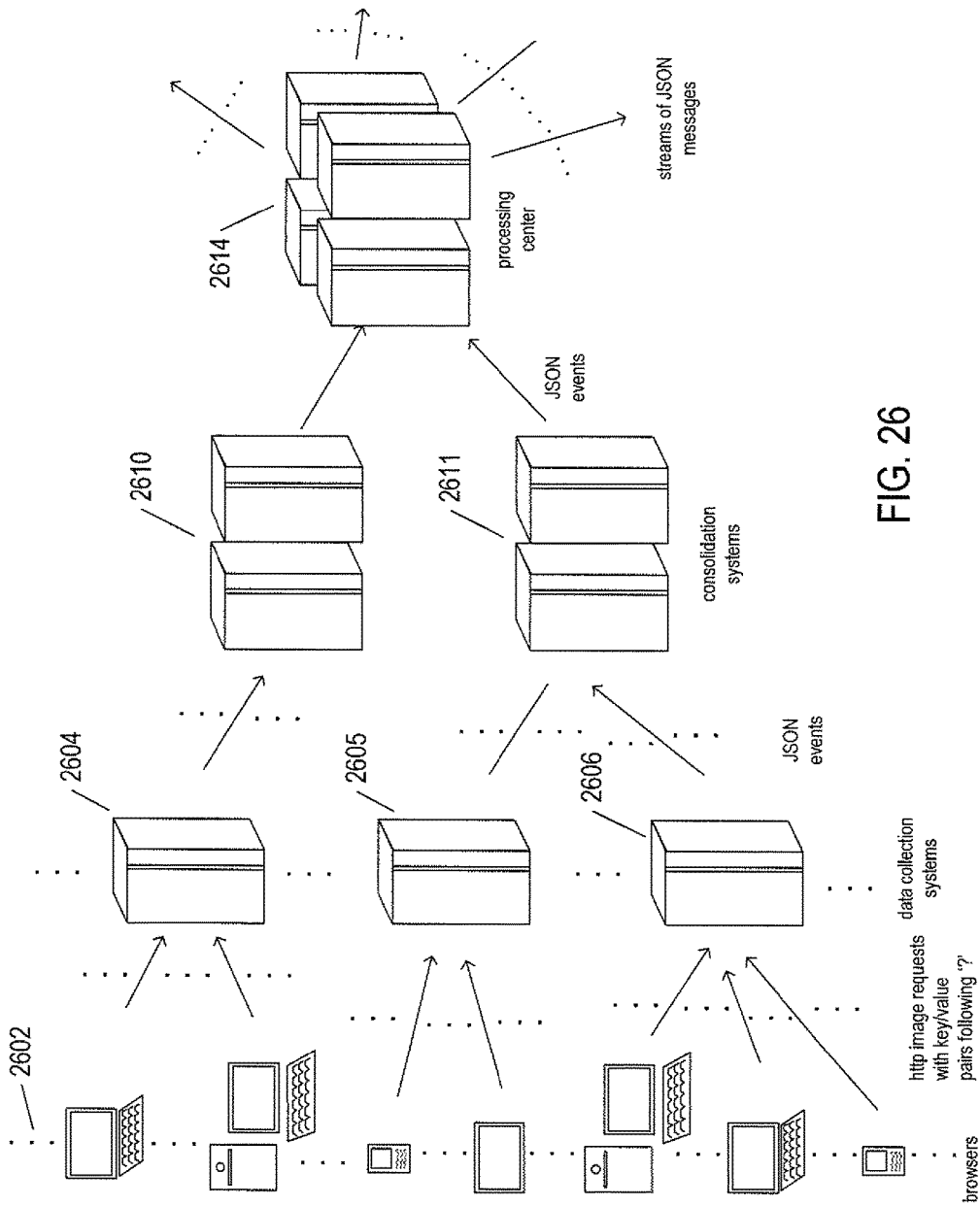
FIG. 26 illustrates, in a fashion similar to FIG. 20, an example of the real-time, processed-data streaming system.

FIG. 26 illustrates, in a fashion similar to FIG. 20, an example of the real-time, processed-data streaming system. As discussed previously, data collection occurs within HTML files or scripts executed by browsers running within the remote processor-controlled user appliances shown in column 2602. Web browsers make HTTP requests for resources, specified by URLs, that are directed to various different geographically dispersed data-collection systems 2604-2606. Listener processes within the data-collection systems receive the parameter string following the "?" symbol in the URL specification of a resource, generate, from the key/value pairs in the parameter string, a JSON-encoded event message, and transmit the JSON-encoded event messages to a consolidation system 2610 and 2611.

In one implementation, the consolidation systems comprise a large number of servers that execute, in a distributed fashion, the Kafka distributed messaging system. Kafka is a distributed messaging system developed for collecting and delivering high volumes of log data with low latency. Kafka processes streams of incoming messages, dividing the incoming messages into messages belonging to each of a number of categories, referred to as "topics." The real-time, processed-data streaming system may, for example, partition collected data into topics that each corresponds to a different client organization. Kafka further partitions topics into topic partitions, each of which comprises a set of segment files stored in memory and/or mass-storage devices. Kafka also defines brokers, which are distributed processes, each of which may process incoming messages for a particular set of topics and topic partitions. Messages are input to Kafka by producers, and thus, in the system, the data-collection systems represent the producers. The Kafka system aggregates the incoming messages for each topic and stores the messages in segment files for subsequent retrieval by consumers. In the data-acquisition system, the processing center or processing centers 2614 are the consumers of messages consolidated by the Kafka distributed messaging system. Incoming messages are appended to a current in-memory segment file. Once the segment file fills up, it is flushed to mass storage, at which point the messages are made available to consumers. Kafka stores messages for a defined period of time, often on the order of a week. During that time, consumers may repeatedly access messages. In general, the Kafka distributed message system acts as a kind of very large input/output queue, with the lag time between message input and message consumption on the order of seconds or fractions of seconds, when used in the real-time processed-data streaming system.

In one implementation, the real-time processed-data streaming system employs a Storm big-data processing system within the processing center. Storm is an open-source system originally developed for handling Twitter messages. Storm is fully distributed and features high performance, fault-tolerance, and guaranteed message processing. The conceptual model for Storm is a graph representing interconnections between spouts, which are data sources, and bolts, which are data-processing entities. Spouts pull data messages from the consolidation systems and pass the data messages on to one or more bolts, each of which performs processing activities, including enrichment, query filtering, and other such processing. The spouts and bolts are interconnected by communications paths, with the furthest-downstream bolts emitting processed data messages through communications sockets to client applications.

Figure 27:
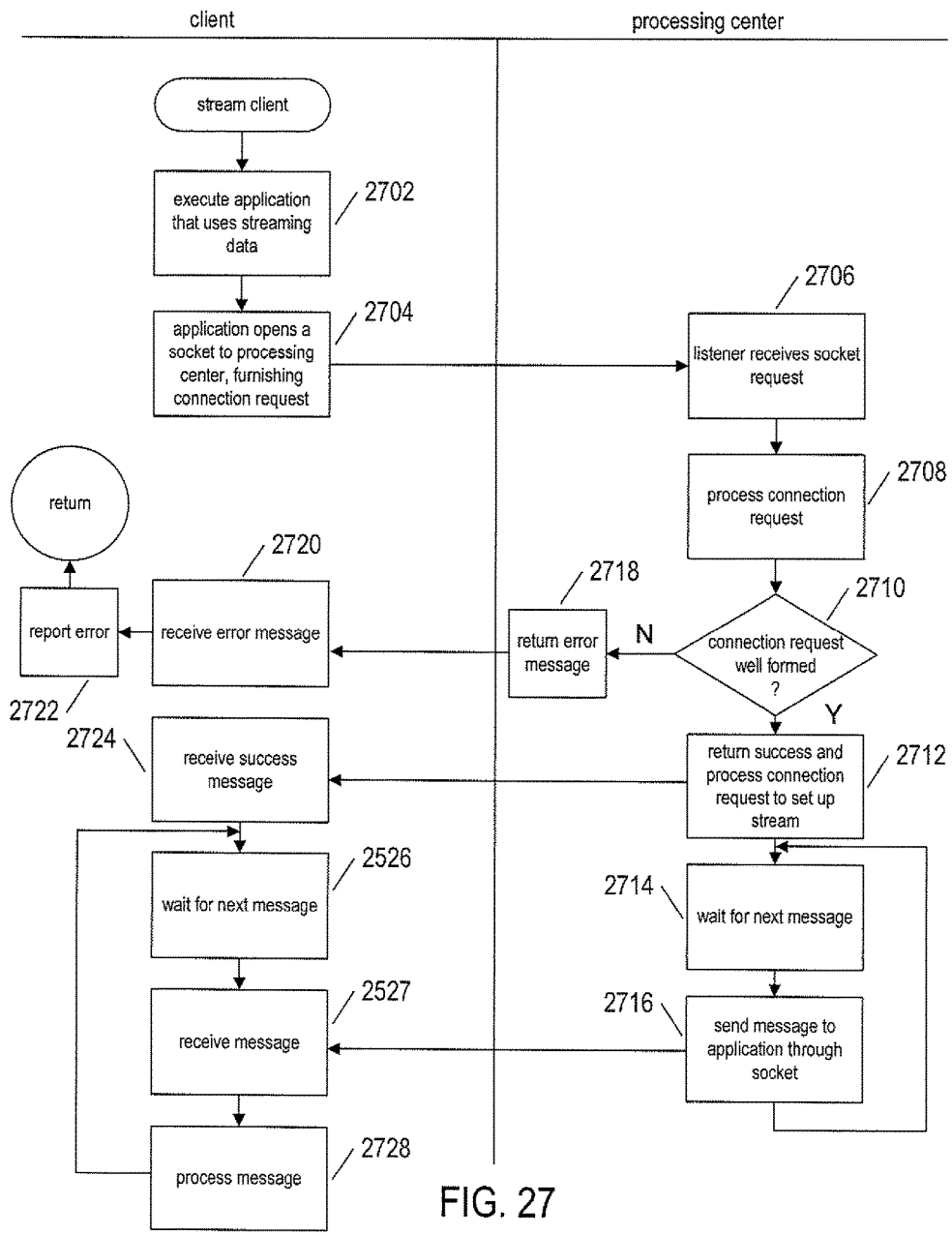
FIG. 27 illustrates the interaction between a client of the data-streaming system and the processing center in the implementation shown in FIGS. 20 and 26.

Next, operation of the real-time processed-data streaming system is discussed with reference to numerous control-flow diagrams. FIG. 27 illustrates the interaction between a client of the data-streaming system and the processing center in the implementation shown in FIGS. 20 and 26. As discussed above, the client is generally an application program that runs on a client computer system and that renders incoming, streaming processed-data messages for visual display in the context of a monitor display or console display. In FIG. 27, client activities are shown on the left-hand side of the diagram and processing-center activities are shown on the right-hand portion of the diagram. In step 2702, the client executes the application program that uses streaming data. In step 2704, the application program executes an open-socket command, furnishing to the command a JSON-encoded connection request, as discussed above with reference to FIG. 22. In step 2706, a listener process within a processing center receives the socket request and, in step 2708, processes the connection request. Processing involves authorizing the access using the access token supplied in the connection and parsing the connection request. When the connection request is well formed, as determined in step 2710, then, in step 2712, the processing center processes the connection request to set up a stream of processed-data messages for transmission to the client application through the communications socket. This may involve initializing data structures, launching one or more streaming processes, and other such initialization activities. Then, in the continuous loop of steps 2714 and 2716, the one or more streaming processes wait for a next processed-data message for transmission through the communications socket to the application program, in step 2714, and transmit the message to the application program in step 2716. Otherwise, in step 2718, when the connect request is ill-formed, the processing center returns an error message to the client. In step 2720, the client application receives the error message and, in general, reports the error to a client user or administrator, in step 2722. In certain cases, the application program may attempt to correct or change the connection request and resubmit it, automatically, in a new connection request in order to continue execution. When the processing center returns a success message, in step 2712, the client application receives the success message in step 2724 and then enters a continuous loop in which the application program waits for a next processed-data message, in step 2726, receives the message in step 2727, and processes the message in step 2728. As discussed above, processing of processed-data messages generally results in an update of the internal application state and internal data that is either immediately or subsequently reflected in changes in the control display or monitor display viewed by a client user.

Of course, in actual implementations, multiple different cooperating processes may collaborate to carry out the activities described with reference to FIG. 27. Furthermore, any of many different buffering techniques, asynchronous-event handling techniques, and other techniques may be employed to implement stream processing both in the processing center and in the client computer system.

FIGS. 28A-B provide an example of the instrumentation inserted within a web page that carries out data collection. The data collection is initiated, from a web page, by a script (2802 in FIG. 28B) embedded within an HTML file that specifies a particular web page displayed to a user. The script creates a new tag object 2804 and then calls a "dcsCollect" tag member function to collect data and transfer the data to a data-collection system 2806. The "dcsCollect" member function 2808 calls a "dcsTag" function 2810. The "dcsTag" function 2812 creates a URL for a one-pixel resource image and then embeds in the URL, following the "?" symbol, a list of key/value pairs. The URL is contained within the symbol-string variable P which is passed to the "dcsCreateImage" routine 2814. The "dcsCreateImage" routine 2816 makes an assignment to an image variable 2818 which is processed by the browser by using an HTTP request and the URL created by the "dcsTag" routine to fetch the one-pixel image. The one-pixel image is not used for display, but is merely a vehicle for transmitting the key/value pairs encoding in the parameters within the URL to the data-collection system.

It should be noted that the data collected by the instrumentation is unstructured. The value of a key/value pair can be an arbitrary symbol string or an array of symbol strings. Multiple values may be later combined to create longer symbol strings. The data collected is specified by the instrumentation code. The data processing, query-based filtering and selection of data, and data enhancement generally take place downstream, in a processing center or other system remote from where the instrumentation is executed to collect data. There are many advantages to downstream data processing, including the ability of the processing center to emit many different types of data streams from a common collection of data, separately applying different types of queries, filtering, and enhancement to the collected data to generate separate data streams. Furthermore, the instrumentation remains simple and efficient, and does not introduce potentially disruptive computational burdens on processor-controlled user appliances. The data collected via the instrumentation is also relatively independent of the remaining system components. For example, the instrumentation may be modified to collect a new key/value pair, and that key/value automatically ends up passed to data consumers who have not chosen to filter out the key/value pairs using queries. The instrumentation can be, in many cases, modified even while the data is collected and streamed to data consumers.

Figure 29:
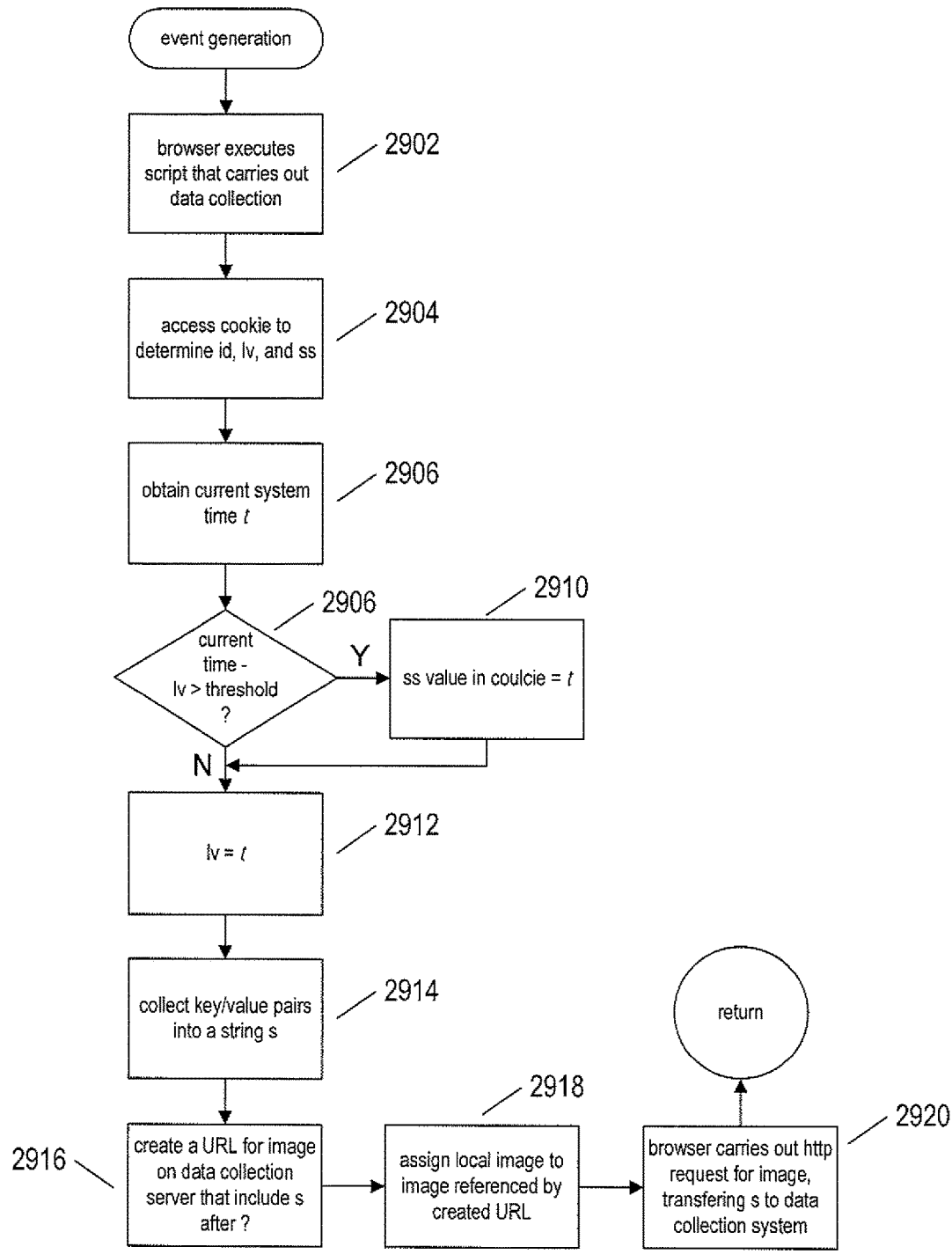
FIG. 29 provides a control-flow diagram that describes the event-generation process within the browser, discussed above with reference to FIGS. 18A-B.

FIG. 29 provides a control-flow diagram that describes the event-generation process within the browser, discussed above with reference to FIGS. 28A-B. In step 2902, the browser executes a script that carries out the data collection. In step 2904, the data-collection code accesses the cookie stored within the processor-controlled user appliance to determine the identifier, last-visit, and session-start values, id, lv, and ss, discussed above with reference to FIG. 21. In step 2906, the browser script obtains the current system time t. When the difference between the current time t and the value lv is greater than a threshold value, as determined in step 2908, then, in step 2910, the value ss stored in the cookie is set to the current system time t to indicate start of a new session. As discussed above, and further discussed below, a session is a group of events related to a particular user/processor-controlled user appliance that all occur within a specified time window. A new session begins when the difference between the current time and the last-visit time stamp is greater than the threshold value. In step 2912, the value lv is set to the current system time t and stored in the cookie. In step 2914, a set of key/value pairs that represent data collected by the instrumentation is collected and formed into a string s that is placed, following the symbol "?," into a URL created for an image resource in step 2916. In step 2918, the browser script executes an assignment or some other statement that results in the browser using an HTTP GET request to fetch the resource specified by the URL from a data-collection system, in step 2920.

Figure 30:
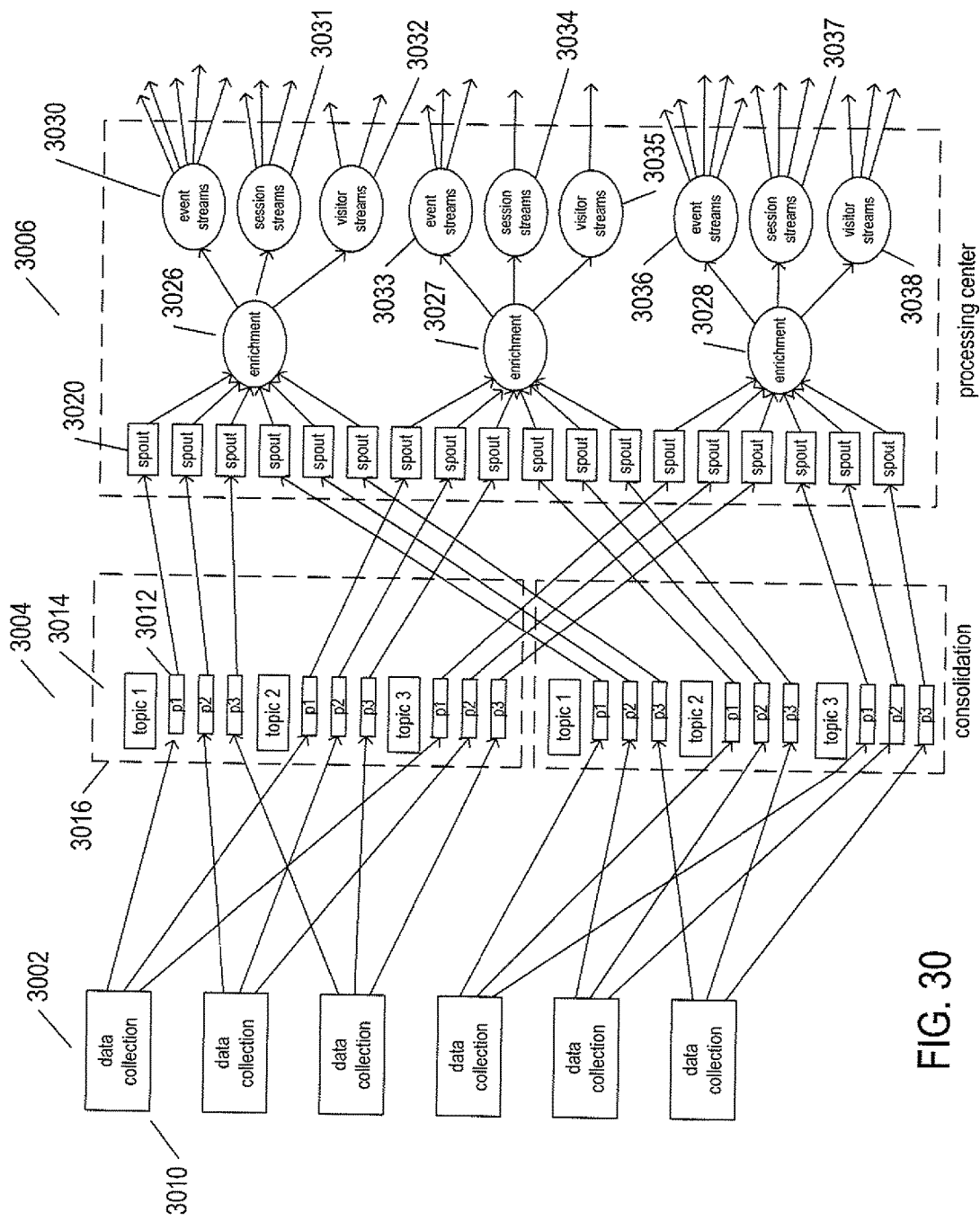
FIG. 30 illustrates one implementation of the real-time processed-data-message streaming system.

FIG. 30 illustrates one implementation of the real-time processed-data-message streaming system. As discussed above, the system includes a set of data-collection systems, represented by column 3002 in FIG. 30, a number of consolidation systems, represented by column 3004 in FIG. 30, and one or more processing centers, represented by column 3006 in FIG. 30. Each data-collection system, such as data-collection system 3010, transmits event messages to a particular partition within each topic of a particular consolidation system, such as partition 3012 within topic 3014 of consolidation system 3016. In general, the data-collection systems may collect data for each of multiple clients/topics. Within the processing center 3006, a spout is associated with each partition within a data-consolidation system, such as spout 3020 associated with partition 3012. The spouts pull event messages from the consolidation systems and emit them to first-level enrichment bolts 3026-3028. The enrichment bolts may carry out a coarse, general filtering and also compute and determine the various enrichment values that are added to an event message to create an enriched event message. The enriched event messages are then passed from the enrichment bolt 3026-3028 to downstream bolts 3030-3038. Each enrichment bolt 3026-3028 is associated with a particular client. Clients may receive a stream of enriched event messages from an event-streams bolt, such as event-streams bolt 3030. The event-streams bolt carries out query-based filtering specific for particular clients prior to emitting a stream of enriched event messages through open sockets to client applications. Session-stream bolts, such as session-stream bolt 3031, carry out additional processing to group data extracted from enriched event messages into session messages, and emit session messages through communications sockets to client applications. Visitor-stream bolts, such as visitor-stream bolt 3032, also aggregate and process enriched event messages to generate visitor data messages, which describe the activities of particular visitors, in real time, within a web site. Other types of bolts produce other types of processed-data messages. These other types of bolts may perform various types of data aggregation to allow a client application to display various types of aggregate and collective data representing, in general, multiple events associated with multiple web-site users.

Many other collections of component systems, organizations of component systems, and message-passing topologies may be used to produce alternative implementations of the real-time processed-data streaming system. Many different topologies may be used within the Storm distributed system for implementing enrichment, filtering, and aggregation.

Figure 31:
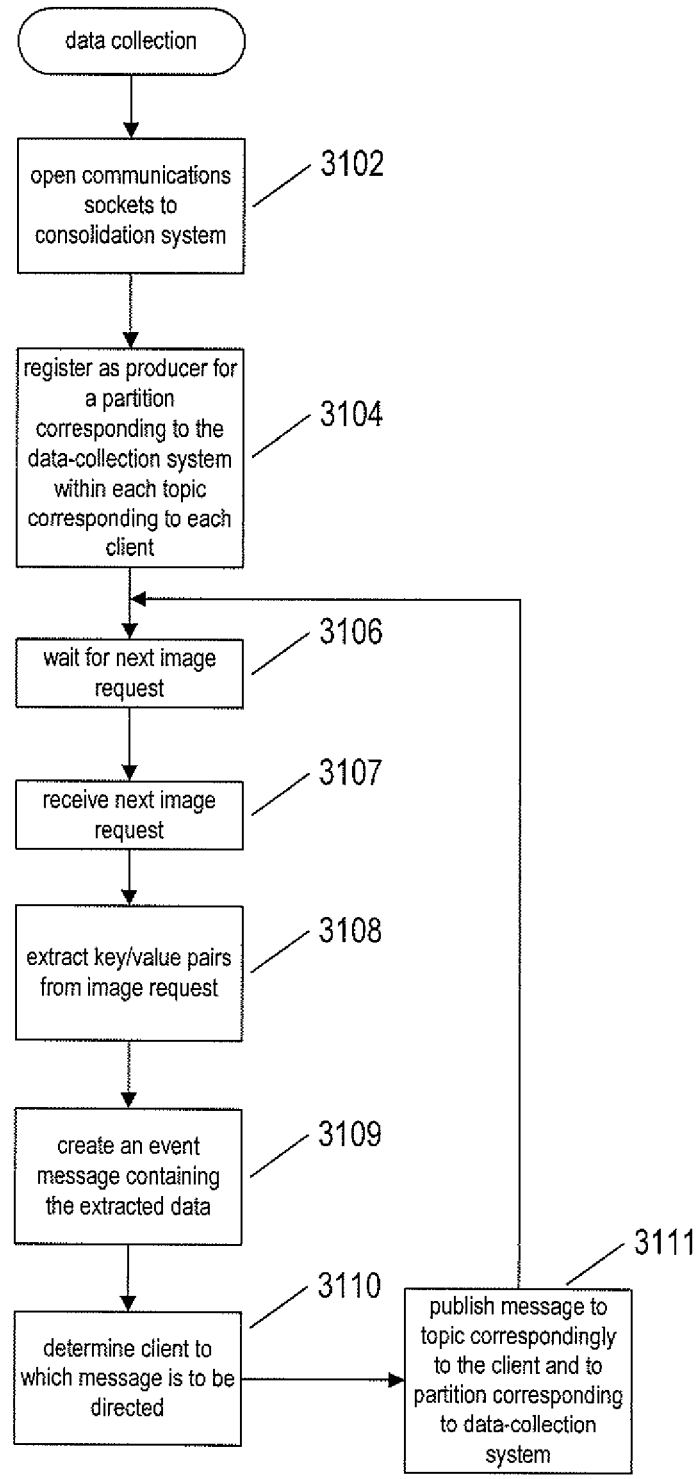
FIG. 31 illustrates operation of a data-collection system.

FIG. 31 illustrates operation of a data-collection system. In step 3102, the data-collection system opens a set of communications sockets to a consolidation system. In step 3104, the data-collection system registers as a producer for a partition corresponding to the data-collection system within each topic corresponding to each client receiving real-time processed-data-message streams. Then, in the continuous loop of steps 3106-3111, the data-collection system waits for a next image request, in step 3106, receives a next image request in step 3107, extracts the key/value pairs from the image request in step 3108, creates a JSON-encoded event message containing the extracted data in step 3109, determines, from the extracted data, the client to which the message is to be directed, in step 3110 and, in step 3111, publishes the JSON-encoded event message to the topic corresponding to the client and to the partition corresponding to the data-collection system of a consolidation system. Note that the waiting step 3106 does not imply, in this control-flow diagram, that a separate wait operation is executed prior to receiving each image request. Instead, when image requests are received continuously, batches of image requests may be processed following each wait operation, similar to the methods by which operating systems field hardware interrupts and invoke corresponding interrupt handlers.

Figure 32:
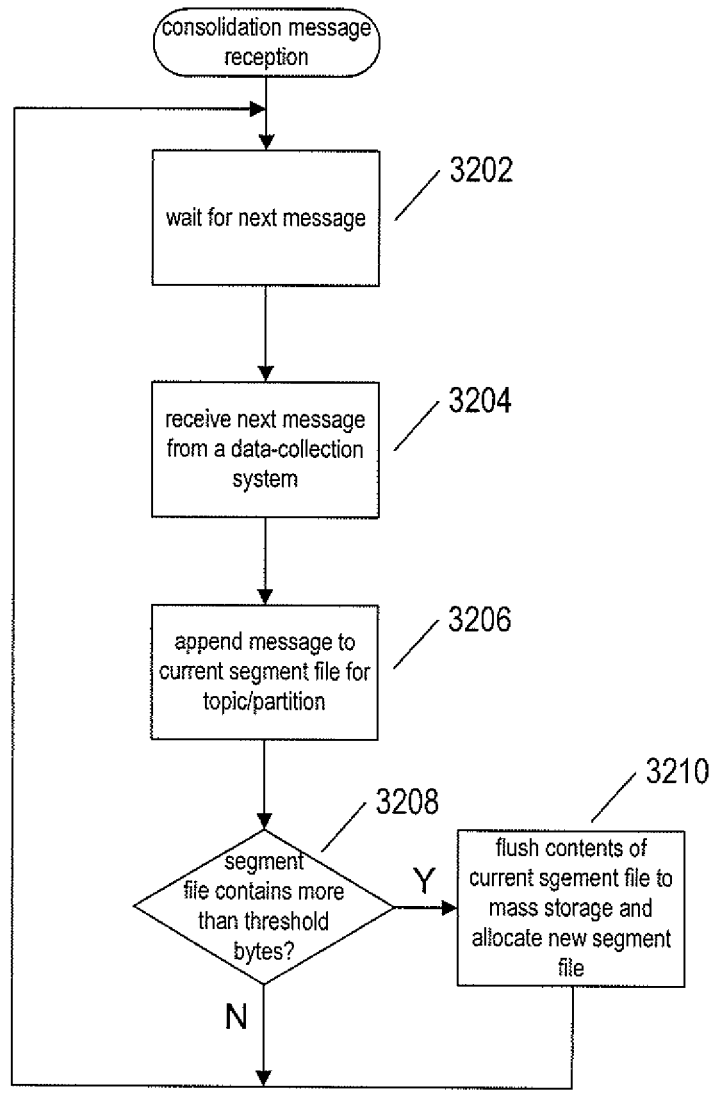
FIGS. 32-33 provide control-flow diagrams that illustrate operation of a consolidation system.
Figure 33:
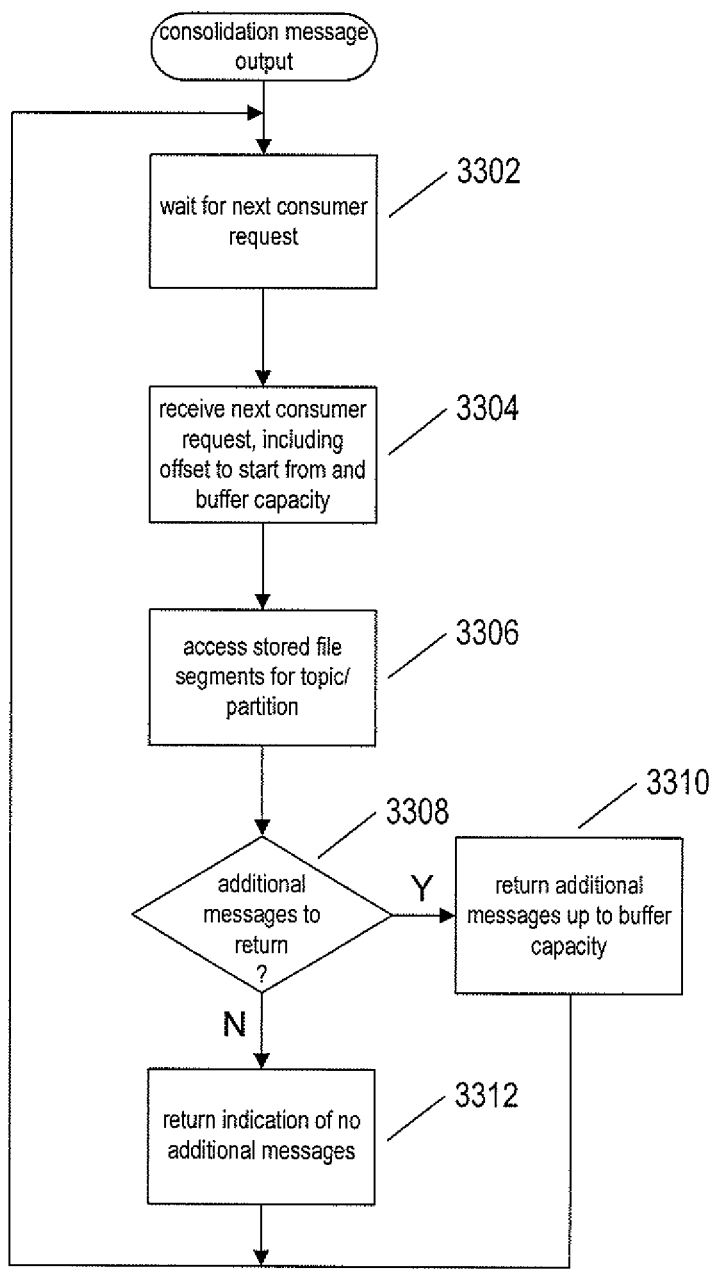

FIGS. 32-33 provide control-flow diagrams that illustrate operation of a consolidation system. FIG. 32 shows a message-reception portion of consolidation-system operation. In step 3202, the consolidation system waits for a next JSON-encoded event message from a data-collection system. Again, as with the data-collection systems, actual waiting for message-arrival events may occur only rarely when messages are received continuously by the consolidation system. In step 3204, the consolidation system receives a next JSON-encoded event message from a data-collection system. In step 3206, the consolidation-message system appends the received message to a current segment file for the topic/partition to which the message was directed. The segment file contains more than a threshold number of bytes, as determined in step 3208, and the contents of the segment file are flushed to mass storage and a new segment file allocated for reception of subsequent messages directed to the topic/partition, in step 3210.

FIG. 33 illustrates the output side of a consolidation system. In step 3302, the consolidation system waits for a next consumer request. In step 3304, a next consumer request is received. Consumer requests generally include an offset within a segment file from which to start outputting messages and a buffer capacity of the consumer for storing messages. In step 3306, the consolidation system accesses one or more stored segment files that store messages starting from the offset up to a number of successive messages that would fill the buffer capacity. When there are additional messages stored in those segment files, as determined in step 3308, then additional messages up to the buffer capacity are returned to the requesting consumer in step 3310. Otherwise, an indication of no additional messages is returned to the consumer in step 3312.

Figure 34:
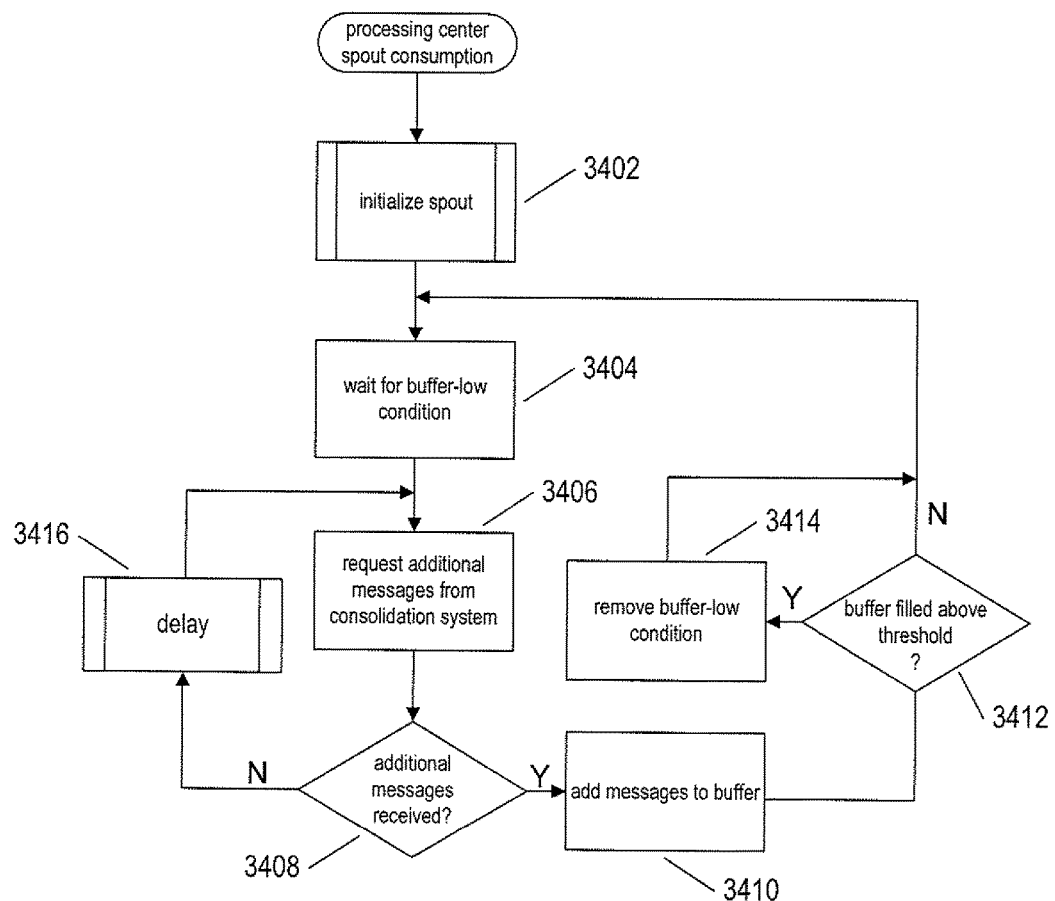
FIGS. 34-38 illustrate operation of the processing center.

FIGS. 34-23 illustrate operation of the processing center. FIG. 34 illustrates spout consumption of JSON-encoded event messages supplied by consolidation systems. In step 3402, the spout is initialized. In step 3404, the spout waits for a buffer-low condition indicating that the spout can solicit and store additional messages. In step 3406, the spout requests additional messages from the consolidation system. If additional messages are received, as determined in step 3408, then the additional messages are added to the buffer in step 3410. When the buffer now contains more than a threshold amount of data, as determined in step 3412, the buffer-low condition is removed in step 3414. When no additional messages are received, then the spout may delay, in step 3416, before again requesting messages from the consolidation system in step 3406.

Figure 35:
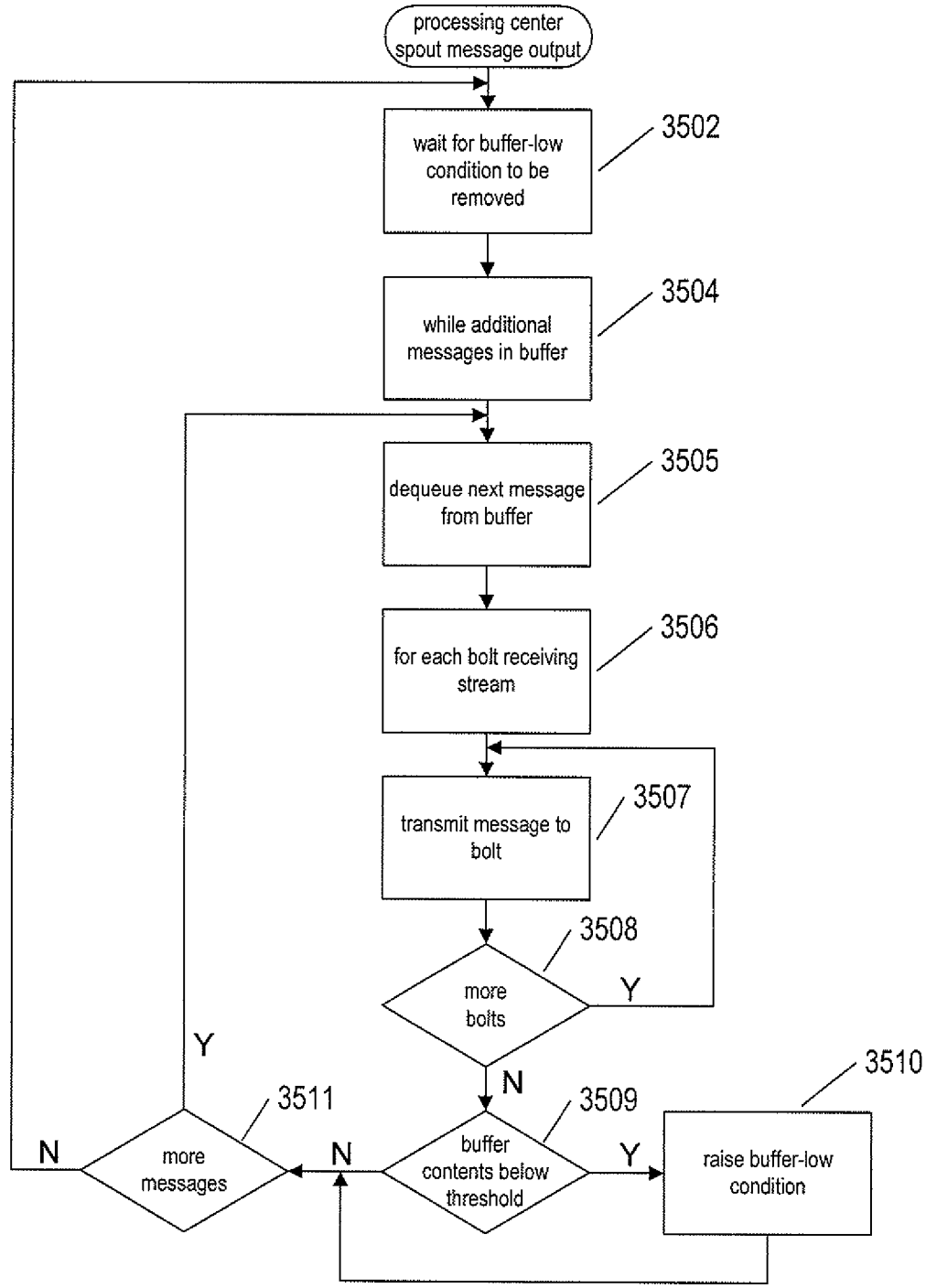

FIG. 35 illustrates the output function of the spout within a processing center. In step 3502, the spout waits for a buffer-low condition to be removed. Then, while there are additional messages in the buffer, the spout carries out the while-loop of steps 3504-3511. In step 3505, the spout dequeues the next message from the buffer and then, in the inner for-loop of steps 3506-3508, transmits the message to each bolt that receives messages from the spout. When the buffer contents are below a threshold value, after processing of the next message, as determined in step 3509, the spout raises the buffer-low condition in step 3510. When there are more messages to retrieve from the buffer, as determined in step 3511, control returns to step 3505. Otherwise, control returns to step 3502.

Figure 36:
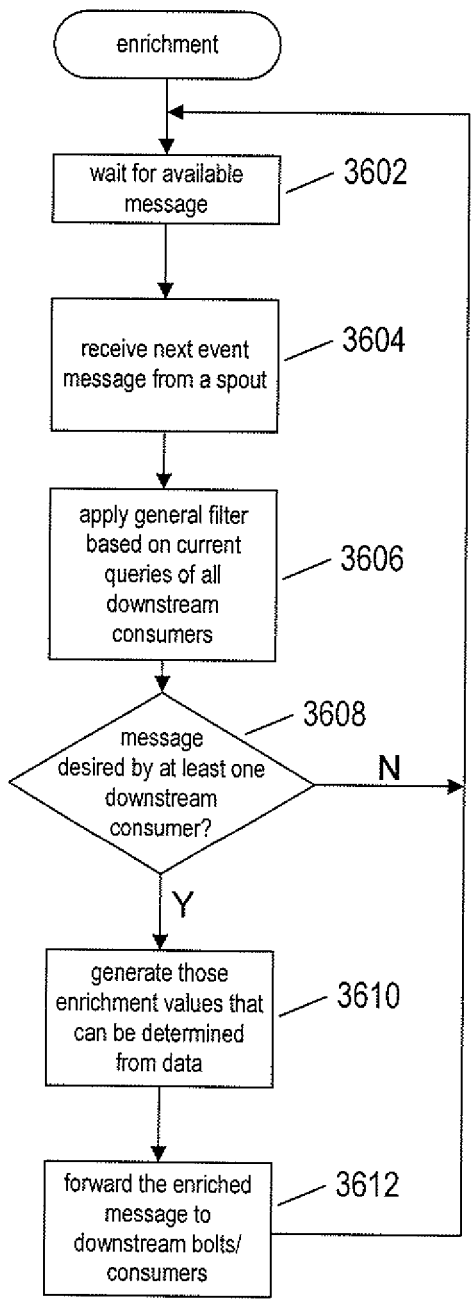

FIG. 36 illustrates operation of an enrichment bolt. In step 3602, the bolt waits for a next available message to process. In step 3604, the bolt receives the next message from a spout. In step 3606, the enrichment bolt applies a general filter based on the current queries for downstream consumers of messages emitted by the enrichment bolt in order to discard messages that would not survive downstream filtering based on specific queries. When the message is desired by at least one downstream consumer, as determined in step 3608, then, in step 3610, the enrichment bolt generates the enrichment values that can be determined from data included in the received event message as well as other sources of information and accessible to the bolt and computation undertaken by the bolt. Following enrichment, in which the generated data values are included in the "ext"

object of the enrichment message, the enriched message is forwarded to downstream bolts and consumers in step 3612.

Figure 37:
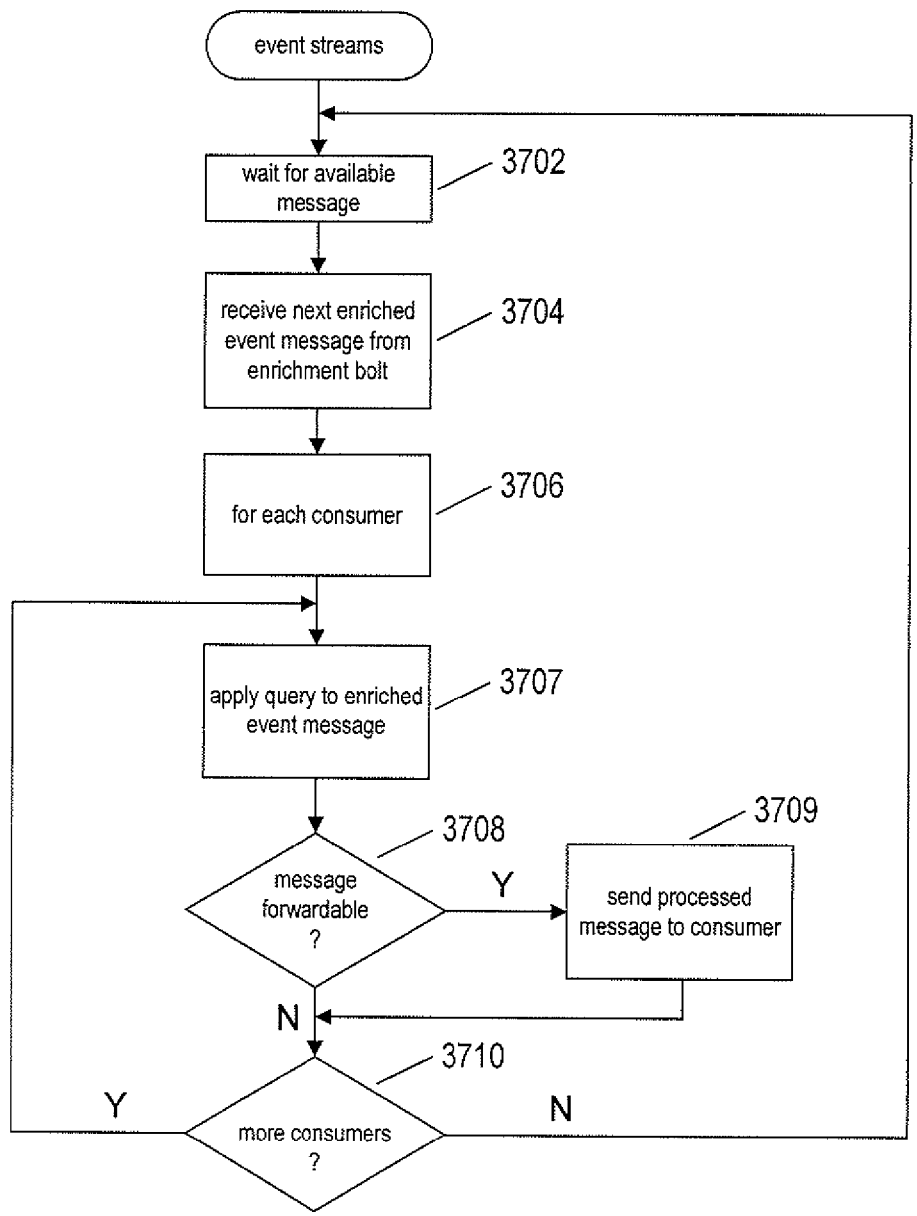

FIG. 37 illustrates operation of an event-stream bolt. In step 3702, the event-stream bolt waits for a next message from an enrichment bolt. In step 3704, the event-stream bolt receives a next enriched event message from an enrichment bolt. Then, in the for-loop of steps 3706-3710, the event-stream bolt applies a consumer-specific query for each consumer to the enriched event message, in step 3707 and, when, following application of the query, the message remains forwardable to the specific consumer, as determined in step 3708, sends the processed and filtered message to the consumer in step 3709.

As discussed above, instrumentation may be modified while data is being collected from remote processor-controlled user appliances and streamed to data consumers. When instrumentation is altered or modified within a particular remote processor-controlled user appliance to collect new types of data, as one example, and when data collection from the remote processor-controlled user appliance is resumed, the new types of data collected by the instrumentation is directed into the ongoing data-collection, data-consolidation, data-processing, and processed-data stream, without interrupting or reconfiguring the ongoing processed-data stream. In a similar fashion, a query specified by a data-consumer may be modified by the data consumer during data collection from remote processor-controlled user appliances and streaming of corresponding processed data to the data consumer. In certain implementations, an out-of-band query-modification protocol allows a data-consumer to modify a query currently being applied by the data-processing center on behalf of the data consumer. In alternative implementations, the data consumer, while receiving processed data through an initially opened socket, opens a new socket/connection to the data-processing center using a new or modified query, and, once processed begins to be received through the new socket/connection, closes the initially opened socket and a carries out, if needed, a temporary de-duplication on processed data received while both the initially opened socket and the new socket were open. This same principle applies throughout the real-time processed-data-message streaming system. Once instrumentation is activated on one or more remote processor-controlled user appliances, data is continuously transmitted from the one or more remote processor-controlled user appliances to one or more data-collection systems, from which the data traverses the remaining component systems of the real-time processed-data-message streaming system, finally ending up in one or more processed-data streams. Should a data-collection system be brought down for any of various reasons, data can be automatically rerouted to other or new data-collections systems. Similar considerations apply to the other systems and subsystems within the real-time processed-data-message streaming system. In a case in which all data-processing centers temporarily go offline, the data can accumulate in data-consolidation systems and can then subsequently be transferred to a data-processing center that is restarted, without data loss and with only a temporary interruption in processed-data streaming. The various functionalities within each of the components of the real-time processed-data-message streaming system may be modified, on the fly, without interrupting data collection and data streaming, providing that other systems remain functional during modification of the functionality on a particular component system.

Figure 38:
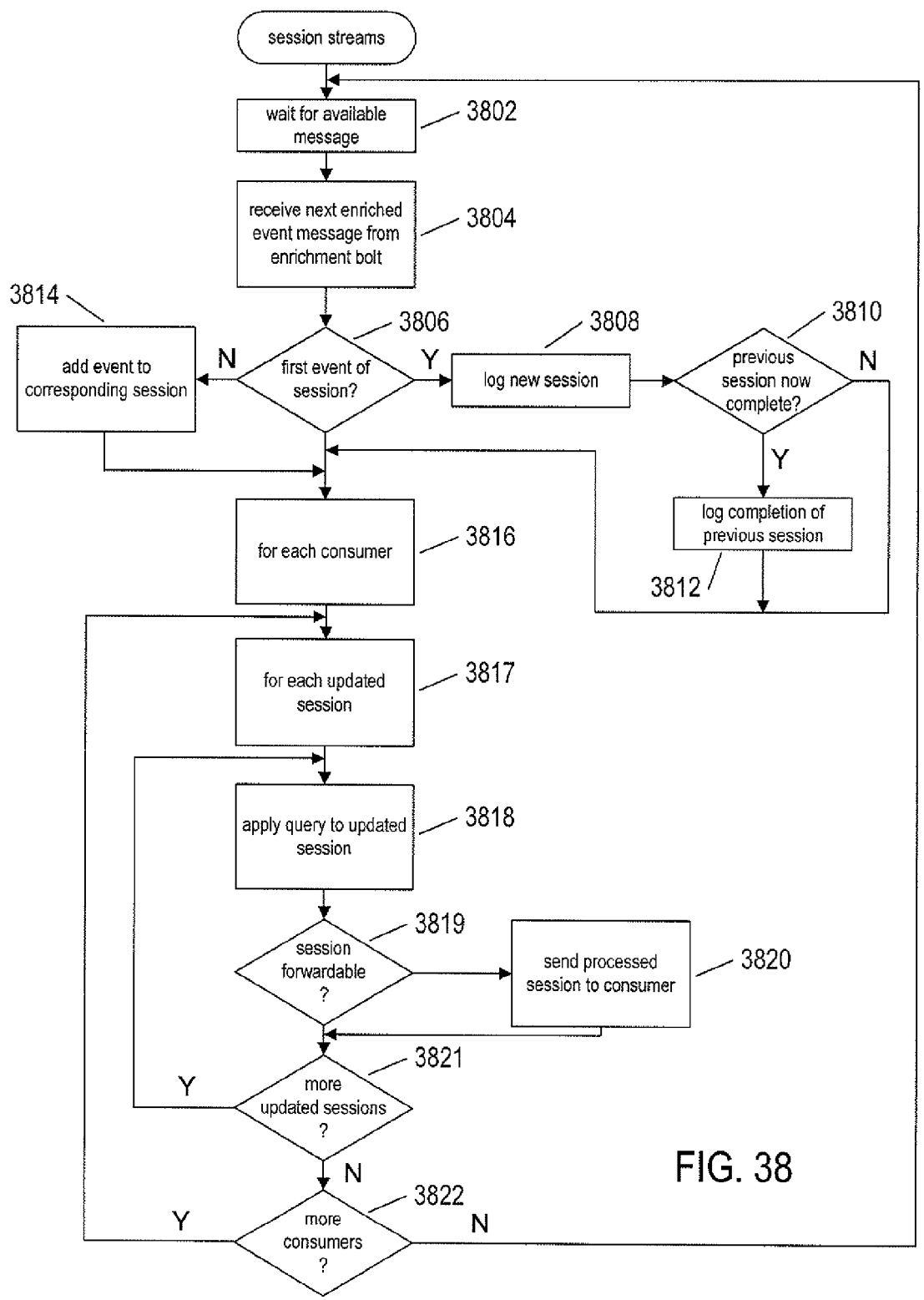

FIG. 38 provides a control-flow diagram that illustrates operation of a session-stream bolt. In step 3802, the session-stream bolt waits for a next available message from an upstream enrichment bolt. In step 3804, the session-stream bolt receives a next enriched event message from the enrichment bolt. When the enriched event message corresponds to the first event of a session, as determined in step 3806, a session-stream bolt logs a new session for the user/processor-controlled user appliance identified by the id value in step 3808. When logging of the new session results in a previous session now being complete, as determined in step 3810, completion of the previous session is logged in step 3812. Otherwise, when the received enriched event message does not correspond to the first event of a session, the data in the received enriched event message is added to a corresponding current session in step 3814. Next, in the nested for-loops of steps 3816-3822, the session-stream bolt considers each updated session currently managed by the session-stream bolt and, for each consumer of session streams, applies the consumer's query to the updated session, in step 3818, to determine, in step 3819, whether the session is forwardable to the consumer following filtering. If so, then a session message corresponding to the updated session is generated and transmitted to the consumer in step 3820. The session-stream bolt may also consider, in a separate loop, those sessions that have not been updated to detect sessions that have terminated due to the elapse of a greater than threshold amount of time, and log those sessions as complete prior to undertaking the nested for-loop of steps 3816-3822.

Figure 39:
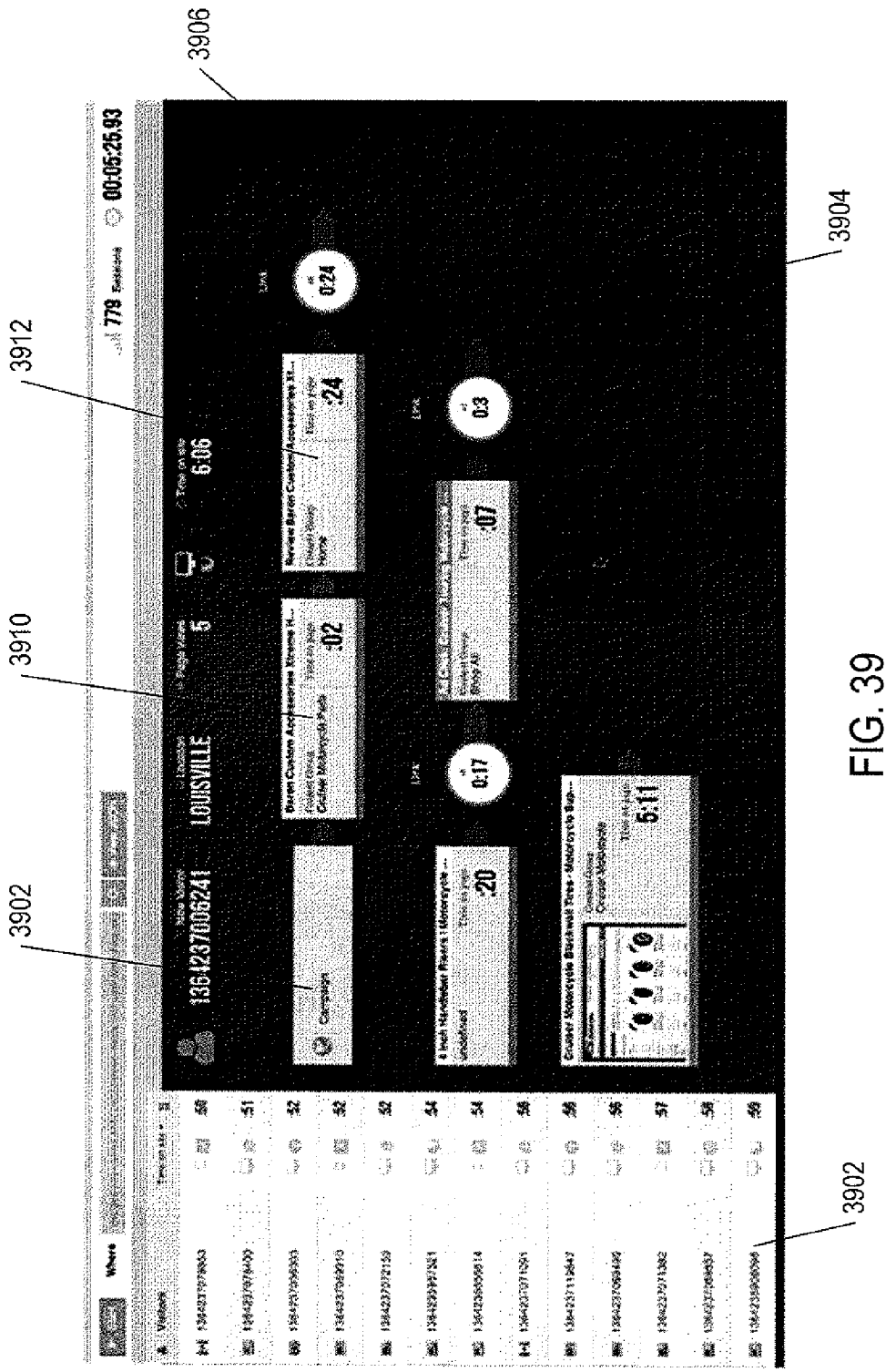
FIG. 39 shows an example monitor display for a web site that visually represents current visitors.

As discussed above, in addition to event streams and session streams, various additional types of streams may be generated by one or more bolts within the processing center and emitted to consumer applications. One such additional type of stream is a visitor stream, which provides information about each current visitor within a web site. FIG. 39 shows an example monitor display for a web site that visually represents current visitors. Current visitors are identified by ID and country in a left-hand column 3902. In a central display panel 3904, progress of a visitor through the web site is graphically illustrated for each of a subset of the current visitors. For example, timeline 3906 illustrates that a particular current visitor arrived at the web site through a campaign 3908, such as an email sent by the website owner to the visitor, initially accessed a Baron custom accessories page 3910, and then, after 39 seconds, accessed a review Baron custom accessories page 3912. A visitor-message data stream thus allows a website owner to, in real time, monitor visitor activities within a web site. This may allow the web site owner to, in real time, alter the content of the web site or produce visitor-specific information to specific visitors in order to direct the visitor to web pages, products, and services that the web site owner may believe to be most conducive for encouraging purchases, as one example.

The real-time processed-data-message streaming system and methods provide many additional opportunities for web site monitoring and dynamic adaptation. It is possible that this system and corresponding methods may provide the foundation for providing unique and completely dynamic customer-specific web-site experiences to customers. The real-time data may also provide the basis for many types of predictions and for initiation of actions and processes based on the predictions.

Automated Segment Discovery

Figure 40:
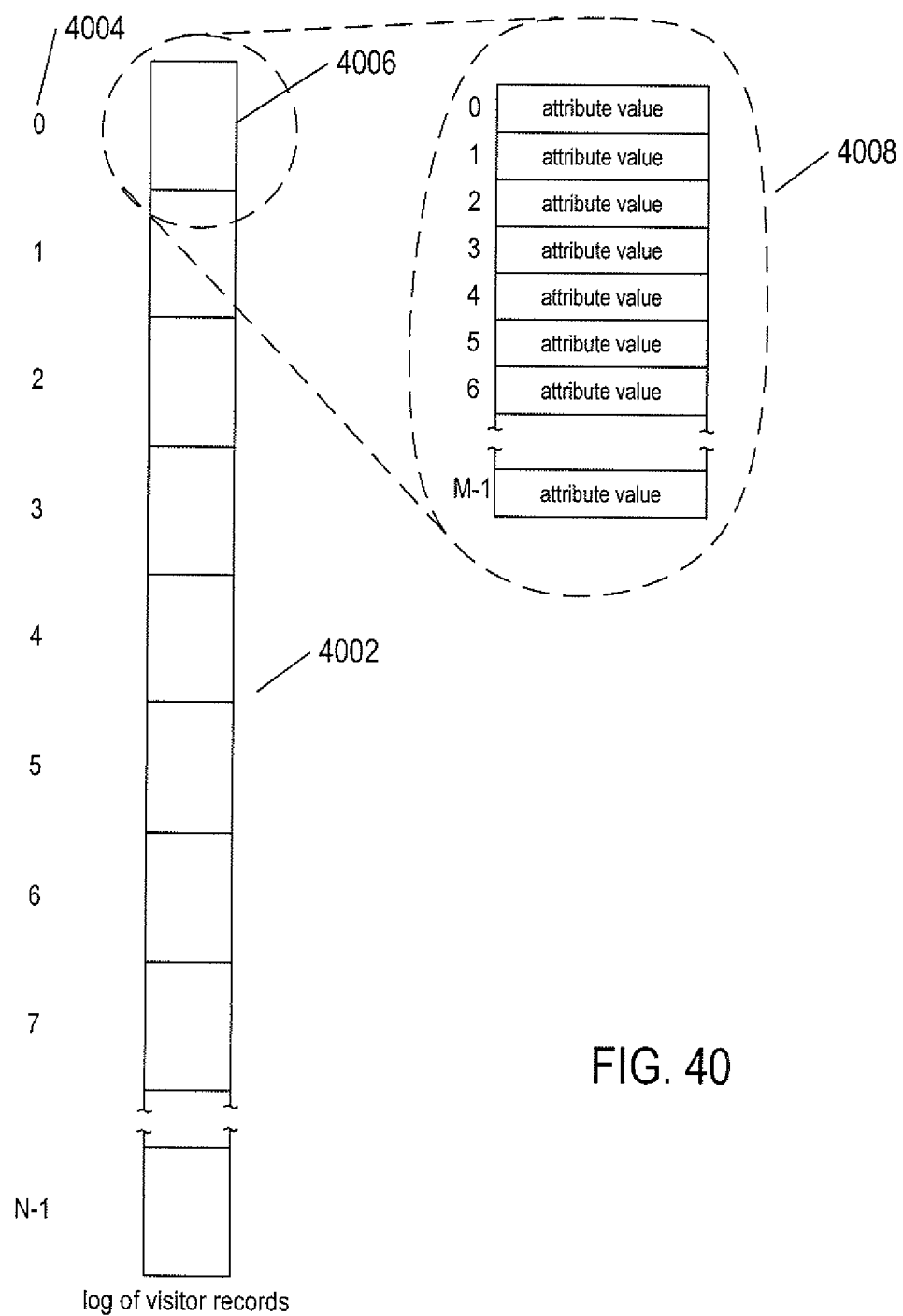
FIG. 40 illustrates the data used, in a described market-segment-discovery-system implementation, as the basis for market-segment discovery.

FIG. 40 illustrates the data used, in a described market-segment-discovery-system implementation, as the basis for market-segment discovery. Market-segment-discovery systems may interoperate with a variety of different types of analysis, optimization, and data-acquisition systems, such as those described in the preceding two subsections, or be included as subsystems within such systems. The underlying information is a log of visitor records 4002. There are N visitor records in the log, with each visitor record uniquely identified, such as by a numeric indication, or index, an example of which is shown as index "0" 4004 associated with the first visitor record 4006. This identification may made in a variety of different ways, and may be implicit, but, from a conceptual standpoint, each visitor record in the log can be uniquely identified. The first visitor record is expanded in inset 4008. It can be seen to consist of M attribute values corresponding to M attributes. This is an representation of a visitor record. In many cases, the visitor record may be a text record with a variety of different text fields, including texturally represented key/value pairs. However, for the purposes of explaining the currently disclosed automatic market-segment-discovery systems and methods, it is assumed that, whatever the actual format and content of visitor records stored in the log, they can be processed to produce an ordered list of attribute values corresponding to some maximum number of possible attributes M. Of course, not all visitor records may contain values for all possible attributes. Those attributes for which values are not provided in a visitor record may be represented by null entries, so that all of the visitor records can be represented as a list of M attribute values, as shown in inset 4008 in FIG. 40.

Figure 41:
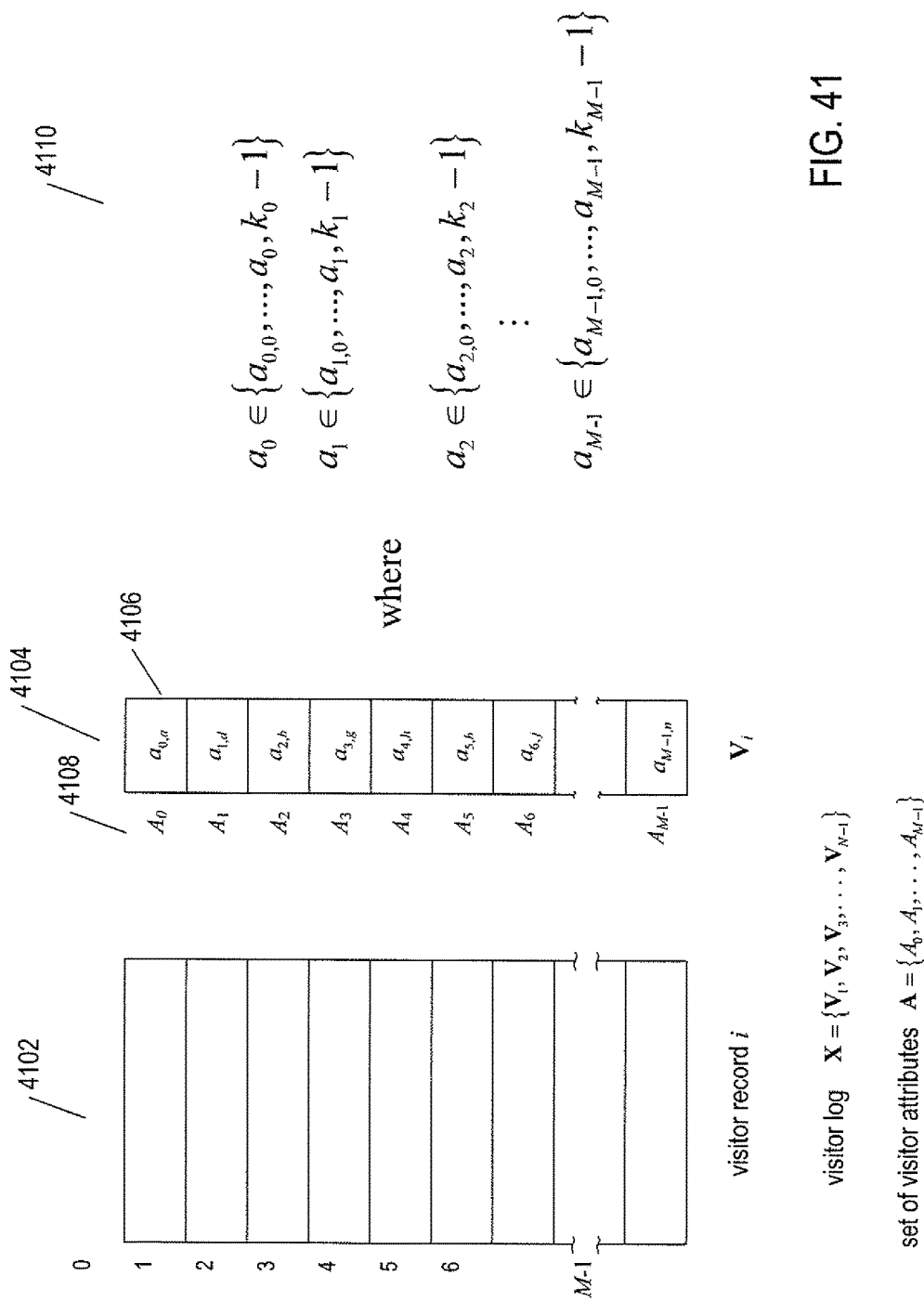
FIG. 41 provides an illustration of notational conventions used in the following discussion with regard to visitor records, attributes, and attribute values.

FIG. 41 provides an illustration of notational conventions used in the following discussion with regard to visitor records, attributes, and attribute values. In FIG. 41, a particular visitor record $V_i$ 4102 is shown using the same representation convention as used in FIG. 40. The visitor record $V_i$ can be alternatively represented as a vector of attribute values $V_i$ 4104. Each element in the vector is associated with a particular attribute, with the elements ordered to correspond to an ordered set of attributes A: $A=\{A_0, A_1, \ldots, A_{M-1}\}$. The value for each attribute in vector $V_i$ is expressed as a lower case a with two subscripts. For example, the first element 4106 of vector $V_i$, includes the value $a_{0,a}$, which is a particular value of the attribute $A_0$ 4108. Each attribute can have a value selected from a set of discrete attribute values, as shown in column 4110 in FIG. 41. For example attribute $A_0$ can have a value $a_{0,x}$ selected from the set $a_0 = \{a_{0,0}, \ldots, a_{0,k_0-1}\}$ of $k_0$ attribute values. The visitor log is considered to be a set X of N vectors:

$$X\{V_0, V_1, V_2, V_3, \ldots, V_{N-1}\}.$$

Figure 42:
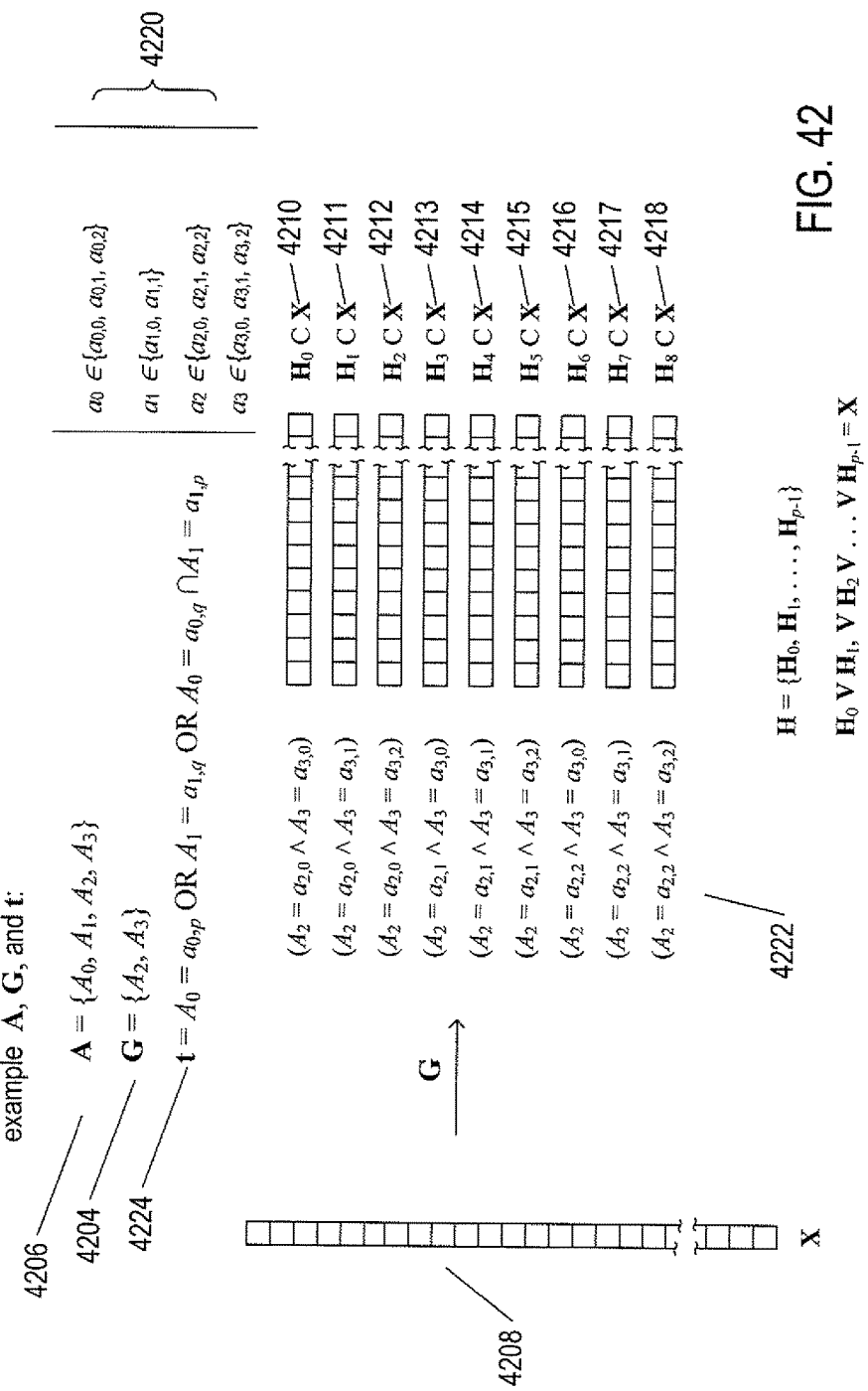
FIG. 42 illustrates various definitions involved in defining market segments.

FIG. 42 illustrates various definitions involved in defining market segments. The first definition is that of a target group G. As shown in expression 4202 in FIG. 42, the target group G is a subset of the set of attributes A. In an example shown in FIG. 42, the target set G 4204 consisting of the two attributes $A_2$ and $A_3$, selected from the total set of attributes A 4206 that includes attributes $A_0$, $A_1$, $A_2$, and $A_3$, is used to partition the visitor log 4208 into eight different visitor-log subsets $H_0$ 4210, $H_1$ 4211, $H_2$ 4212, $H_3$ 4213, $H_4$ 4214, $H_5$ 4215, $H_6$ 4216, $H_7$ 4217, and $H_8$ 4218. In FIG. 42, the sets of possible values for each of the four attributes 4220 are shown using the same notational conventions as introduced in FIG. 41. As can be seen in FIG. 42, the partitioning of the visitor log X uses each possible combination of attribute values for the attributes in target group G, shown in column 4222, to select those visitor records for which the target-group attributes have the particular values. For example, the partition $H_0$ 4210 includes all visitor records for which attribute $A_2=a_{2,0}$ and attribute $A_3=a_{3,0}$. The set H is the set of all of the partitions $H_0$, $H_1$, \ldots, $H_{P-1}$ that, when combined, produce a set of visitor records equivalent to the visitor log file X 4208.

A contrast set t is a Boolean expression in attribute values of non-target-group attributes. In the example shown in FIG. 42, the non-target-group attributes include attribute $A_0$ and attribute $A_1$. For purposes of the current discussion, the contrast set t is either a specification of a particular attribute value for one of the two non-target-group attributes or a conjunction of a specification of the attribute value for each of the two non-target-group attributes 4224. In the general case, a contrast set t is a single attribute-value specification for a particular non-target-group attribute or a conjunction of two to M−|G| attribute value specifications. All of the possible contrast sets can be viewed as potential market-segment definitions or rules.

Figure 43B:
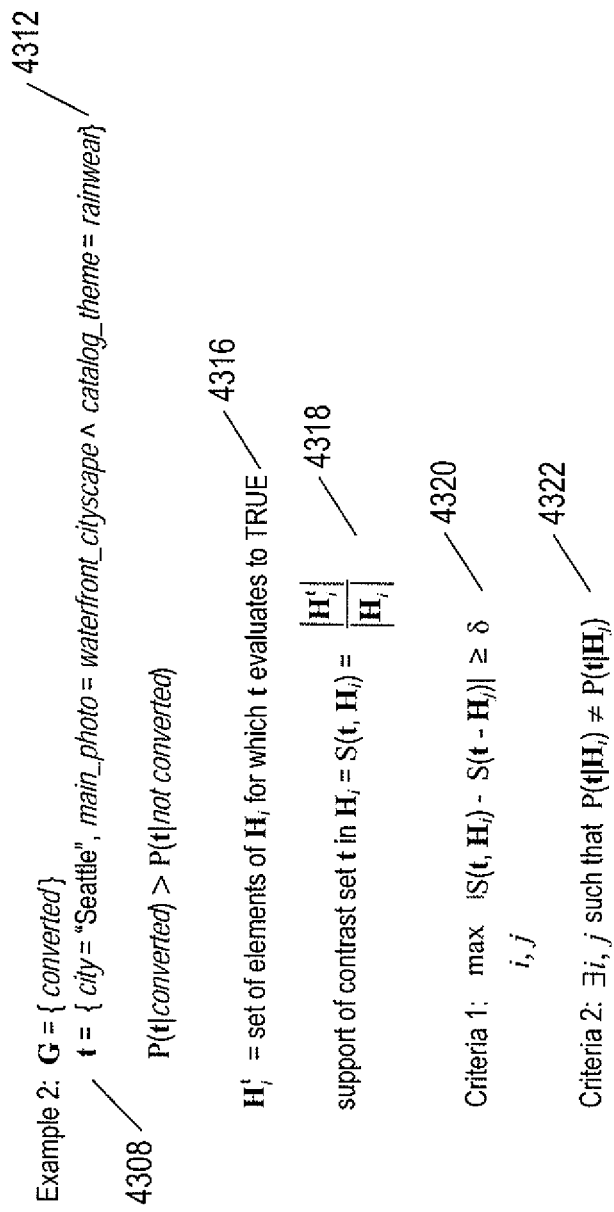

FIGS. 43A-B illustrate contrast sets and illustrate goals and criteria for automated market-segment discovery. At the top of FIG. 43A, the possible contrast sets t for the example target group G and attribute set A illustrated in FIG. 42 are shown, including a first group of one-term contrast sets 4302 and a second group of two-term contrast sets 4304. Again, as discussed above, the maximum number of terms in contrast-set expressions increases linearly with the number of non-target-group attributes. Continuing with the example of FIG. 42, a general goal of automated-market-segment discovery is to identify those contrast sets within the set of all possible contrast sets that can be used to select or identify some subset H' of the set of visitor-log partitions H.

FIG. 43A provides a first example 4306 and FIG. 43B provides a second example 4308 of possible, hypothetical contrast sets t that identify market segments. In the first example 4306, the target group G includes two attributes: city and converted. A contrast set t in the example specifies the photo type waterfront_cityscape for the attribute main_photo and the attribute value rainwear for the attribute catalog_theme. Analysis of all of the different subsets of a visitor log file produced by partitioning the visitor log file using the example target group G reveals that probability that the example contrast set t 4310 is evaluates to TRUE for the partition in which the attribute city has the value Seattle and the attribute converted has the value TRUE is approximately equivalent to the probability that contrast set t 4310 evaluates to TRUE for those visitor records in the partition for which the attribute city has the value Portland and the attribute converted has the value TRUE, and both of these probabilities are much greater than the probabilities that the contrast set t 4310 evaluates to TRUE for all the other partitions of the visitor log based on the target group G. Therefore, in order to achieve a high percentage of purchasers from a retailing web site, it would make sense to display a waterfront cityscape as the main photo in the web site and feature a rainwear catalog in the web site when the website is accessed by visitors residing in Seattle or Portland. In this case, visitors who view a web site with a waterfront cityscape as the main photo and with a featured catalog of rainwear represent a market segment with respect to web site visitors residing in particular cities and who purchase products upon viewing the web site, or, in other words, convert during their visits.

In the second example 4308 shown in FIG. 43B, the target group G includes only the single attribute converted. In the second example, the contrast set t 4312 specifies the value Seattle for the attribute city, the photo type waterfront_cityscape for the attribute main_photo, and the catalog type rainwear for the attribute catalog_theme. In this case, the target group G partitions the visitor log into a first set of visitor records representing visits in which a visitor purchased a product and a second set of visitor records in which the visitor failed to purchase a product. Analysis of these two partitions reveals that the probability that t evaluates to TRUE when applied to the first partition is significantly greater than the probability that t evaluates to TRUE when applied to visitor records of the second partition 4314. Therefore, t defines a market segment with respect to whether or not visitors purchased a product during a visit to a web site.

These two examples are related, but the automated analysis carried out in segment discovery to determine that the two different contrast sets do, in fact, define market segments differ, as will become clear in the following discussion. In the first case, the contrast set is evaluated with respect to potentially much smaller and more specific, or specialized, partitions than in the second example.

In certain implementations of automated market-segment discovery, two criteria are applied to a contrast set to determine whether or not the contrast set is a candidate market-segment definition. The first criteria 4314 is next discussed. The set $H_i'$ is defined as the set of elements of partition $H_i$ for which t evaluates to TRUE 4316. The support for contrast set t in partition $H_i$, $S(t, H_i)$, is defined to be $$\frac{|H_j'|}{|H_i|}$$

4318. Thus, the support for a contrast set t within a partition is the fraction of visitor records in the partition for which t evaluates to TRUE. The first criterion 4314 is that, considering the partitions generated by a target group, the maximum difference in the support for t in at least two different partitions needs to equal or exceed a threshold δ. In other words, the support for t must differ by at least δ for at least two partitions generated by the target group G.

The second criterion 4322 is that the probability that the contrast set t evaluates to TRUE for a visitor record in one partition must significantly differ from the probability that t evaluates to TRUE for some other partition. The first criterion may be referred to as the "support criterion" and the second criterion may be referred to as the "confidence criterion." When a contrast set t meets both the support and confidence criteria, then the contrast set t is a candidate definition of a market segment.

Were an automated market-segment-discovery system to try to evaluate all of the possible contrast sets t for a given visitor log X, target group G, and attribute set A, the automated market-segment-discovery system would, for even relatively modestly sized attribute sets, fail to produce a result set in a practical period of time due to the enormous computational complexity of the problem. As an example of the computational complexity, the number of possible contrast sets for an attribute set A with M elements, each having r possible values, is:

$$\sum_i^M \binom{M}{i} r^i,$$

Therefore, a more computationally efficient method needs to be used. One of many possible such methods involves construction of a segment-discovery tree. This method is similar to tree-construction methods used in various types of data mining. There are many alternative approaches to computationally efficiently identifying candidate contrast sets or candidate market-segment definitions, any of which may be candidate approaches for use in alternative implementations.

Figure 44:
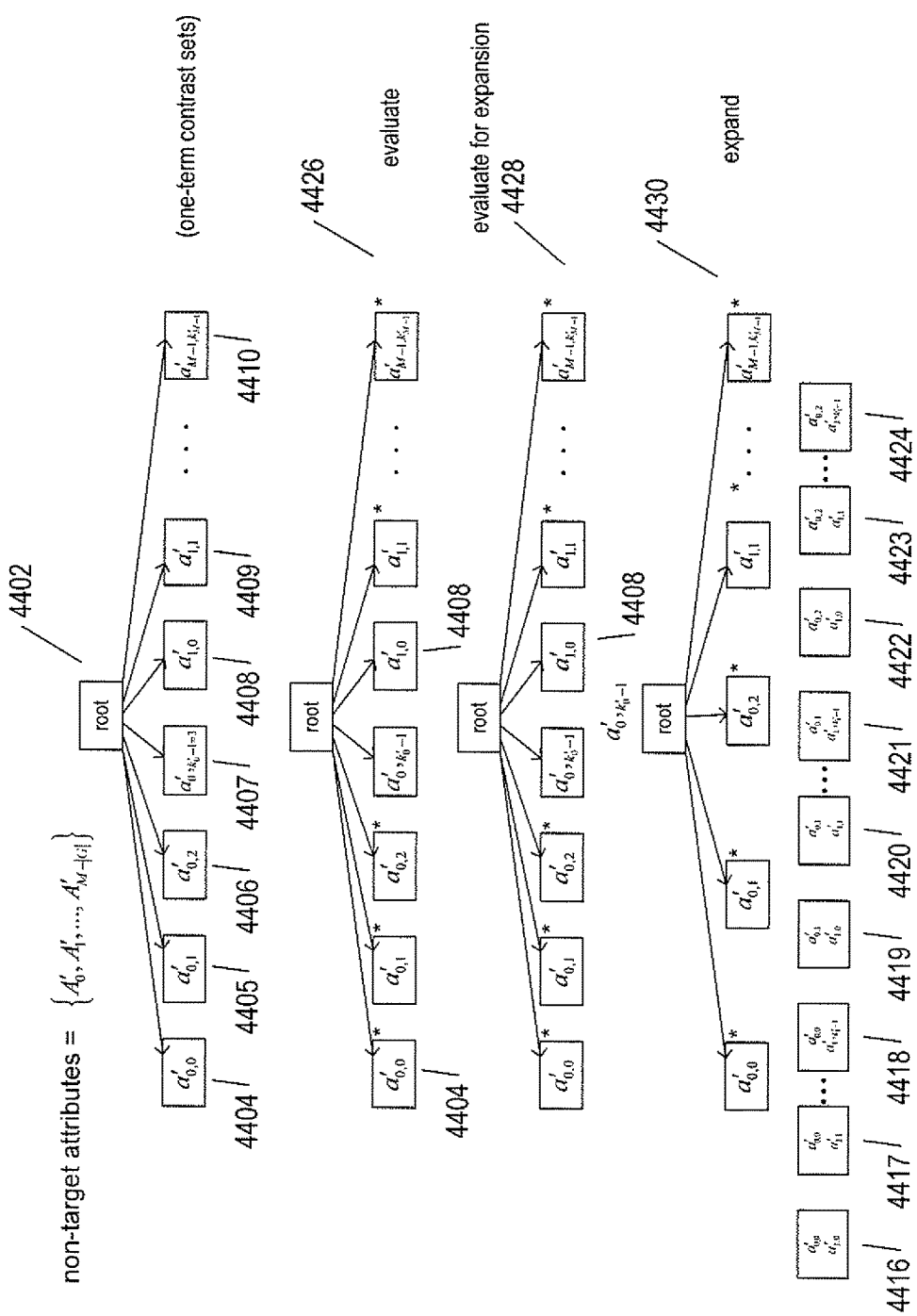
FIG. 44 illustrates construction of a segment-discovery tree.

FIG. 44 illustrates construction of a segment-discovery tree. The final three operations illustrated in FIG. 44 are recursively repeated at increasing tree depths, or levels, until no more nodes can be expanded. The example is based on a set of non-target attributes $\{A'_0, A'_1, \ldots, A'_{M-|G|}\}$. In a first step, which is not part of the three recursively applied steps discussed below, an initial root node 4402 is expanded to generate a first level of descendent nodes 4404-4410. These nodes represent the possible one-term contrast sets based on the non-target attributes. The notation for attribute values is identical to the notation used in FIG. 42. In a second step, each of the nodes at the current level are evaluated to determine whether or not they represent contrast sets that meet the above-discussed support and confidence criteria. This evaluation is discussed further, below. In FIG. 44, those nodes representing contrast sets that meet the support and confidence evaluation criteria are marked with an asterisk, such as asterisk 4412 marking node 4404. In a third step, all of the nodes of the current level are evaluated for expansion. The expansion criteria are discussed in greater detail, below. In FIG. 44, small curved arrows, such as small curved arrow 4414, are used to indicate those nodes that are be expanded according to the expansion evaluation. In a final, fourth step for the current level, the nodes that have been evaluated to be expanded are expanded to produce a next level of nodes 4416-4424. This expansion involves adding a term to the contrast set represented by the parent node, each child node having a different value for this added term. The added term is a value for a next attribute following the last attribute, values for which are included as the final term in the contrast set represented by the parent node. The attributes in the set of non-target attributes are ordered, allowing for selection of a next attribute for the expansion. Expansion terminates when there are no additional attributes in the ordered set of non-target attributes following the attribute for which values are included as the final terms in the contrast set corresponding to the node being evaluated for expansion. The evaluate, evaluate-for-expansion, and expand operations represented in FIG. 44 by trees 4426, 4428, and 4430 are repeated for each subsequent level until no further nodes can be expanded.

Because of the way in which the segment-discovery tree is constructed, a huge number of subtrees are pruned during construction so that the final segment-discovery tree is generally quite sparse compared to the full segment-discovery tree that would include all possible contrast sets. Note that those nodes that do not evaluate to be candidate contrast sets and that do not evaluate for expansion are pruned from the segment-discovery tree during segment-discovery-tree construction. For example, node 4408 failed to evaluate as a candidate node and failed to evaluate for expansion, in the operations represented by trees 4426 and 4428, respectively, and therefore has been pruned from the expanded tree represented by tree 4430.

FIG. 45 illustrates the assessment of whether a contrast set represented by a node in the segment-discovery tree meets the confidence criterion. In order to evaluate nodes as possible candidate market-segment definitions, a contingency table 4502 is constructed and evaluated. The contingency table includes a first row 4504 that stores the number of records in each partition of the visitor log for which a contrast set t evaluates to TRUE. Note that the contingency table has a column for each visitor-log partition 4506-4516. A second row of the contingency table 4518 includes a count of the visitor records in each partition for which the contrast set t evaluates to FALSE. A final row of the contingency table 4520 includes the totals of the counts in the first two rows for each column and a final column of the contingency table 4522 includes the sum of all the counts in each row. The lower right-hand element in the contingency table 4524 includes the total number of visitor records in the log for which the contrast set t can be evaluated as TRUE or FALSE. These totals are, of course, computable from the counts in the first two rows of the partition-associated columns, and therefore do not necessarily need to be explicitly included in the contingency table computed for a node. The confidence criteria is evaluated by deciding between a null hypothesis 4530 that the value of the totals in the rows and columns are independent versus an alternative hypothesis 4532 that the values in the row sums and column sums in the contingency table are not independent. The null hypothesis, restated, is basically that there is no significant difference in the probability that the contrast set t evaluates to TRUE for records of one partition versus records of another partition when all of the partitions $H_0$-$H_{P-1}$ are considered. These two hypotheses are evaluated by using a $\chi^2$ test on the contingency table, as defined by equation 4534 in FIG. 45. The $\chi^2$ test produces a test statistic $\chi_c^2$. Tables of $\chi_t^2$ values and associated significance levels $\alpha$ 4536 are accessed in order to determine a p-value for the contingency table of a given node of the segment-discovery tree. The p-value is the minimum significance level $\alpha$ associated with a $\chi_t^2$ statistic in the table that is less than the computed $\chi_c^2$ statistic for the contingency table, as indicated by expression 4538 in FIG. 45. When the computed p-value is less than a threshold significance value $\alpha_l$ for the level of the segment-discovery tree in which the node resides, then the node is considered to have met the confidence criterion, or, in other words, is considered to represent a candidate market-segment definition. A lift can be computed for a contrast set t for any particular partition H, according to expression 4540 in FIG. 45. The lift is a numerical expression of the increase or decrease in the fraction of visitor records within the partition for which a contrast set t evaluates to TRUE with respect to a contrast set that is neutral or non-selective with respect to the partition.

The support criterion for a node of the segment-discovery tree can be readily computed from the contingency table by looking for the maximum difference in the support between any two partitions. Thus, a contingency-table-based evaluation of a segment-discovery-tree node is used, during construction of the segment-discovery tree, to determine whether the node meets both the support and confidence criteria. Those nodes which meet both criteria are marked as candidate market-segment definitions and are retained for subsequent consideration.

FIG. 46 illustrates three criteria that are used for evaluating a node of the segment-discovery tree for expansion. A first criterion 4602 is that the maximum support for the contrast set represented by the node among any of the partitions needs to be greater than a threshold value. This ensures that expansion of the node can produce a child node for which the support criteria is met. A second expansion criterion 4604 is that the minimum count for any element in the first row of the contingency table corresponding to a partition must be greater than some threshold value. Otherwise, the $\chi^2$ test cannot be guaranteed to produce a valid result. A final criterion 4606 requires that the p-value associated with a computed value $\chi_{max}^2$ is less than a threshold significance for the current level, $\alpha_l$. The value $\chi_{max}^2$ is the maximum computed $\chi^2$ statistic $\chi_c^c$ over a set of $2^{|H|}$ contingency tables that are obtained from the contingency table for a segment-discovery-tree node by substituting, for each element $o_{l,j}$ of the first row of the contingency table in a partition-associated column, one of the two values $u_{1,j}$ and $l_{l,j}$. The value $u_{l,j}$ is the value for $o_{l,j}$ observed in the node's contingency table and the value $l_{l,j}$ is 0. The second rows of the $2^{|H|}$ contingency tables can be computed by subtracting the first row values from the final row values. This third criterion is a theoretical upper bound on the $\chi_c^2$ statistic that can be computed from any of the potential children of a particular segment-discovery-tree node. Only when this upper bound value $\chi_{max}^2$ is less than a threshold significance for the level l is the currently considered node be expanded.

Figures 47A, 47B:
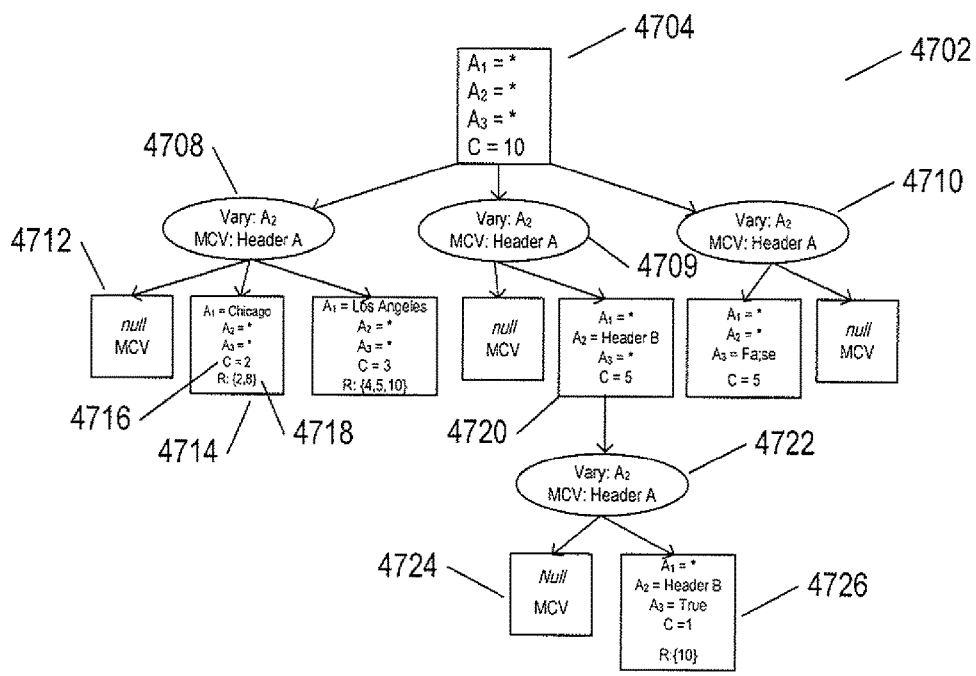
FIGS. 47A-B illustrate one technique for computational efficiency.

Even though construction of the segment-discovery tree, with significant pruning of unproductive nodes, produces a generally sparse segment-discovery tree, the number of nodes that need to be evaluated for being potential candidate market-segment definitions is large. As a result, it is beneficial to employ possible techniques and methods that can provide additional computational efficiencies during segment-discovery-tree construction. FIGS. 47A-B illustrate one such technique for obtaining additional computational efficiency. In this technique, the counts used to populate contingency tables for nodes are pre-computed and stored in an all-dimensions tree ("AD tree"). FIG. 47A shows a table that lists a very small number of visitor records, each visitor record corresponding to a row of the table, with three attributes. FIG. 47B illustrates an AD tree computed from these visitor records. The root node 4704 of the AD tree 4702 contains a count value "C=10" 4706 that is a count of the total number of visitor records. The root node 4704 is an example of an AD node, illustrated using rectangles, which contain the count for a specific assignment of attributes. The symbol "*" is used as a wild card, in FIG. 47B, to indicate indifference to the specific value of an attribute.

Each AD node is a candidate for expansion. For example, the root node is expanded into three vary nodes 4708-4710. Each vary node represents an additional specialization in attribute-value assignment. For example, vary node 4708 represents a specialization over root node 4704 by assigning specific values to the first attribute $A_1$. A null node is used to represent the attribute-value assignment that evaluates to TRUE for the largest number of visitor records. The null node 4712 for vary node 4708 represents the assignment of the value "New York" to attribute $A_1$. The count for this assignment can be computed from the sum of the counts of the other children of vary node 4708 and the parent for vary node 4708. Child AD node 4714 of vary node 4708 represents the count of visitor records when attribute $A_1$ is assigned the value "Chicago." The count is 2 (4716 in FIG. 47). There is a parameter $\Psi$ for the AD tree that specifies a threshold count for AD node expansion. When the count for an AD node is below the value $\Psi$, the node is not expanded, but the indices of the visitor records represented by the node are instead listed 4718 in the node. In the particular case of node 4714, rows 2 and 8 in the table shown in FIG. 47A have the value "Chicago" for attribute $A_1$. When an AD node is expanded, such as AD node 4720, the AD node is expanded to produce a child vary node 4722 with a full set of AD-node children 4724 and 4726. The vary node represents assignment of an attribute value to the next-highest attribute in attribute order. In this case, because AD node 4720 represents assignment of a value to attribute $A_2$, child vary node 4722 represents an additional assignment to attribute $A_3$. The construction of an AD tree has similar hierarchical structure to a segment-discovery tree, but is not specialized towards any particular target group G. Each level in the AD tree represents an additional specialization of potential contrast sets. Once an AD tree is computed for a visitor-record log, the same AD tree can be used for constructing multiple segment-discovery trees based on different target groups for a given set of attributes. The AD tree contains pre-computed counts that can be used to construct the contingency tables needed for segment-discovery-tree evaluation.

The currently disclosed method and system computes a $\chi^2$ statistic for each contingency table to determine whether the associated contrast set is significant. The resultant p-value is compared against a $\alpha_l$ value. When $p<\alpha_l$, the contrast set is deemed significant. The intuition is that the $\chi^2$ test used to derive p for contrast sets of length l has a false positive rate approximately equal to $\alpha_l$. A false positive, in this setting, means falsely rejecting the null hypothesis when it is actually true. At each level l of the segment-discovery tree, $\alpha_l$ may be calculated as:

$$\alpha_l = \min\left(\frac{\alpha}{C_l 2^l}, \alpha_{l-1}\right),$$

where $C_l$ is the number of candidate contingency tables at level l. In this approach, the significance of each contrast set at level l is determined before the candidate contrast sets at level l+1 are generated, and so the number of hypothesis tests that end up being performed is not known beforehand. One solution is to control for the false rejection of the null hypothesis of each test by factoring in the level of the test and the number of tests at that level. When the number of tests at level l is large, this correction can be overly restrictive and cause potentially useful contrast sets to be rejected. An alternate correction to the $\chi^2$ test is used in certain implementations of the currently disclosed method and system.

Figure 48:
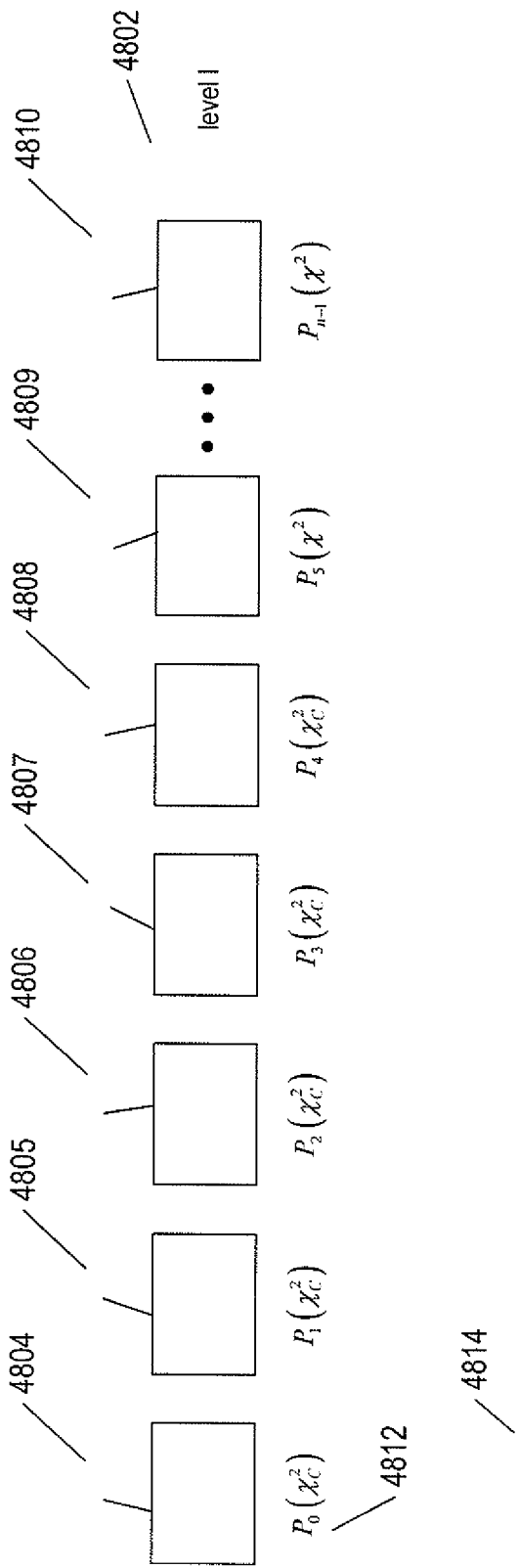
FIG. 48 illustrates computation of the confidence in $\chi^2$ statistics $\chi_c^2$ computed for nodes at each level l of the segment-discovery tree.

FIG. 48 illustrates computation of the confidence in $\chi^2$ statistics $\chi_c^2$ computed for nodes at each level l of the segment-discovery tree. In FIG. 48, a level l of the segment-discovery tree 4802 is represented by the row of nodes 4804-4810. In confidence-computation technique illustrated in FIG. 48, the p-values for the nodes are computed, as discussed above, using the $\chi_c^2$ test statistic. In FIG. 48, the computed p-values are shown below the nodes, such as computed p-value 4812 below node 4804. In a next step, the p-values are sorted in increasing order by magnitude, illustrated by line 4814 in FIG. 48. Then, in a step represented in FIG. 48 by lines 4816, an index d is computed as the maximum position y in the ordered set of p-values computed in the previous step, in which the associated p-value $p_y$ is less than $$\frac{y\alpha_l}{Cl}$$

where $\alpha_l$ is a threshold significance level l and $C_l$ is the number of nodes at level l. A node at level l of the segment-discovery tree is considered to satisfy the confidence criteria when the p-value computed for the node is at a position z in the ordered set of p-values that is less than the computed index d 4818. The threshold level significance $\alpha_l$ is computed as $$\frac{\alpha_l}{2_l},$$

where $\alpha_l$ is a parameter of segment-discovery-tree construction. Alternatively, a Bonferroni can be used.

Figure 49:
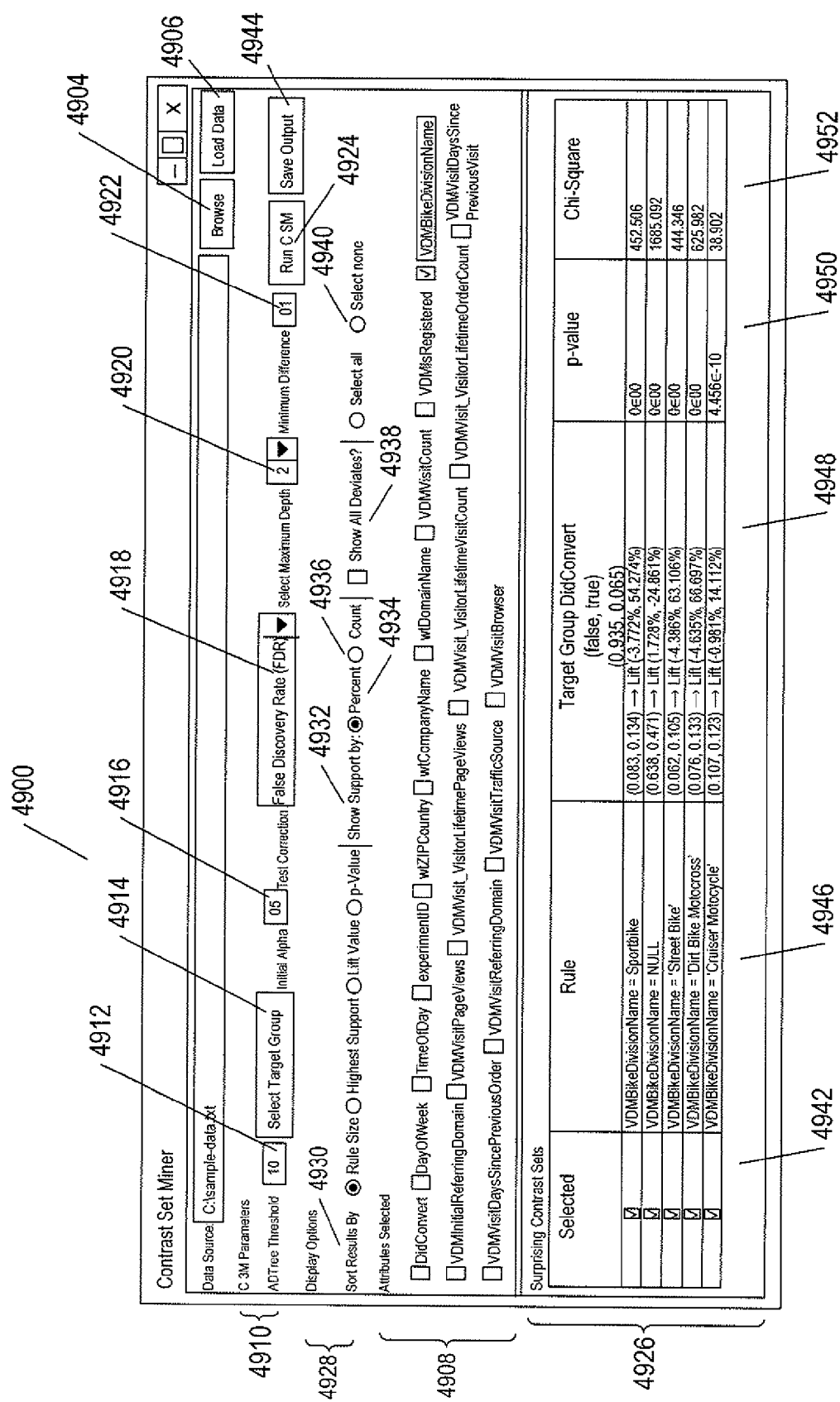
FIG. 49 displays a graphical user interface used in one implementation of automated market-segment discovery.

FIG. 49 displays a graphical user interface ("GUI") used in one implementation of automated market-segment discovery. The GUI 4900 consists of four major components. A first component 4902 allows a user to specify the location of a visitor-record dataset. The dataset is stored, in one implementation, in a comma-separated-value format where each column corresponds to an attribute $A_i \in A$ and each row is a single record. When clicked, the "Browse" button 4904 provides a visualization of the current file directory structure to assist in locating the dataset. Once the dataset has been specified, the "Load Data" 4906 button prepares the data for analysis. Specifically, clicking the "Load Data" 4906 button constructs an AD tree object, which pre-caches the counts of attribute assignments in the data, as described above with reference to FIGS. 47A-B. After the data is loaded and the AD tree constructed, the attributes present in the dataset appear in the area 4908 of the GUI labeled "Attributes Selected."

Figure 50:
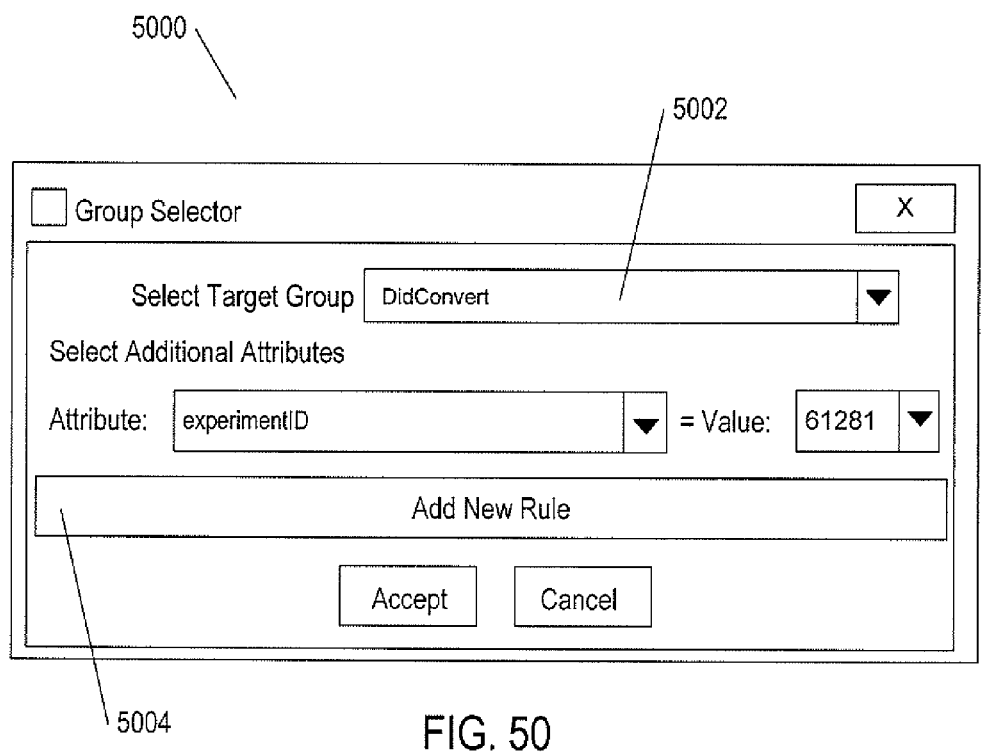
FIG. 50 shows a dialog window.

A second component 4910 contains a set of configuration options. The first field "ADTree Threshold" 4912 allows a user to specify the value of ψ; any attribute assignments with less than ψ counts in data will not be cached in the AD tree. The system sets ψ=10 by default, as values smaller than 10 may produce large AD trees with many unnecessary stored counts. The "Select Target Group" feature 4914 creates a dialog window that allows the user to specify which attribute or combination of attributes to use as the target group G. FIG. 50 shows this dialog window. The drop down menu "Select Target Group" 5002 allows a user to specify the target group G. A user can then add additional attribute=value conditioning rules for the group with the "Add New Rule" button 5004.

One feature of the automated-market-segment-discovery GUI is that it provides a user with an ability to specify additional conditioning rules for the group attribute. For example, suppose a goal is to discover contrast sets that differentiate visitors that convert from those that do not. This can be achieved by selecting the attribute $A_i$=DidConvert as group G, as shown in FIG. 50. However, suppose a user is only interested in segments pertaining visitors who participated in a specific experiment, as denoted by the attribute experimentID. The dialog box 5000 allows for this conditioning. In the example of FIG. 50, a user has defined the target group G=DidConvert|experimentID=612821, where the "|" symbol denotes that the target group is conditioned on a specific experiment. The effect of this conditioning is that evaluation is performed only over the subset of the entire dataset comprising visitor records where the experimentID=612821.

The "Initial Alpha" field 4916 allows the user to change the initial $\alpha_{l=1}$ threshold used to determine statistical significance. A value $\alpha_{l=1}$=0.05 is chosen in the example of FIG. 49. The drop-down menu "Test Correction" 4918 determines which method for reducing false rejections of the null hypothesis is applied. The "Select Maximum Depth" feature 4920 determines the maximize depth of the segment-discovery tree and, consequently, the number of attribute-value pairs, $A_i=j$, that can appear in a contrast set. Initial experiments showed that it was rare for segments to exist that were defined by more than 2 attributes, and so 2 is selected as the default value. Note that selecting a large value for the maximum depth can increase the search space and the associated run time. The "Minimum Difference" field 4922 determines the δ difference of the support criterion. Once a user has configured method parameters, the "Run" button 4924 initializes the segment-discovery-tree-based search for market segments. The results of are displayed in region 4926.

GUI component 4928 contains a set of display options for the discovered contrast sets. The first option 4930, "Sort Results by:," provides four methods for ranking the discovered contrast sets: rule size, highest support, lift value, and p-value of the $\chi^2$ statistic, sorted from most significant to least significant. The next option 4932, "Show support by:," controls whether the support value for each contrast set is shown as a percentage of the group attribute 4934 or as raw counts of the number of records in the dataset for which the contrast set applies 4936. The segment-discovery-tree-based market-discovery method marks each contrast-set node that passes acceptance criteria as potentially interesting contrast sets. The check box "Show All Deviates?" 4938, when checked, results in display of a complete list of the potentially interesting contrast sets. By default, the system applies a filter for surprising contrast sets and shows only those segments to the user. The surprise filter applies only to contrast sets of length≥2. Suppose at level 1 of the segment-discovery tree, two contrast sets are identified: $c_1:A_i=x$ and $c_2:A_j=y$. If, at level 2 of the search, the segment-discovery-tree-based market-discovery method identifies a contrast set $c_3:A_i=x \wedge A_j=y$. Then for $c_3$ to be considered surprising:

$$\exists r \text{ such that } |S(c_3,G_r)-S(c_1,G_r)S(c_2,G_r)|>\delta.$$

In other words, when the product of the supports of the two smaller contrast sets is approximately equal to the support of the larger contrast set, then the larger contrast set is unsurprising.

The "Select all/Select none" feature 4940 toggles checking of attribute filters listed in the bottom half of GUI component 4908. Only contrast sets that contain checked attributes appear in the list shown in component 4926.

GUI component 4926 is a table that displays all of the discovered contrast sets, subject to the current display options in component 4928. The first column of the table 4942 is a checkbox that, when checked, cause the segment in that row to be exported to an external file when the "Save Output" button 4944 is pressed. The second column 4946 contains the attribute/value assignments that define the segment. The third column 4948 contains the support for that segment in each group, in addition to the lift value across each group. For a contrast set t, the support is shown as a tuple $(S(t,G_1),S(t,G_2), \ldots, S(t,G_k))$. The lift is listed in a similar tuple format proceeding the "-->" in the same column. The last two columns 4950 and 4952 contain p-value and $\chi^2$ statistics, respectively, of the contingency table associated with the contrast set.

Figure 51:
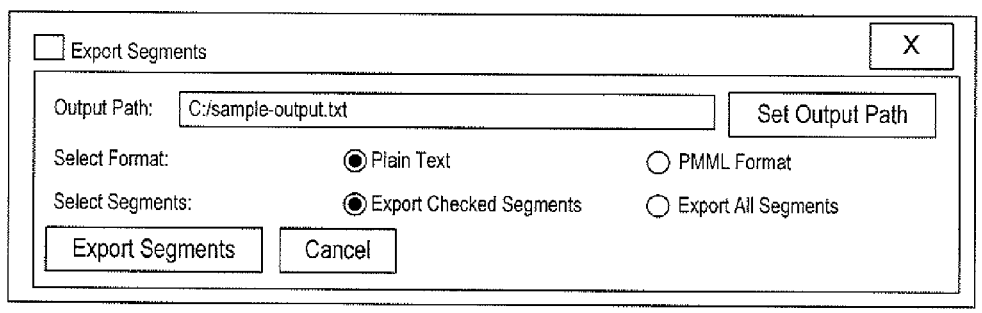
FIG. 51 shows a dialog window.

Once a user has launched an analysis a dataset though the GUI and has received a display of identified market segments, the user can select all or a subset of segments to export to another entity. When the "Save Output" 4944 button is clicked, a dialog box such as that in FIG. 51 appears. This dialog allows a user to specify a destination and format of the segments for export.

Figure 52:
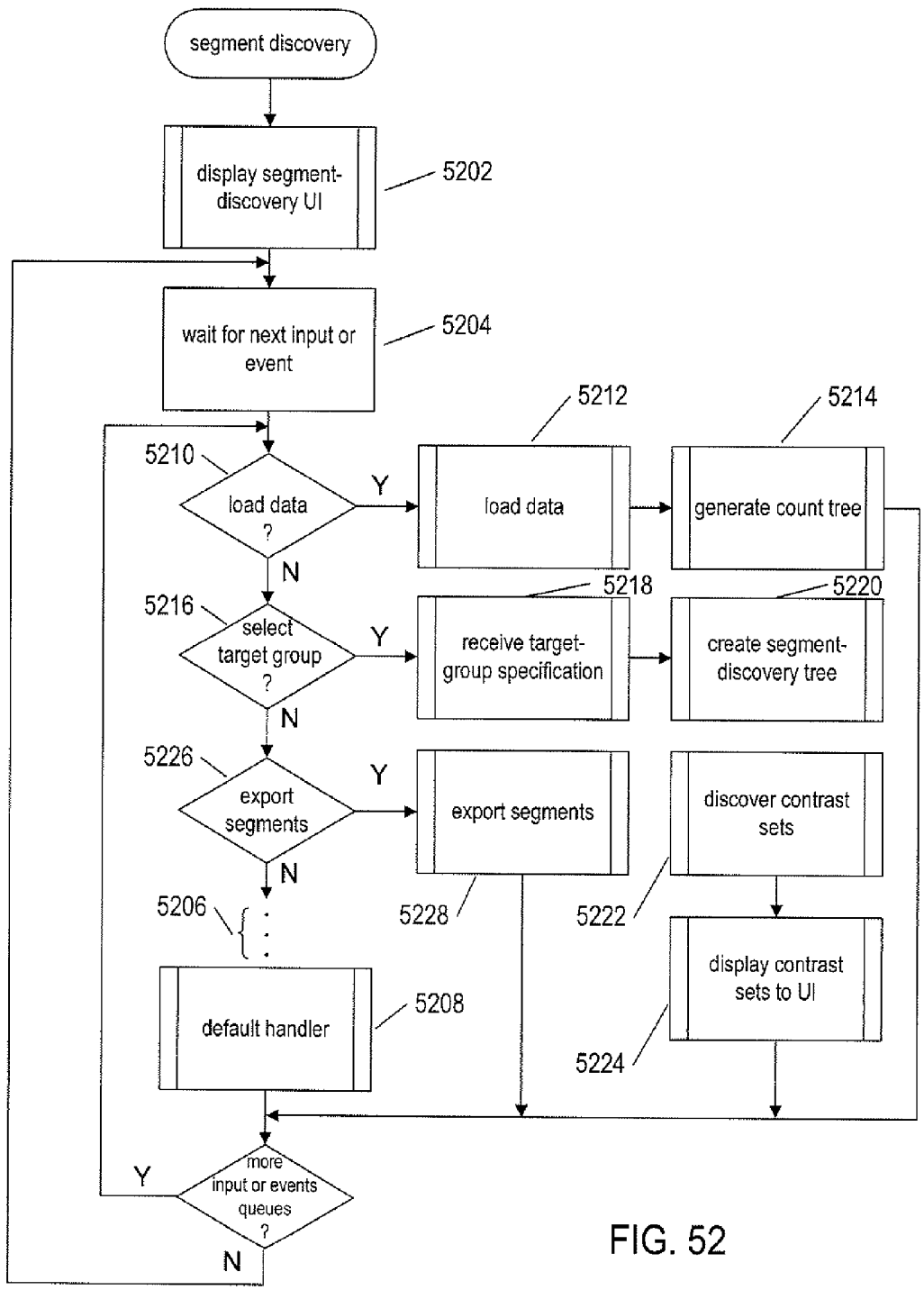
FIGS. 52 and 53 illustrate implementation of an automated market-segment-discovery method and system that displays the user interface described above with reference to FIGS. 49-51.
Figure 53:
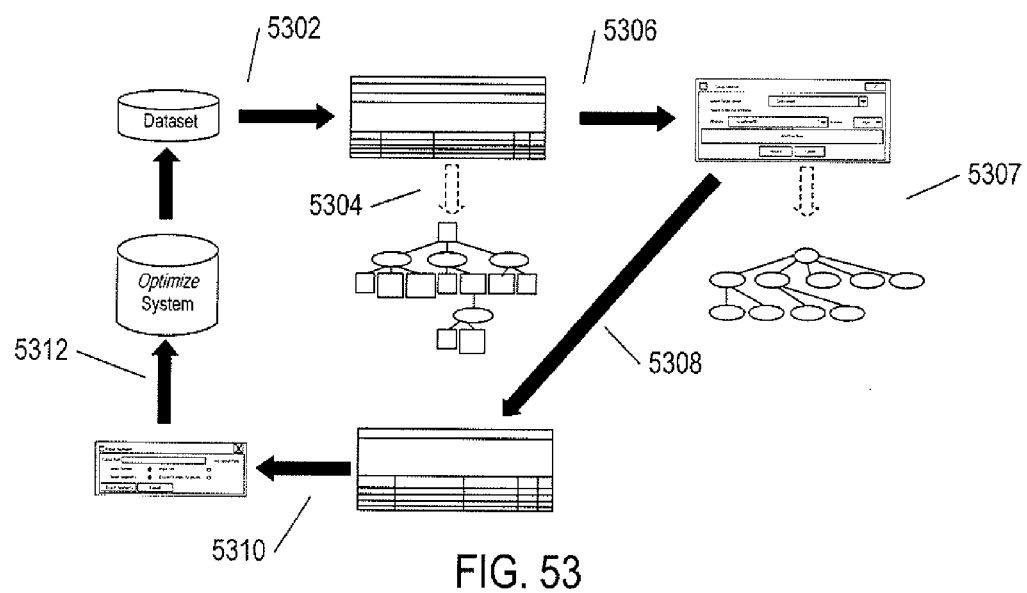

FIGS. 52 and 53 illustrate implementation of an automated market-segment-discovery method and system that displays the user interface described above with reference to FIGS. 49-51. FIG. 52 provides a control-flow diagram for the automated market-segment-discovery system or subsystem and FIG. 53 illustrates the flow of operations used to generate market-segment definitions, or rules, for export to targeted-marketing subsystems. In FIG. 52, in a first step 5202, the user interface described with reference to FIG. 49 is displayed. Then, in step 5204, the segment-discovery subsystem waits for a next input event or other event and then handles the next input event or other type of event that occurs. Only a portion of the possible events are shown as being handled in FIG. 52, for sake of brevity, with ellipses 5206 representing other types of events that may occur as a user interfaces to the user interface and default handler 5208 representing a handler that handles rare and unexpected events, many of which may require various types of error handling. When the next event is input to the user interface to load a data set, as determined in conditional step 5210, then the segment-discovery system loads the data, in step 5212, and generates an AD count tree in step 5214, shown in the process flow of FIG. 53 by steps 5302 and 5304. When the next event is an indication, by a user, to select a target group, as determined in step 5216, then the segment-discovery subsystem receives a target-group specification through interaction by the user with the user interface, in step 5218, creates the segment-discovery tree for the target group, in step 5220, uses the candidate market-segment-definition nodes of the segment-discovery tree to discover promising market-segment definitions, in step 5222, and then, in step 5224, displays the discovered contrast sets, or market-segment definitions, through the UI to the user. These steps are shown in the process flow of FIG. 53 as steps 5306, 5307, and 5308. When the next-occurring event is an indication by the user to export discovered market-segment definitions, as determined in step 5226, then the segment-discovery subsystem exports those market-segment definitions to a targeted-marketing subsystem or other subsystem in step 5228. The export of discovered segments is illustrated in the process flow of FIG. 53 as steps 5310 and 5312.

Figure 54:
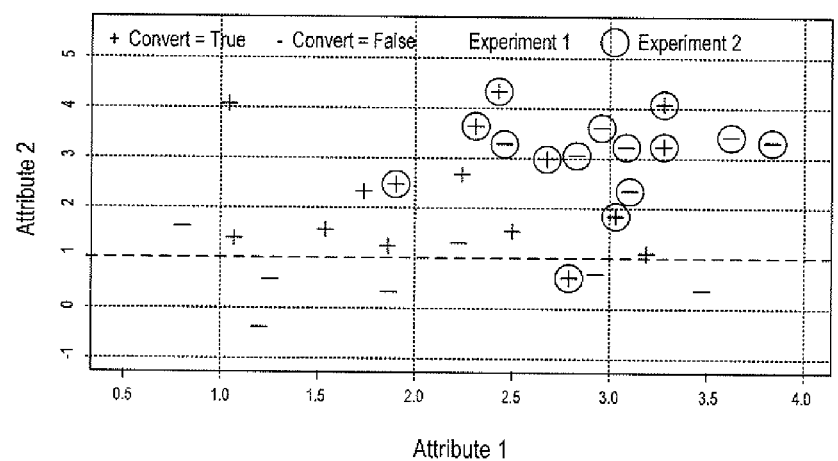
FIG. 54 illustrates an example in which target-group conditioning is used.

Interesting market segments can be discovered through analysis of strictly demographic data. However, in order to take actions, the marketers need to know how different demographic groups respond to each piece of digital content provided to visitors. Because the automated market-segment-discovery method and system is able to condition a target group on content-based attributes, the response of demographic-based segments to different content configurations can be explored. FIG. 54 illustrates an example in which target-group conditioning is used. Thirty synthetic visitor records measured along two demographic attributes were generated. Visitors to Experiment 1, represented by uncircled plotted points, have a value of Attribute 1 drawn from a normal distribution $N(\mu=2,\sigma^2=1)$ and Attribute 2 drawn from a normal distribution $N(\mu=1.5,\sigma^2=1)$. Visitors to Experiment 2, represented by circled plotted points, have Attribute 1 distributed as $N(\mu=3,\sigma^2=0.4)$ and Attribute 2 distributed as $N(\mu=3,\sigma^2=1.2)$. A segment rule was artificially imposed on the data by setting any visitor from Experiment 1 to Convert=true with 80% probability when their value of Attribute 2 was >1.0; otherwise, they did not convert. Visitors from Experiment 2 converted with probability 50% regardless of their attribute values. The contingency table on the left in Table 1, provided below, shows the count for the potential segment Attribute 2>1.0 on the target group G=Convert. Because half of the visitors are from Experiment 2, and have no preference for conversion, they obscure the embedded segment. The p-value for the rule is ≈0.044. Were a large number of other length-1 contrast sets evaluated, p=0.044 would likely be considered a false positive. However, when the group of only visitors from Experiment=1 is conditioned, shown in the right side of Table 1, the contingency table has p-value=0.003. Therefore the segment Attribute 2>1.0 is more defined in the context of just visitors from Experiment 1.

TABLE 1

| Contrast Set | $G_1$ | $\neg G_1$ |
|---|---|---|
| Attribute 2 > 1.0 | 15 | 9 |
| ¬Attribute 2 > 1.0 | 1 | 5 |
| Contrast Set | $G_2$ | $\neg G_2$ |
| Attribute 2 > 1.0 | 8 | 2 |
| ¬Attribute 2 > 1.0 | 0 | 5 |

Could this segment be discovered by applying the automated market-segment-discovery method and system to the full data set and testing the contrast set Attribute 2>1.0 ∧ Experiment=1? The associated contingency table is shown in 2. The p-value of the segment is p=0.038, which is more significant than the length 1 segment Attribute 2>1.0. However, because this is a contrast set of length 2, the significance threshold is, at most, $\alpha_{l=2}=0.025$, and may be lower when there are many other segments of length 2 to evaluate. Thus, this segment does not satisfy the criteria for significance, in part because of the mixture of visitors from Experiment 2. It can be seen that the ability of the disclosed system and method to explore conditioned groups can help to identify legitimate segments in the data.

TABLE 2

| Contrast Set | Convert | ¬Convert |
|---|---|---|
| Attribute 2 > 1.0 ∧ Experiment = 1 | 8 | 2 |
| ¬Attribute 2 > 1.0 | 8 | 12 |

Although the present invention has been described in terms of particular embodiments, it is not intended that the invention be limited to these embodiments. Modifications within the spirit of the invention will be apparent to those skilled in the art. For example, any of many different implementations of an automated market-segment-discovery system or subsystem can be obtained by varying any of many different implementation parameters, including operating system, hardware platforms, analysis or optimization system in which to include the automated market-segment-discovery subsystem, control structures, data structures, modular organization, and any of many other implementation parameters. A variety of different types of segment-discovery trees can be used for computationally efficiently evaluating possible contrast sets. Additional methodologies and techniques that contribute to the computational efficiency, in addition to use of AD trees for storing counts, may be employed. A variety of different methodologies may be employed to determine whether or not nodes within the segment-discovery trees satisfy the confidence constraint in addition to the P-value-ordering technique discussed above.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system comprising:
one or more processors;
one or more memories; and
computer instructions, stored in the one or more memories and executed by the one or more processors that cause the one or more processors to perform operations including:
receiving a session dataset including, for each of one or user sessions, one or more interaction characteristics that characterize user interaction with a first version of a webpage during a session;
defining, from the session dataset a set of interaction characteristics;
receiving a definition of a target characteristic group, the definition identifying a first subset of the set of interaction characteristics;
identifying a second subset of the set of interaction characteristics, each characteristic in the second subset being absent from the first subset;
generating, using the second subset of the set of interaction characteristics, a segment-discovery tree by:
generating a plurality of level one nodes, each level one node of the plurality of level one nodes corresponding to an interaction characteristic of the second subset; and
generating a plurality of level two nodes, the plurality of level two nodes corresponding to a combined interaction characteristic, the combined interaction characteristic including a corresponding interaction characteristic of two or more level one nodes;
determining, for each level one node of the plurality of level one nodes in the segment-discovery tree, a probability that an interaction characteristic corresponding to the level one node correlates with the target characteristic group;
determining, for each level two node of the plurality of level two nodes in the segment-discovery tree, a probability that the combined interaction characteristic corresponding to the level two node correlate with the target characteristic group;
determining that a probability corresponding to each of a plurality of level one nodes and each of a plurality of level two nodes exceeds a threshold;
defining an interaction dataset that includes, for each level one node and each level two node with a corresponding probability that exceeds the threshold, the interaction characteristic corresponding to the level one node and the combined interaction characteristic corresponding to the level two node; generating an alternative version of the webpage based on the interaction dataset by modifying one or more nodes of a document object model corresponding to the webpage, the alternative version of the webpage including at least some content of a set of content that is different from the set of content rendered by the first version of the webpage; and
transmitting the alternative version of the webpage to one or more users that satisfy the interaction dataset within a particular geographical region, wherein the first version of the webpage is configured to be served to users that do not satisfy the interaction dataset.

2. The system of claim 1, wherein each of the one or more interaction characteristics includes a set of attributes, and wherein the definition of the target characteristic group identifies a subset of the set of attributes for each interaction characteristic of the first subset of the set of interaction characteristics.

3. The system of claim 1,
wherein the combined interaction characteristic represents the corresponding interaction characteristic of two or more level one nodes as a Boolean expression.

4. The system of claim 1, wherein generating the segment-discover tree further includes: generating a contingency table, the contingency table including a first row and second row;
determining, for each level one node of the plurality of level one nodes, a frequency value of an interaction characteristic corresponding to the level one node, the frequency value indicating a number of user sessions in which the interaction characteristic characterized a user session;
storing, in the first row, the frequency value corresponding to each level one node of the plurality of level one nodes;
determining, for each level one node of the plurality of level one nodes, an independence value of an interaction characteristic corresponding to the level one node, the independence value indicating a number of user sessions in which the interaction characteristic did not characterize a user session; and
storing, in the second row, the independence value corresponding to each level one node of the plurality of level one nodes.

5. The system of claim 4, wherein generating the segment-discovery tree further includes:
for each level one node of the plurality of level one nodes:
determining, using the contingency table, a probability that an interaction characteristic corresponding to the level one node is independent from one or more other interaction characteristics, wherein an interaction characteristic is independent when a presence of the interaction characteristic in a user session is not dependent on a presence of another interaction characteristic in the user session;
determining whether the probability that the characteristic corresponding to the level one node is independent from one or more other interaction characteristics is below a threshold; and
removing the level one node of the plurality of level one nodes from the segment-discovery tree when the probability that the characteristic corresponding to the level one node is independent from one or more other interaction characteristics is below the threshold.

6. The system of claim 4, wherein generating the segment-discovery tree further includes :
for each level two node of the plurality of level two nodes:
determining, using the contingency table, whether the level two node is to be expanded; and
generating, for each level two node that is to be expanded, one or more level three node, the one or more level three node corresponding to a combined interaction characteristic, the combined interaction characteristic including a corresponding interaction characteristic of a level two node and another level two node or a level one node.

7. A method comprising:
receiving a session dataset including, for each of one or more user sessions, one or more interaction characteristics that characterize user interaction with a first version of a webpage during a session;
defining, from the session dataset a set of interaction characteristics;
receiving a definition of a target characteristic group, the definition identifying a first subset of the set of interaction characteristics;
identifying a second subset of the set of interaction characteristics, each characteristic in the second subset being absent from the first subset;
generating, using the second subset of the set of interaction characteristics, a segment-discovery tree by:
generating a plurality of level one nodes, each level one node of the plurality of level one nodes corresponding to an interaction characteristic of the second subset; and
generating a plurality of level two nodes, the plurality of level two nodes corresponding to a combined interaction characteristic, the combined interaction characteristic including a corresponding interaction characteristic of two or more level one nodes;
determining, for each level one node of the plurality of level one nodes in the segment-discovery tree, a probability that an interaction characteristic corresponding to the level one node correlates with the target characteristic group;
determining, for each level two node of the plurality of level two nodes in the segment-discovery tree, a probability that the combined interaction characteristic corresponding to the level two node correlate with the target characteristic group;
determining that a probability corresponding to each of a plurality of level one nodes and each of a plurality of level two nodes exceeds a threshold;
defining an interaction dataset that includes, for each level one node and each level two node with a corresponding probability that exceeds the threshold, the interaction characteristic corresponding to the level one node and the combined interaction characteristic corresponding to the level two node; generating an alternative version of the webpage based on the interaction dataset by modifying one or more nodes of a document object model corresponding to the webpage, the alternative version of the webpage including at least some content of a set of content that is different from the set of content rendered by the first version of the webpage; and
transmitting the alternative version of the webpage to one or more users that satisfy the interaction dataset within a particular geographical region, wherein the first version of the webpage is configured to be served to users that do not satisfy the interaction dataset.

8. The method of claim 7, wherein each of the one or more interaction characteristics includes a set of attributes, and wherein the definition of the target characteristic group identifies a subset of the set of attributes for each interaction characteristic of the first subset of the set of interaction characteristics.

9. The method of claim 7, wherein a the combined interaction characteristic represents the corresponding interaction characteristic of two or more level one nodes as a Boolean expression.

10. The method of claim 7, wherein generating the segment-discover tree further includes:

generating a contingency table, the contingency table including a first row and second row;

determining, for each level one node of the plurality of level one nodes, a frequency value of an interaction characteristic corresponding to the level one node, the frequency value indicating a number of user sessions in which the interaction characteristic characterized a user session;

storing, in the first row, the frequency value corresponding to each level one node of the plurality of level one nodes;

determining, for each level one node of the plurality of level one nodes, an independence value of an interaction characteristic corresponding to the level one node, the independence value indicating a number of user sessions in which the interaction characteristic did not characterize a user session; and storing, in the second row, the independence value corresponding to each level one node of the plurality of level one nodes.

11. The method of claim 10, wherein generating the segment-discover tree further includes:

for each level one node of the plurality of level one nodes:
determining, using the contingency table, a probability that an interaction characteristic corresponding to the level one node is independent from one or more other interaction characteristics, wherein an interaction characteristic is independent when a presence of the interaction characteristic in a user session is not dependent on a presence of another interaction characteristic in the user session;
determining whether the probability that the characteristic corresponding to the level one node is independent from one or more other interaction characteristics is below a threshold; and
removing the level one node of the plurality of level one nodes from the segment-discovery tree when the probability that the characteristic corresponding to the level one node is independent from one or more other interaction characteristics is below the threshold.

12. The method of claim 10, wherein generating the segment-discovery tree further includes :

for each level two node of the plurality of level two nodes:
determining, using the contingency table, whether the level two node is to be expanded; and
generating, for each level two node that is to be expanded, one or more level three node, the one or more level three node corresponding to a combined interaction characteristic, the combined interaction characteristic including a corresponding interaction characteristic of a level two node and another level two node or a level one node.

13. A non-transitory computer-readable storage media storing instructions that, when executed by one or more processors, causes the one or more processors to perform operations including:

receiving a session dataset including, for each of one or user sessions, one or more interaction characteristics that characterize user interaction with a first version of a webpage during a session;

defining, from the session dataset a set of interaction characteristics;

receiving a definition of a target characteristic group, the definition identifying a first subset of the set of interaction characteristics;

identifying a second subset of the set of interaction characteristics, each characteristic in the second subset being absent from the first subset;

generating, using the second subset of the set of interaction characteristics, a segment-discovery tree by:

generating a plurality of level one nodes, each level one node of the plurality of level one nodes corresponding to an interaction characteristic of the second subset; and generating a plurality of level two nodes, the plurality of level two nodes corresponding to a combined interaction characteristic, the combined interaction characteristic including a corresponding interaction characteristic of two or more level one nodes;

determining, for each level one node of the plurality of level one nodes in the segment-discovery tree, a probability that an interaction characteristic corresponding to the level one node correlates with the target characteristic group;

determining, for each level two node of the plurality of level two nodes in the segment-discovery tree, a probability that the combined interaction characteristic corresponding to the level two node correlate with the target characteristic group;

determining that a probability corresponding to each of a plurality of level one nodes and each of a plurality of level two nodes exceeds a threshold;

defining an interaction dataset that includes, for each level one node and each level two node with a corresponding probability that exceeds the threshold, the interaction characteristic corresponding to the level one node and the combined interaction characteristic corresponding to the level two node;

generating an alternative version of the webpage based on the interaction dataset by modifying one or more nodes of a document object model corresponding to the webpage, the alternative version of the webpage including at least some content of a set of content that is different from the set of content rendered by the first version of the webpage; and transmitting the alternative version of the webpage to one or more users that satisfy the interaction dataset within a particular geographical region, wherein the first version of the webpage is configured to be served to users that do not satisfy the interaction dataset.

14. The non-transitory computer-readable storage media of claim 13, wherein each of the one or more interaction characteristics includes a set of attributes, and wherein the definition of the target characteristic group identifies a subset of the set of attributes for each interaction characteristic of the first subset of the set of interaction characteristics.

15. The non-transitory computer-readable storage media of claim 13, wherein the combined interaction characteristic represents the corresponding interaction characteristic of two or more level one nodes as a Boolean expression.

16. The non-transitory computer-readable storage media of claim 13, wherein generating the segment-discover tree further includes: generating a contingency table, the contingency table including a first row and second row;

determining, for each level one node of the plurality of level one nodes, a frequency value of an interaction characteristic corresponding to the level one node, the frequency value indicating a number of user sessions in which the interaction characteristic characterized a user session;

storing, in the first row, the frequency value corresponding to each level one node of the plurality of level one nodes;

determining, for each level one node of the plurality of level one nodes, an independence value of an interaction characteristic corresponding to the level one node, the independence value indicating a number of user sessions in which the interaction characteristic did not characterize a user session; and storing, in the second row, the independence value corresponding to each level one node of the plurality of level one nodes.

17. The non-transitory computer-readable storage media of claim 16, wherein generating the segment-discovery tree further includes:

for each level one node of the plurality of level one nodes:
determining, using the contingency table, a probability that an interaction characteristic corresponding to the level one node is independent from one or more other interaction characteristics, wherein an interaction characteristic is independent when a presence of the interaction characteristic in a user session is not dependent on a presence of another interaction characteristic in the user session;

determining whether the probability that the characteristic corresponding to the level one node is independent from one or more other interaction characteristics is below a threshold; and removing the level one node of the plurality of level one nodes from the segment-discovery tree when the probability that the characteristic corresponding to the level one node is independent from one or more other interaction characteristics is below the threshold.

18. The non-transitory computer-readable storage media of claim 16, wherein generating the segment-discovery tree further includes:

for each level two node of the plurality of level two nodes:
determining, using the contingency table, whether the level two node is to be expanded; and
generating, for each level two node that is to be expanded, one or more level three node, the one or more level three node corresponding to a combined interaction characteristic, the combined interaction characteristic including a corresponding interaction characteristic of a level two node and another level two node or a level one node.

* * * * *

UNITED STATES PATENT AND TRADEMARK OFFICE
CERTIFICATE OF CORRECTION

PATENT NO. : 10,339,546 B2
APPLICATION NO. : 14/270337
DATED : July 2, 2019
INVENTOR(S) : Dereszynski et al.

Page 1 of 1

It is certified that error appears in the above-identified patent and that said Letters Patent is hereby corrected as shown below:

In the Specification

Column 30, Line 24:
Delete "FIGS. 34-23" and insert -- FIGS. 34-35 --, therefor.

In the Claims

Claim 1, Column 44, Line 17:
After the word "or" insert -- more --, therefor.
Claim 7, Column 46, Line 2:
After the word "or" insert -- more --, therefor.
Claim 13, Column 47, Line 59:
After the word "or" insert -- more --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*